United States Patent
Glinka et al.

(10) Patent No.: US 12,504,453 B2
(45) Date of Patent: Dec. 23, 2025

(54) METHOD AND SYSTEM FOR ASSESSING A METALLIC STRUCTURE ARRANGED WITHIN AN ELECTROLYTE

(71) Applicant: Electromagnetic Pipeline Testing GmbH, Berlin (DE)

(72) Inventors: Mark Glinka, Berlin (DE); Albin Hertrich, Berlin (DE); Jan Strom, Berlin (DE); Bruno Schulz, Berlin (DE); Alexander Kroll, Berlin (DE)

(*) Notice: Subject to any disclaimer, the term of this patent is extended or adjusted under 35 U.S.C. 154(b) by 0 days.

(21) Appl. No.: 19/173,907

(22) Filed: Apr. 9, 2025

(65) Prior Publication Data
US 2025/0237624 A1 Jul. 24, 2025

Related U.S. Application Data

(63) Continuation of application No. PCT/EP2024/072859, filed on Aug. 14, 2024.

(30) Foreign Application Priority Data

Aug. 22, 2023 (EP) ..................................... 23192759

(51) Int. Cl.
  *G01R 29/08* (2006.01)
  *G01N 17/00* (2006.01)
  (Continued)

(52) U.S. Cl.
  CPC ......... *G01R 29/0814* (2013.01); *G01N 27/20* (2013.01); *G01N 27/301* (2013.01);
  (Continued)

(58) Field of Classification Search
  CPC .. G01N 27/20; G01N 27/301; G01N 27/4166; G01N 17/006; G01N 17/02; G01R 29/0814; G01R 29/0892
  See application file for complete search history.

(56) References Cited

U.S. PATENT DOCUMENTS

| 4,390,836 A | 6/1983 | Bruce |
| 4,752,360 A * | 6/1988 | Jasinski ................. G01N 17/02 205/777 |

(Continued)

FOREIGN PATENT DOCUMENTS

| CN | 110066997 | 7/2019 |
| CN | 209784244 | 12/2019 |
| JP | 5565288 | 8/2014 |

OTHER PUBLICATIONS

Xu, L. Y., et al. "Development of a real-time AC/DC data acquisition technique for studies of AC corrosion of pipelines." Corrosion Science 61 (2012): 215-223. (Year: 2012).*

(Continued)

*Primary Examiner* — Christopher P McAndrew
(74) *Attorney, Agent, or Firm* — SLEMAN & LUND LLP

(57) ABSTRACT

A method for assessing a structure arranged in an electrolyte includes connecting an electric source between the structure and a low resistive connection to the electrolyte via an earth, providing a direct and/or alternating current via the source, measuring a direct and an alternating voltage between a first and second electrode, the electrodes being in contact with the electrolyte at a measurement location and being arranged at a distance to each other. The first and second electrodes are connected to a voltage measurement device. A direct potential and an alternating potential is determined between the structure and the electrolyte at the measurement location, which may include measuring the DC potential and the AC potential between the structure and at least one additional electrode in contact with the electrolyte. A property of the structure may be assessed based on the measured DC and AC voltages, and the DC and AC potentials.

15 Claims, 16 Drawing Sheets

(51) Int. Cl.
*G01N 17/02* (2006.01)
*G01N 27/20* (2006.01)
*G01N 27/30* (2006.01)
*G01N 27/416* (2006.01)

(52) U.S. Cl.
CPC ..... *G01N 27/4166* (2013.01); *G01R 29/0892* (2013.01); *G01N 17/006* (2013.01); *G01N 17/02* (2013.01)

(56) References Cited

U.S. PATENT DOCUMENTS

| | | | |
|---|---|---|---|
| 5,087,873 A | 2/1992 | Murphy | |
| 5,469,048 A * | 11/1995 | Donohue | G01N 17/02 204/404 |
| 6,365,034 B1 * | 4/2002 | Spellane | G01N 17/02 205/775.5 |
| 6,577,112 B2 * | 6/2003 | Lvovich | G01N 33/2888 73/61.43 |
| 2003/0146749 A1 * | 8/2003 | Srinivasan | G01N 17/02 324/71.2 |
| 2003/0169058 A1 * | 9/2003 | Pierre | G01N 17/02 324/700 |
| 2010/0039127 A1 * | 2/2010 | Orazem | G01N 17/02 324/718 |
| 2017/0108469 A1 | 4/2017 | Timmons | |
| 2019/0101502 A1 * | 4/2019 | Aziz | C01B 32/205 |
| 2022/0128454 A1 * | 4/2022 | Räftegård | G01R 19/2506 |
| 2022/0260548 A1 * | 8/2022 | Rodrigues | G01N 33/383 |

OTHER PUBLICATIONS

May, Zazilah, Md Khorshed Alam, and Nazrul Anuar Nayan. "Recent advances in nondestructive method and assessment of corrosion undercoating in carbon-steel pipelines." Sensors 22.17 (2022): 6654. (Year: 2022).*

* cited by examiner

METHOD AND SYSTEM FOR ASSESSING A METALLIC STRUCTURE ARRANGED WITHIN AN ELECTROLYTE

CROSS-REFERENCE TO RELATED APPLICATIONS

This application is a continuation of International Patent Application No. PCT/EP2024/072859, filed Aug. 14, 2024, which claims priority to European Patent Application No. EP 23192759.1, filed Aug. 22, 2023, the disclosures of which are hereby incorporated by reference herein.

TECHNICAL FIELD

The present disclosure relates to a method for assessing a structure in an electrolyte and a system for carrying out the method.

TECHNICAL BACKGROUND

Longitudinal metallic structures like pipelines, for the transport of liquid or gaseous media, or cables for the transport of electrical power or communication information, are usually located within soil or immersed in water. Other longitudinal metallic structures are rails and tracks of transportation systems that are installed e.g. on a gravel bed. Further longitudinal metallic structures are tendons, anchors or stay cables of bridges that are installed in grout, concrete or grease. Such structures are protected by an external coating or insulation to protect them from corrosion. All these structures have in common that the soil, water, rock, gravel, sand, grout, concrete, condensed humidity etc., hereinafter referred to as "electrolyte", contact the structure, if the coating or insulation is damaged, which results in a physicochemical reaction with the structure which corrodes the structure. In order to avoid further deterioration of the structure in case of such coating damages, usually a passive cathodic protection, using a sacrificial anode arranged with the electrolyte near the structure that is connected to the structure, or an active cathodic protection, where a protection current is actively introduced between the structure and the anode, are used. The cathodic protection changes the chemical composition of the electrolyte at the coating defects and ensures corrosion protection. Such protection is achieved by an increased surface pH and a resulting formation of protective oxide films at the coating damage. The level of the corrosion protection is characterized by the so called on-potential $E_{on}$ (potential of the structure relative to the electrolyte when the protective current is activated). More negative values of the on-potential indicate stronger cathodic protection.

In order to avoid damages to and dangers by the structure, it is desirable to ensure that the cathodic protection is effective, meaning strong enough. However, gaining knowledge about the current state of the structure, in particular about the cathodic protection can be cumbersome requiring complex procedures because of voltage drops caused by coating defects.

In the state of the art, in order to avoid these effects caused by the coating defects, one solution has been to measure a so called off-potential $E_{off}$ (potential between structure and electrolyte immediately after turning of the protective current. However, such an off-potential is only free of corresponding voltage drops, if there is either only one defect in the coating or if all defects have the same IR-free potential (described below). Although in the case of one single coating defect, it may therefore be sufficient to interrupt the protective current, in case of several coating defects on a pipeline exchange currents will flow in the electrolyte and the measured potential corresponds to the off-potential, except if all coating defects have the same IR-free potential. However, in reality, this is never the case. Therefore, an off-potential can only be an approximation to an IR-free potential.

Another solution in the state of the art is to determine the effectiveness of the cathodic protection by determining a so called IR-free potential $E_{IR\text{-}free}$ (potential without the above indicated voltage drops). This usually is done via the so called Intensive Measurement (IM) method according to EN ISO 13509-1. The IM represents a combination of Close Potential Survey (CIPS) with DC Voltage Gradient (DCVG). The concurrent CIPS/DCVG determines the voltage drop generated by the current flowing into the coating defect, which, in principle, allows for localizing coating defects and for determining $E_{IR\text{-}free}$. However, the method is only applicable to large coating defects. In particular on modern pipelines with small coating defects, it is technically impossible to be compliant with EN ISO 13509-1. Further, intensive measurement affords to directly measure $E_{on}$, $E_{off}$, and a voltage drop within the electrolyte during on/off of the protective current, which requires a cable from a fixed test post, which may be associated with installing cables of up to several kilometers in length (The measurements have to be taken between test posts, for example every 5 m). Also, the resolution of IM depends on the magnitude of the voltage drop within the electrolyte, which oftentimes is too small and the protective current and with it $E_{on}$ cannot be increased, since this would change the level of cathodic protection and, therefore, the IR-free potential.

Although methods such as AC voltage gradient measurement (ACVG), which do not need cables, are also known, these methods do only allow to locate coating defects but do not allow to determine the IR-free potential necessary for demonstrating the effectiveness of the cathodic protection in accordance with EN ISO 15589-1.

DESCRIPTION

It is an objective to provide a method and system for a reliable assessment of a structure in an electrolyte.

This objective is solved by the subject matter of the independent claims. Further embodiments are described in the dependent claims as well as in the following description.

Herein, a method (first aspect) for assessing a structure arranged in an electrolyte as well as a system (second aspect) for assessing the structure are disclosed. It should be appreciated that features that are described with regard to the method are equally valid for the system and vice versa. In particular, the disclosed system is configured to carry out the disclosed method. Hence, any feature described for any one of these aspects are implicitly also disclosed for the other aspect, even if not explicitly mentioned in this application.

According to a first aspect, a method for assessing a structure arranged in an electrolyte is disclosed. The method comprises the following steps: connecting an electric source between the structure and a low resistive connection to the electrolyte via an earth, and providing, at least within the structure, a direct current (DC) and an alternating current (AC) via the electric source. The method further comprises measuring a direct voltage (DC voltage) $U_{DC}$ and an alternating voltage (AC voltage) $U_{AC}$ between a first electrode and a second electrode, while the first electrode and the second electrode are in contact with the electrolyte at a measurement location and are arranged at a distance to each other. The first electrode and the second electrode are connected to a voltage measurement device. The method further comprises determining a direct potential (DC potential) $E_{DC}$ and an alternating potential (AC potential) $E_{AC}$ between the structure and the electrolyte at the measurement location, wherein determining the DC potential $E_{DC}$ and the AC potential $E_{AC}$ comprises measuring the DC potential $E_{DC}$ and the AC potential $E_{AC}$ between the structure and at least one additional electrode in contact with the electrolyte, and assessing at least one property of the structure based on the measured DC voltage $U_{DC}$, the measured AC voltage $U_{AC}$, the DC potential $E_{DC}$, and the AC potential $E_{AC}$.

A low resistive connection to the electrolyte via an earth can, without limitation, include an earthing system, an anode bed, a temporary installation of interconnected earth rods, or any other suitable structure. Such structures are hereinafter referred to as "earth".

The present invention relates to a method for assessing a metallic structure, in particular for assessing a corrosion protection of such as structure, in contact with an electrolyte. The invention also related to a system, that is described further below, for carrying out the disclosed method.

The structure may be any longitudinally extended metallic structure in contact with any electrolyte. This includes pipelines as well as electrical power or communication cables buried in soil or immersed in water, prestressing tendons installed in concrete, stay cables in condensed humidity as well as rails and tracks installed on gravel, in concrete, in soil or in asphalt.

Such a metallic structure, hereinafter simply referred to as "structure", is for technical reasons longitudinally conductive and in contact with an electrolyte. The most relevant examples for a structure are pipelines or cables. These pipelines for the transport of liquid or gaseous media, or cables for the transport of electrical power or communication information, are usually buried in soil or immersed in water. Similarly, the metallic rails and tracks of transportation systems are installed on a gravel bed, in asphalt or in concrete, or a combination of these. Additionally, tendons, anchors or stay cables of bridges are installed in grout, concrete or grease. Soil, water, rock, gravel, sand, grout, concrete, condensed humidity etc., are hereinafter collectively referred to as "electrolyte".

In general, when the electrolyte comes into direct contact to the structure (e.g., when coating defects occur), this causes a physicochemical reaction with the structure. This physicochemical reaction is referred to hereinafter as "corrosion".

For protection against corrosion, the structure is usually coated with a corrosion protection system such as a corresponding coating. This corrosion protection can comprise any organic material such as polyethylene, polyurethan, rubber or caoutchouc, epoxy, but also fat, grease or viscoelastic material, polymeric foam etc. Alternatively, an inorganic material such as cement, grout or concrete, metal oxide, passive film or zinc may be applied to or formed on the surface of the structure. This externally applied corrosion protection can be a single corrosion protection product or a combination of a number of these. Typical examples are polyethylene and cement, viscoelastic polymers in combination with polyethylene, rubber and cement, grease and polyethylene etc. All these individual or combinations of different corrosion protections applied to the external surface of the structure is hereinafter referred to as "coating". These inorganic materials promote the formation or form protective oxide films on the surface of the structure. The purpose of the coating is to prevent or limit direct contact between the metal of the structure and the electrolyte.

This protection against corrosion based on a coating is usually compromised by the formation of local defects in the coating, which are hereinafter referred to as "coating defects". Such coating defects are sometimes also referred to as "holidays". Within the coating defects, a direct contact between the electrolyte and the structure is formed, which usually results in a low resistive contact between the structure and the electrolyte and often leads to corrosion of the structure. Corrosion can result in damage to the structure when it sufficiently proceeds including, but not limited to, leakage in the case of pipelines, rupture in the case of tendons and breakage in the case of rails. A coating defect can be formed for various reasons including, but not limited to, mechanical damage of the coating during installation, insufficient application quality of the coating during construction, degradation of the adhesion between the coating and the structure as well as cracking of the coating during operation.

For the integrity and safety of structures, it is of highest importance to avoid corrosion, even if such coating defects are present. In order to do so, oftentimes a cathodic protection system is utilized, which may either be a passive system or an active system (impressed current cathodic protection). Passive cathodic protection uses a sacrificial anode that provides free electrons and that is more easily corroded. The anode is placed in the vicinity of the structure and connected to the structure in an electrically conductive way. The structure then acts as a cathode. This leads to the anode corroding instead of the structure. Active cathodic protection is based on the same principle. However, a current source drives a protective direct current (DC current) through the system of structure, anode and electrolyte in order to increase the protection.

The cathodic protection changes the chemical composition of the electrolyte at the coating defects and ensures corrosion protection by increasing a surface pH and a resulting formation of protective oxide films at the coating defects.

In order to ensure a strong enough corrosion protection by means of the cathodic protection, it is of highest relevance to, on the one hand, identify and localize the coating defects, and, on the other hand, assess if the cathodic protection is effective at every coating defect.

Currently available methods such as intensive measurement (IM) and Alternating Current Voltage Gradient (ACVG) have multiple drawbacks (as discussed in the technical background of this disclosure), such as the necessity for installing very long cables in the case of IM or the inability to determine an IR-free potential in the case of ACVG. The present invention overcomes these drawbacks.

In particular, the invention is based on providing both, a direct current (DC current) and an alternating current (AC current), within the structure. In particular, an electric source having a first output terminal, and a second output terminal can be connected to the structure and earth (e.g. an anode or any other low resistive contact to earth, as indicated further above). In particular, the first output terminal may be connected directly to the structure and the second output terminal may be connected to an earth (e.g., an anode), which is provided by the electrolyte itself.

However, instead of a dedicated electric source, the electric source may also be an electric source that is present anyway for driving the protective current (which corresponds to the DC current) through the structure. Additionally, an AC current is provided within the structure by the electric source. It is also conceivable to, for example, provide only the DC current via an electric source, that is already connected to the structure (such as a corresponding source of a cathodic protection system) and to provide the AC current via an additional dedicated electric source. Further, it may also be conceivable, to use two dedicated electric sources, one for the AC current and one for the DC current, additional to an already present electric source. Further, it may be conceivable to utilize currents that are induced into the structure by stray fields anyway (such as, in non-limiting examples, 50 Hz noise from the electric grid in Europe, 60 Hz noise from the electric grid in North America, or 16.7 Hz from the central European railway system) as the AC current or DC current. Further, because of such stray fields, the DC current and the AC current may not be stable over time. In order to account for that, $E_{DC}$ and $E_{AC}$ may be determined/monitored continuously over time at one or several dedicated locations (e.g., adjacent test posts). The term "electric source", as used herein covers all of these possibilities and every possible combination of these possibilities and is to be understood universal in that sense.

The AC current may comprise at least one frequency. The AC current may also comprise multiple frequency components. The AC current may, for example, comprise frequencies in the range between 1 Hz and 10 Hz (preferably more than 10 Hz) on the lower end and between 5 kHz and 100 kHz on the upper end. Further, the AC current may comprise any appropriate signal shape that is changing over time. For example, the AC current may be a sine waveform, a rectangular waveform, a triangular waveform, delta peaks (very short pulses), or any other alternating signal shape. The DC current is not necessarily a current of 0 Hz but may comprise any frequency below 16 Hz. Typically, the DC current has a frequency below 1 Hz.

In order to assess properties of the structure, in particular to localize coating defects and to determine the effectiveness of a cathodic protection, but also for assessing any other property of the structure that can be determined based on at least some of the determined measurement values, a voltage gradient is determined. In the following, the invention is mainly described for the detection of coating defects and for determining the effectiveness of a cathodic protection. However, it should be born in mind that the invention is not limited to this application.

For example, if a coating defect is present at a particular location of the structure, this leads to leakage currents (herein also secondary currents) between the electrolyte and the structure as well as to associated voltage gradients (which are hereinafter simply referred to as voltages) within the electrolyte. Just as in ACVG, by providing an AC current, the cathodic protection does not have to be switched on or off for the corresponding measurements that are necessary in Intensive Measurement (IM), as described initially in the technical background.

In order to localize coating defects in the structure, many measurements along the structure at multiple measurement locations are necessary. The fast change in polarity of the AC current allows for fast measurements. Also, by measuring the AC voltage ($U_{AC}$) within the electrolyte, coating defects can be localized without changing the level of the direct current (i.e. the protective current) and with it possibly causing over-polarization of the structure, as will be readily apparent, as the AC voltage ($U_{AC}$) within the electrolyte is associated with the location of the coating defect.

The combination of the AC current with a DC current within the structure and measuring both, a DC voltage ($U_{DC}$) and an AC voltage ($U_{AC}$) together with knowledge about the direct potential ($E_{DC}$) and an AC potential ($E_{AC}$) further allows for assessing many other properties, such as an IR-free potential, as described below with regard to an embodiment, which allows for determining the effectiveness of a cathodic protection.

In particular, the method may be carried out by measuring the DC voltage and the AC voltage at multiple measurement locations (at least at one measurement location, for example if a coating defect is, for any reason, suspected at that particular measurement location). In general, the rough course of the structure (such as an underground or underwater pipeline) is known. The structure may be examined for coating defects by taking multiple measurements at multiple locations along the rough course of the structure. Measurements are taken by placing the first electrode and the second electrode above the structure at a distance to each other at a particular measurement location, such that both electrodes are in contact with the electrolyte. Then, the DC voltage and the AC voltage between the first electrode and the second electrode is measured by a voltage measurement device (such as a multimeter) that is connected to the electrodes. These voltage measurement correspond to voltages or voltage gradients within the electrolyte. This measurement is repeated for the next measurement location along the rough course of the structure, and so on. Additionally, at each measurement location, the AC potential $E_{AC}$ (potential of the structure with regard to the electrolyte as resulting from the imposed AC current) and the DC potential $E_{DC}$ (or on-potential $E_{on}$ (potential of the structure with regard to the electrolyte as resulting from the DC current, i.e., from the protective current of the cathodic protection) is determined. In general, this determination comprises measuring the corresponding potential between the structure and at least one additional electrode (which, in general, is a reference electrode as defined herein) in contact with the electrolyte. This determination may be done in any suitable way, e.g., by interpolation of the measured $E_{DC}$ and $E_{AC}$ values determined at adjacent test posts or may comprise measuring electromagnetic fields at the measurement location, as described further below with regard to certain embodiments. At measurement locations near a test post, either the first electrode or the second electrode may also be used as the at least one additional electrode. In general, the voltages $U_{DC}$ and $U_{AC}$ are usually measured concurrently (i.e., in sync) with the AC current (meaning in sync with the determination of $E_{DC}$ and $E_{AC}$), independently of the method for determining $E_{DC}$ and $E_{AC}$, such that $U_{DC}$ and $U_{AC}$ are correctly correlated to the corresponding potentials $E_{DC}$ and $E_{AC}$.

As used in this disclosure, the term "potential" or the letter "E" is used for a potential that is measured directly between the structure (e.g., by direct contact to the structure via a test post) and at least one additional electrode in contact with the electrolyte. The term "voltage" or the letter "U" is used for a voltage (i.e., a potential difference) between two locations within the electrolyte (i.e., the locations, at which the first electrode and the second electrode, respectively, are in contact with the electrolyte).

When a measurement is taken at a measurement location that corresponds to the location of a coating defect, the accompanying voltage gradient is detected via the measured values of the DC voltage and the AC voltage. The measured values of the DC voltage and the AC voltage as well as the determined values of the DC potential and the AC potential may then be used, for example, to determine the IR-free potential and from this the effectiveness of the cathodic protection.

The disclosed method therefore allows for the assessment of multiple properties of the structure along the structure, in particular for detecting coating defects and for assessing the effectiveness of a cathodic protection without the need for long cables.

It should be appreciated that, although herein mainly described for structures that are in a ground based electrolyte (such as a pipeline buried in ground), this disclosure is equally applicable for any structure in any electrolyte. For example, the method may also be carried out for undersea pipelines. In such an example, the electrodes may, for example, be attached to an underside of a submarine at mounting points that are distanced from each other. However, this is only one further example. The disclosure is applicable to any structure in the sense of this application and to any electrolyte.

According to an embodiment, the at least one additional electrode comprises a first additional electrode and a second additional electrode. Determining the DC potential $E_{DC}$ and the AC potential $E_{AC}$ at the measurement location comprises: measuring a first DC potential $E_{DC}$ and a first AC potential $E_{AC}$ between the structure and the first additional electrode arranged at a first test post, measuring a second DC potential $E_{DC}$ and a second AC potential $E_{AC}$ between the structure and the second additional electrode arranged at a second test post, wherein the second test post is arranged at a distance to the first test post, determining an interpolated DC potential $E_{DC}$ at the measurement location based on the first DC potential $E_{DC}$ and the second DC potential $E_{DC}$, and determining an interpolated AC potential $E_{AC}$ at the measurement location based on the first AC potential $E_{AC}$ and the second AC potential $E_{AC}$. The measurement location is arranged between the first test post and the second test post.

It should be appreciated that, optionally, the first additional electrode and the second additional electrode may not necessarily be individual electrodes, but they may also be the same electrode that is rearranged to measure at both, the first test post and the second test post. Further, when the measurement location is near the first test post or the second test post, the at least one additional electrode may be one of the first electrode or the second electrode.

In underground pipelines, as an example for a structure, test posts are arranged at regular distances from each other along the pipeline that are accessible from above and that allow a direct electrical contact to the pipeline. Therefore, at such locations, the DC potential and the AC potential, being the corresponding potentials between the structure itself and the electrolyte (i.e., as measured between the structure and the at least one additional electrode in contact with the electrolyte), can easily be measures. The test posts itself, for example, could have corresponding measurement devices integrated that measure the potentials. These potentials may then, for example, be wirelessly transmitted to the voltage measurement device or an associated processing unit. The values of the DC potential and the AC potential of two adjacent test posts may then be used to interpolate corresponding values of the DC potential and the AC potential of each location between the two test post and in particular at each measurement location at which the method is carried out. For the interpolation, a homogeneous distribution along the structure may be assumed. Interpolation of measurement values in general is well known. Optionally, the voltage measurement device or an associated processing device may comprise means for determining the current measurement location at which the method is currently carried out. Such means may, for example and without limitation, comprise a GPS system, a distance measuring device for measuring a distance from the last test post, or any other suitable device.

According to a further embodiment, determining the DC potential $E_{DC}$ and the AC potential $E_{AC}$ at the measurement location comprises: measuring an electromagnetic field at the measurement location with at least one electromagnetic field sensor of an electromagnetic measurement device, wherein the electromagnetic field to be measured is associated with a primary current $I_{AC,P}$ and $I_{DC,P}$ in the structure at the measurement location resulting from the $E_{AC}$ current and DC current imposed on the structure, determining the primary current $I_{AC,P}$ along the structure based on the measured electromagnetic field, and calculating the AC potential $E_{AC}$ and/or the DC potential $E_{DC}$ based on a the measured currents $I_{AC,P}$, $I_{DC,P}$.

The AC current as well as the DC current that are provided within the structure, just as any current, create a magnetic field that is circumferential to the current flow direction. If a coating defect is present at the measurement location, a secondary current $I_{AC,S}$ and $I_{DC,S}$ (a leakage current) flows from the structure through the coating defect into the electrolyte. This secondary current $I_{AC,S}$, $I_{DC,S}$ produces electric fields that can be measured with at least one electromagnetic field sensor that is oriented to measure the corresponding field orientation. Preferably, three electromagnetic field sensors are provided that measure field components in every spatial orientation. By measuring a primary current $I_{AC,P}$ having the frequency (or frequencies) of the AC current, this primary current $I_{AC,P}$ can be associated with the AC current imposed onto the structure. Therefore, from the secondary current $I_{AC,S}$ (which is the difference of the primary current $I_{AC,P}$ between after a coating defect and before the coating defect), the corresponding AC potential $E_{AC}$ (which is associated to the secondary current $I_{AC,S}$ via the resistivity of the electrolyte (Ohm's law)) can be determined. Similarly, the DC potential $E_{DC}$ can be determined by measuring $I_{DC,P}$ and $I_{DC,S}$ along the structure. Hence, the magnetic measurement sensor(s) could also be used to determine a DC current and from that the DC potential $E_{DC}$. For example, a Fourier analysis of the measurement signals of the magnetic field sensors could yield the corresponding frequency components (including the DC component) of the measured magnetic fields. The determination of the AC potential (and optionally the DC potential) via this electromagnetic measurement allows for omitting trailing cables, such as those used in intensive measurement (IM). It should be appreciated that the magnetic determination of the DC potential and the AC potential can be combined with other methods of determining these values, for example with the interpolation method described above. For example, only one of the DC potential and the AC potential could be determined via the magnetic measurement while the other one could be determined via interpolation (or any other suitable method that does not require trailing cables). Further, the DC potential and the AC potential could be determined by both, the magnetic determination and the interpolation method (or any other method) to create redundancy and to possibly even provide mutual verifiability. It is also conceivable that the values of $E_{DC}$ and $E_{AC}$ could be determined by a weighted average (wherein the weights could, for example, be assigned according to an accuracy of the respective method) or a non-weighted average. Further, in order to appropriately match the measured secondary current to the imposed AC current, a phase relation of the measured secondary current to the imposed AC current can be determined. This allows to consider only currents measured by the electromagnetic field sensor(s) that originate from the imposed AC current. Currents within the structure can be measured with different frequencies of the AC current to account for a possible frequency dependence of the electrolyte resistivity ρ, the IR-free potential $E_{IR\text{-}free}$, or any other frequency dependence of measurements.

This method of determining current flows and phase relations within the structure and the electrolyte is referred to as Current Magnetometry Inspection (CMI) which has been described in detail in the priority application to this application. The full disclosure of the priority application builds part of this disclosure and is incorporated in this description at the end under the title "Current Magnetometry Inspection (CMI)". The corresponding figures are also incorporated into this disclosure as FIGS. 16 to 23. These parts of the present application documents therefore are a fully incorporated part of the present disclosure in general and in particular for the presently described embodiment. CMI is capable of determining the intensity and the phase shift of the primary current flowing in the structure. Additionally it allows for calculating the secondary current passing between structure and electrolyte through the coating defect.

According to a further embodiment, the method further comprises: calculating a resistivity ρ of the electrolyte based on the secondary current $I_{AC,S}$, the AC voltage $U_{AC}$, and a form factor taking into account the location of the structure within the electrolyte relative to the first electrode and the second electrode, and determining a required protection potential $E_P$ based on the resistivity η of the electrolyte.

In general, the resistivity of the electrolyte is given by the AC voltage $U_{AC}$ and the secondary current $I_{AC,S}$ via the following equation $$\rho = \frac{U_{AC} \cdot 2}{I_{AC,S} \cdot F}$$

where F is a form factor that, in turn, is given by the following equation $$F = \sqrt{\frac{r_1^2 + x^2}{r_2^2 + x^2}}$$

The form factor F considers the relative locations of the first electrode and the second electrode with regard to the structure. In particular, x corresponds to the lateral distance of the first electrode and the second electrode to the structure (i.e., if, for example, the structure is a pipeline running underground parallel to the ground, x is the depth at which the pipeline (or any other structure for that matter) is buried beneath the ground), $r_1$ corresponds to the longitudinal distance of the first electrode to the coating defect (i.e., the distance in the direction of extension of the structure between the first electrode and the coating defect), and $r_2$ corresponds to the longitudinal distance of the second electrode to the coating defect (i.e., the distance in the direction of extension of the structure between the second electrode and the coating defect).

The determined resistivity of the electrolyte may then be used to determine the required protection potential $E_p$ in accordance with EN ISO 15589-1.

According to a further embodiment, assessing the at least one property of the structure comprises determining an IR-free potential $E_{IR\text{-}free}$ at the measurement location.

In particular, as will be readily apparent, the IR-free potential is linked to the DC voltage, the AC voltage and the AC potential via the following equation.

$$E_{IR\text{-}free} = E_{DC} + \frac{U_{DC} \cdot E_{AC}}{U_{AC}}$$

Therefore, providing an AC current additionally to the DC current within the structure allows to determine the IR-free potential, which may then be used to determine the effectiveness of the cathodic protection, in particular by comparing it with the required protection potential $E_p$.

In embodiments, where determining the DC potential $E_{DC}$ and the AC potential $E_{DC}$ comprises determining currents within the structure, these currents can be measured with different frequencies of the AC current to account for a possible frequency dependence of the electrolyte resistivity ρ, the IR-free potential $E_{IR\text{-}free}$, or any other frequency dependence of measurements. This allows for extrapolating to the desired DC limit of the measurement.

According to a further embodiment, the method is carried out at a plurality of measurement locations. Assessing at least one property of the structure comprises locating a coating defect of the structure and determining an effectiveness of a cathodic protection of the structure provided by the direct current based on the IR-free potential $E_{IR\text{-}free}$.

This embodiment has already been described by way of example in the more general embodiments above.

According to a further embodiment, the first electrode and the second electrode are each electrode assemblies comprising a reference electrode and a metal electrode. The metal electrodes are used for locating the coating defect. The reference electrodes are used for determining the effectiveness of the cathodic protection.

Reference electrodes, on the one hand, have a stable and well defined potential. Metal electrodes, on the other hand, do not have such a stable and well defined potential. However, metal electrodes are rugged and do not require maintenance or calibration (such as reference electrodes). In particular, stainless steel electrodes can be used as metal electrodes, since these are protected against corrosion by means of a passive film that spontaneously forms on the metal surface.

With metal electrodes, when they are inserted into the soil surface, the abrasive effect removes, at least partially, the oxide film from the metal. This results in transient potential variations as a result of the reformation of the oxide film. This transient behavior affects the data analysis and compromises the results. This effect is particularly disturbing because according to the invention not only the AC voltage $U_{AC}$, but also the DC voltage $U_{DC}$ is to be assessed for the determination of $E_{IR\text{-}free}$ (or another property of the structure). The most straightforward solution would be using only reference electrodes because reference electrodes do not show transient behavior.

Since the use of reference electrodes has the disadvantage that they, unlike metal electrodes, require maintenance and calibration, using only reference electrodes is time consuming and costly. This issues associated with reference electrodes can be overcome by performing the measurements first with metal electrodes. Once a coating defect is located, the metal electrodes are switched to reference electrodes. This limits the use of the sensitive reference electrodes to only a fraction of the survey. The rugged and fast metal electrodes are used on most parts of the pipeline (most measurements are to identify/locate coating defects in the first place), while still allowing maximum resolution at the relevant measurement locations, where coating defects have actually been identified.

According to a further embodiment, the method further comprises establishing a wireless communication between the electric source and the voltage measurement device and/or a processing unit connected to the voltage measurement device, and sending a command to the electric source to increase the AC current prior to measuring the AC voltage $U_{AC}$ in order to improve accuracy of the measurement.

Such a wireless communication between the electric source and the voltage measurement device and/or an associated processing unit allows for receiving the AC potential $E_{AC}$. For example, $E_{AC}$ could be modelled or interpolated starting from the electric source for the whole structure. Another possibility would be that test poles which comprise corresponding measurement devices for the AC and DC potentials could be in communication with the electric source (or also directly with the voltage measurement device or an associated processing unit), which receives the individual measurement values and sends them to the voltage measurement device (or the associated processing unit). The received values could then be used, e.g., for interpolation for the measurement location. Further, upon the detection of a coating defect, the voltage measurement device (or the associated processing unit) sends a command to the electric source to increase the AC current. This, in turn, increases the AC voltage $U_{AC}$ that is measured at the measurement location and allows for a more reliable determination of the IR-free potential $E_{IR\text{-}free}$. By this, the interference to the pipeline is minimized and therefore the safety of persons is maximized by means of the wireless communication.

Alternatively to a wireless communication, it is also conceivable that a wired communication is established in that corresponding cables are routed along the longitudinal extension of the structure, wherein the cables have multiple interfaces at the surface along the structure for connecting the voltage measurement device (or the associated processing unit) with them.

According to a further embodiment, electrical contact of the first electrode and the second electrode with the electrolyte is enhanced for each electrode by bringing the electrodes into contact with an electrolyte bridge that connects the corresponding electrode with the electrolyte. The electrolyte bridge comprises at least one of the following: a water stream, a water filled pipe, a water soaked porous material, and a polymer electrolyte.

The contact of the electrodes to the electrolyte is crucial for reliable readings. In particular in dry conditions, a wetting of the electrolyte surface is required for establishing low resistive and well defined contact of the electrode with the electrolyte. An option is, e.g., the installation of the electrodes in a suitable electrode electrolyte tank that serves for providing an electrolyte bridge. The contact of the electrode to the electrolyte can, for example, be ensured via a water stream from this electrode electrolyte tank to the electrolyte. Also, when limiting the use of such a water flow to only the measurement areas, where a coating defect has been determined, water consumption can be kept small and maximum resolution and reliability is obtained for the determination of, e.g., the IR-free potential afterwards. Further, by preventing direct contact between a reference electrode and the electrolyte, the stability of the measurement is increased.

As a further example for an electrolyte bridge, two people may each carry one of the first electrode and the second electrode. Each of the electrodes may be arranged in an electrolyte filled container on the back of each person which may, for example, be filled with an aqueous NaCl solution. The electrodes may, e.g., be silver wires coated with AgCl. This provides a stable potential and minimizes errors by diffusion potentials. A pipe may extend from the corresponding container to the foot of the corresponding person. The pipe may be connected to a wick at each foot. Contact to the electrolyte may then, for example, be established at each foot via the pipe and the wick. The wick may, e.g., consist of a rope exhibiting capillary forces. This provides for a durable and rugged electrolyte contact. Another example for an electrolyte bridge may be one person carrying such a container that builds the first electrode. Instead of another person, the one person may push a rotating electrode (which builds the second electrode) over the ground, wherein the electrolyte contact is achieved by an electrode electrolyte that is leaking from an inside of the rotating electrode into a textile (e.g., a felt)

According to a further embodiment, the method further comprises: using different electrode materials with deviating potentials for the first electrode and the second electrode, and regularly connecting a resistor having a relatively large resistance between the first electrode and the second electrode in parallel to the voltage measurement device, comparing a measurement of a first DC voltage $U_{DC,1}$ taken without the resistor connected with a measurement of a second DC voltage $U_{DC,2}$ taken with the resistor connected, and, if a difference between the first DC voltage $U_{DC,1}$ and the second DC voltage $U_{DC,2}$ is above a threshold value, enhancing the electrolyte bridge.

A relatively large resistance R means a resistance that is considerably larger than the internal resistance of the voltage measurement device. The relatively large resistance may, for example, be in the range between 1 k$\Omega$ to 1000 M$\Omega$. Then, if the difference is above the threshold (for example 1% of one of the values), this may be a sign that in dry conditions not enough electrode electrolyte is used for at least one of the electrolyte bridges. In dry conditions it may be necessary to apply larger quantities of electrode electrolyte due to an increased circuit resistance between the two electrodes.

Alternatively, the true value of $U_{DC}$ and $U_{AC}$ may be determined by means of $U_{DC,1}$, $U_{DC,2}$, the resistance R and the input impedance or internal resistance $R_I$ of the voltage measurement device. This procedure allows for assessing the data quality and provides the data for correcting the errors. This is crucial for reliable data under dry conditions.

According to a further embodiment, when the structure is arranged in the electrolyte in dry conditions, the method comprises using metal electrodes as the first electrode and the second electrode. Each of the metal electrodes comprises at least one of the following materials: Sodium (Na), Lithium (Li), Beryllium (Be), Magnesium (Mg), Zink (Zn), Aluminum (Al), Indium (In), Tantalum (Ta), Tungsten (W), Molybdenum (Mo), Copper (Cu), Iron (Fe), Platinum (Pt), Nickel (Ni), Cobalt (Co), Chromium (Cr), and Manganese (Mn).

In dry conditions the wetting of the electrolyte by means of an electrolyte bridge with water can generate streaming potentials, which disturb the value of $U_{DC}$ and hence affect the precision of the measurement of $E_{IR\text{-}free}$. This problem is overcome by using metal electrodes without liquid junction to the electrolyte. The potential of metal electrodes in an electrolyte (e.g. soil, water or sea water) is determined by at least two electrochemical reactions taking place. These are typically: Metal oxidation, and Oxygen or water reduction. The metal oxidation of most metals results in the formation of oxide films that significantly affect the potential of the electrode. Consequently, there are key requirements for the choice of the metal: The metal must corrode under water reduction eliminating the influence of oxygen availability; The oxide film formation must be slow; The oxide film must be removed by grinding with the electrolyte particles; The oxide film may not be electron conductive to avoid effects of residual film patches on the potential of the electrode. Based on these parameters, the metals Na, Li, Be, Mg, Zn, Al, In, Ta, W, Mo, Cu, Fe, Pt, Ni, Co, Cr, and Mn seem to be particularly useful as electrodes. The use of these metals provides a combination of more stable readings of $U_{AC}$ as well as $U_{DC}$ by eliminating transients and liquid junction potentials.

According to a second aspect, a system for assessing a structure arranged in an electrolyte is disclosed. The system comprises a first electrode, a second electrode, a voltage measurement device, and a processing unit. The voltage measurement device is configured to measure a direct voltage (DC voltage) $U_{DC}$ and an alternating voltage (AC voltage) $U_{AC}$ between the first electrode and the second electrode, when the first electrode and the second electrode are in contact with the electrolyte at a measurement location. The first electrode and the second electrode are configured to be arranged at a distance to each other. The first electrode and the second electrode are connected to the voltage measurement device. The processing unit is configured to determine a direct potential (DC potential) $E_{DC}$ and an alternating potential (AC potential) $E_{AC}$ between the structure and the electrolyte at the measurement location utilizing at least one additional electrode. The processing unit is configured to assess at least one property of the structure based on the measured DC voltage $U_{DC}$, the measured AC voltage $U_{AC}$, the DC potential $E_{DC}$, and the AC potential $E_{AC}$.

The system is configured to carry out the method described above according to any one of the described embodiments of the method. From the paragraph above, it becomes immediately clear, which elements perform which steps of the method. For the sake of brevity, the above discussion with regard to the method will not be repeated here with regard to the system. The discussion of the method is also fully valid for the system.

According to an embodiment, the system further comprises an electric source having a first output terminal and a second output terminal. The first output terminal is configured to be connected to the structure. The second electrode is configured to be connected to earth. The electric source is configured to provide a direct current (DC) and an alternating current (AC) at least within the structure.

According to a further embodiment, the system further comprises a first communication device connected to the processing unit and/or the voltage measurement device and a second communication device connected to the electric source. The first communication device and the second communication device are configured to establish a wireless communication in order to exchange commands and/or measurement data.

According to a further embodiment, the system further comprises at least one device for establishing an electrolyte bridge for the first electrode and/or the second electrode that connects the corresponding electrode with the electrolyte.

BRIEF DESCRIPTION OF THE DRAWINGS

In the following, exemplary embodiments are described in more detail having regard to the attached figures. The illustrations are schematic and not to scale. Identical reference signs refer to identical or similar elements. However, in FIGS. 15 to 22, describing "Current Magnetometry Inspection (CMI)" described in detail in the priority patent application, whose disclosure has been fully incorporated in the last part of the description under the title "Current Magnetometry Inspection (CMI)", different reference signs may be used. The figures show.

DETAILED DESCRIPTION

For better understanding the differences of the invention with regard to the prior art, the FIGS. 1 to 4 briefly illustrate measurement methods for locating coating defects 26 according to the prior art.

Figure 1:
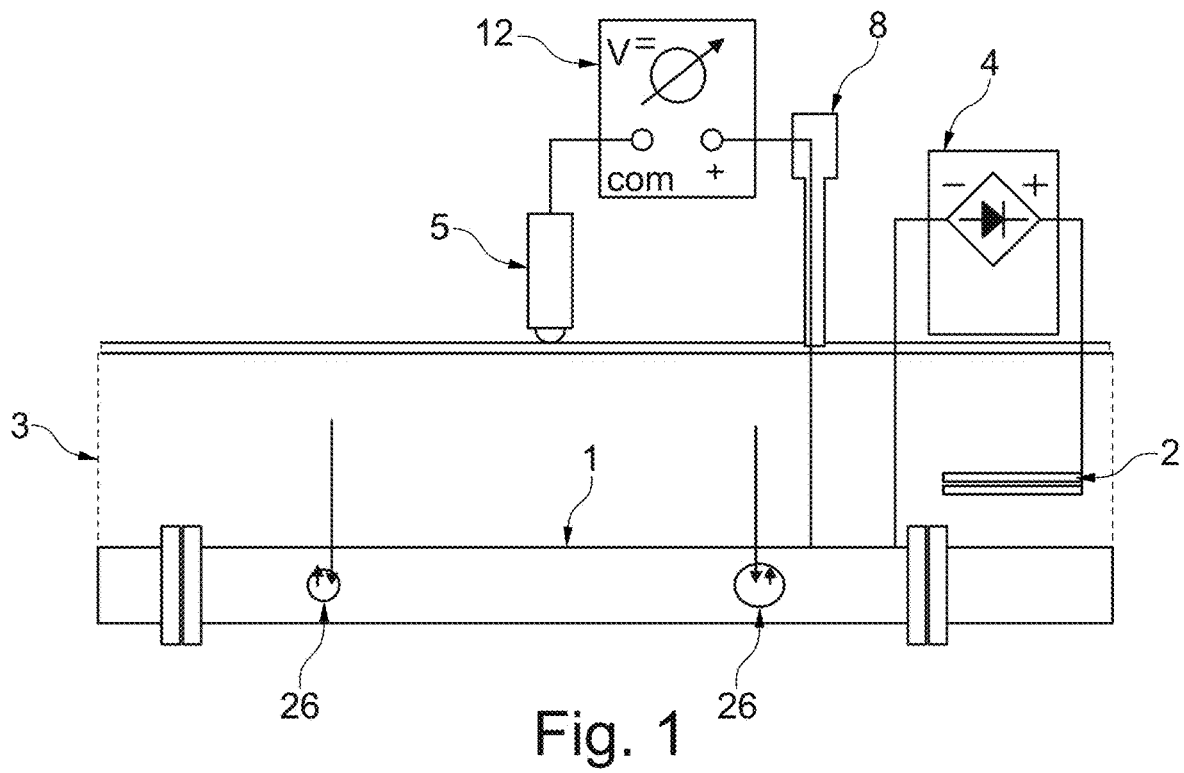
FIG. 1 a schematic overview of a determination of effectiveness of a cathodic protection by only measuring the on-potential $E_{on}$ according to the prior art.

FIG. 1 shows a system, where only an on-potential $E_{on}$ is measured, according to the prior art. A metallic structure 1 in the form of a pipeline is buried in a ground based electrolyte 3, such as soil. The structure 1 is coated by a protective coating, that is designed for protecting the structure 1 from direct contact with the electrolyte, which would lead to corrosion. Two coating defects 26, as described herein further above in detail, are present at the structure 1. Since such coating defects 26 cannot be completely avoided, a cathodic protection system is provided. The cathodic protection system comprises an electric source 4 and an earth 2 that is arranged within the electrolyte near the structure 1. The electric source drives a current through the structure 1, the electrolyte 3 and the earth 2. The cathodic protection changes the chemical composition of the electrolyte at the coating defects 26, as described further above in detail, by increasing a surface pH and resulting formation of protective oxide films. This ensures corrosion protection, if the protective potential, which is generally provided by the on-potential $E_{on}$, is negative enough. A voltage measurement device 12, which is configured for measuring a DC voltage only, is connected to an electrode 5 (which is a reference electrode having a stable and well defined potential) in contact with the electrolyte 3 and the structure.

The voltage measurement device 12 therefore measures a DC potential between the structure 1 and the electrolyte 3. The measurement is taken while the electric source (i.e., the cathodic protection current) is switched on. Therefore, the measured DC potential is the on-potential $E_{on}$. However, as explained further above in detail, the measured on-potential $E_{on}$ itself is not suitable for determining an effectiveness of the cathodic protection since the measurement includes the structural potential as well as overlaying voltage drops of the protective current flowing into the coating defects 26 (IR-drop). For determining effectiveness of the cathodic protection, the above described increase in pH rather has to be demonstrated by measuring the polarization, that is characterized by the so called IR-free potential $E_{IR-free}$ (potential without voltage drops due to current flow to the coating defects 26).

Figure 2:
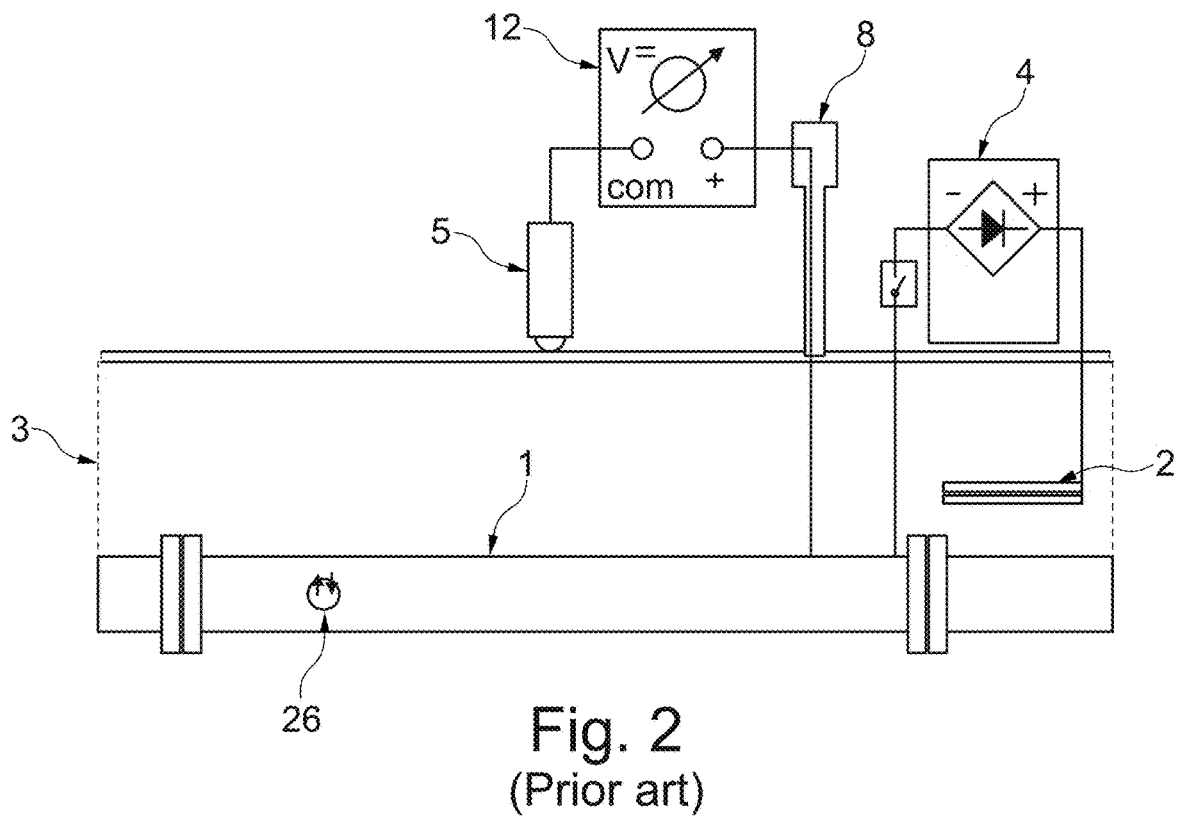
FIG. 2 a schematic overview of another determination of effectiveness of a cathodic protection by measuring the on-potential $E_{on}$ and the off-potential $E_{off}$ according to the prior art.

FIG. 2 show another configuration for determining effectiveness of the cathodic protection according to the prior art. This solutions tries to take the problems described with regard to FIG. 1 into account by also measuring the DC potential between the structure 1 and an electrode 5 in contact with the electrolyte 3 with the protective current interrupted ($E_{off}$). The measurement is taken immediately after interrupting the electric source 4. However, this off-potential $E_{off}$ also is not suitable for determining effectiveness of the cathodic protection, since an off-potential $E_{off}$ is only IR-free, if there is either only one coating defect 26 or if all defects have the same IR-free potential. In the case of one single coating defect 26, it would, in principle be enough to interrupt the cathodic protection current. However, usually, multiple coating defects 26 are present on the structure 1 and they virtually never exhibit the exact same IR-free potential. In case of several coating defects 26 on the structure 1, exchange currents will flow in the electrolyte 3 and the measured potential corresponds to the off-potential $E_{off}$, which is not the IR-free potential $E_{IR-free}$ but can only be an approximation. Therefore, this solution also is not suitable for adequately determining the effectiveness of the cathodic protection.

Figure 3:
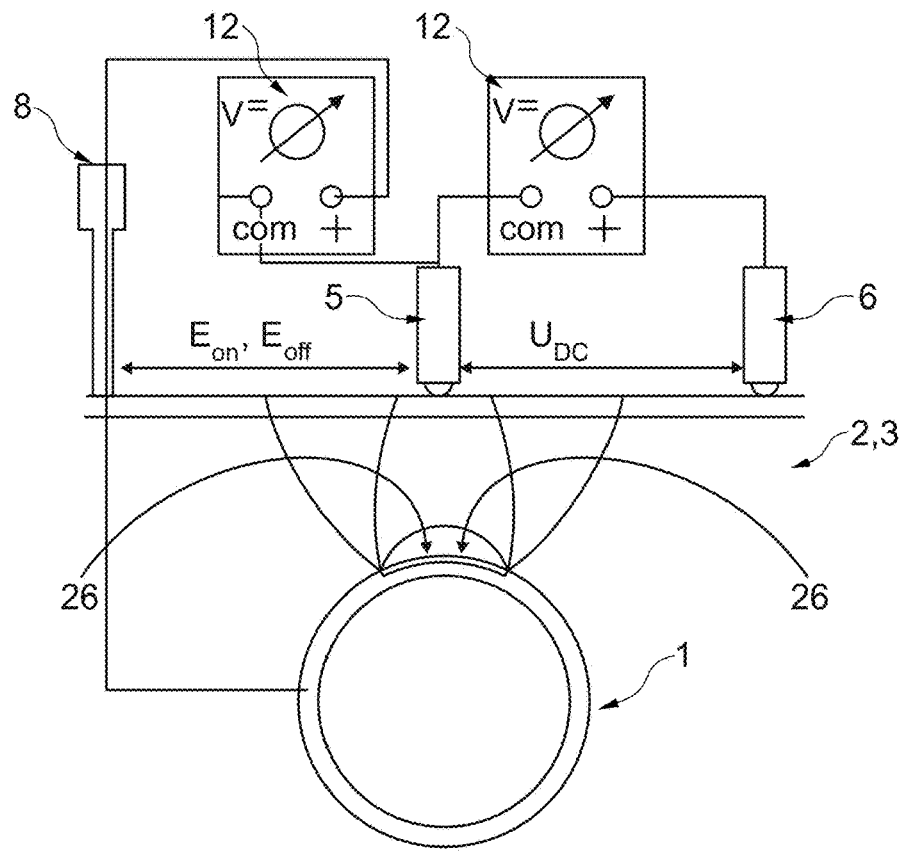
FIG. 3 a schematic overview of intensive measurement (IM) for locating a coating defect in a pipeline according to the prior art (EN ISO 15589-1).

FIG. 3 shows another solution of the prior art, which is the so called Intensive Measurement (IM) according to EN ISO 15589-1. This currently is the only possibility to measure the IR-free potential $E_{IR-free}$. In particular, two voltage measurement devices 12 are provided.

Although the electric source is not shown in FIG. 3, such an electric source also drives a protective DC current through the structure 1. One of the voltage measurement devices 12 (in FIG. 3 on the left) measures the direct potential (DC potential) between the structure itself and the surface above the structure 1 (or rather between the structure and a reference electrode 5 in contact with the electrolyte 3; reference electrodes are in particular necessary for measuring the DC potential because they exhibit a stable and well-defined potential, which provides the reference potential required by the standard (EN ISO 15589-1)). For this, it is connected between the structure 1 and a first electrode 5. The other voltage measurement device 12 (in FIG. 3 on the right) measures a DC voltage ($U_{DC}$) between the first electrode 5 and a second electrode 6, which is placed at a distance to the first electrode 5. Intensive Measurement (IM) determines the voltage drop generated by the current flowing into the coating defect. This allows for localizing coating defects 26 and for extrapolating to current zero and calculating $E_{IR-free}$. IM is based on measuring the DC voltage (potential gradient) $U_{DC}$ and the polarization potential $E_{on}$, $E_{off}$ during on/off of the protective current. However, this method is only applicable to large coating defects 26. Further, it requires reference electrodes and the recording of readings at least every 5 m along the pipeline. Since physical access to the pipeline (or in general structure 1) for measuring $E_{on}$, $E_{off}$ is only possible at test posts 8, which may be spaced at large distances to each other, IM requires long cable connections associated with installing cables of up to several kilometers in length. Further, the resolution of IM depends on the magnitude of $U_{DC}$, which is directly depending on the applied current. Therefore, the DC voltage $U_{DC}$ is too small and cannot be increased for avoiding the increase of the level of polarization and, hence, the IR-free potential of the coating defects on the structure 1. On modern pipelines and other structures 1 with small coating defects 26, it is technically not possibly to appropriately determine effectiveness of the cathodic protection according to EN ISO 15589-1, which is, however, desirable in particular for safety relevant industries such as pipelines, in order to increase safety even further.

Figure 4:
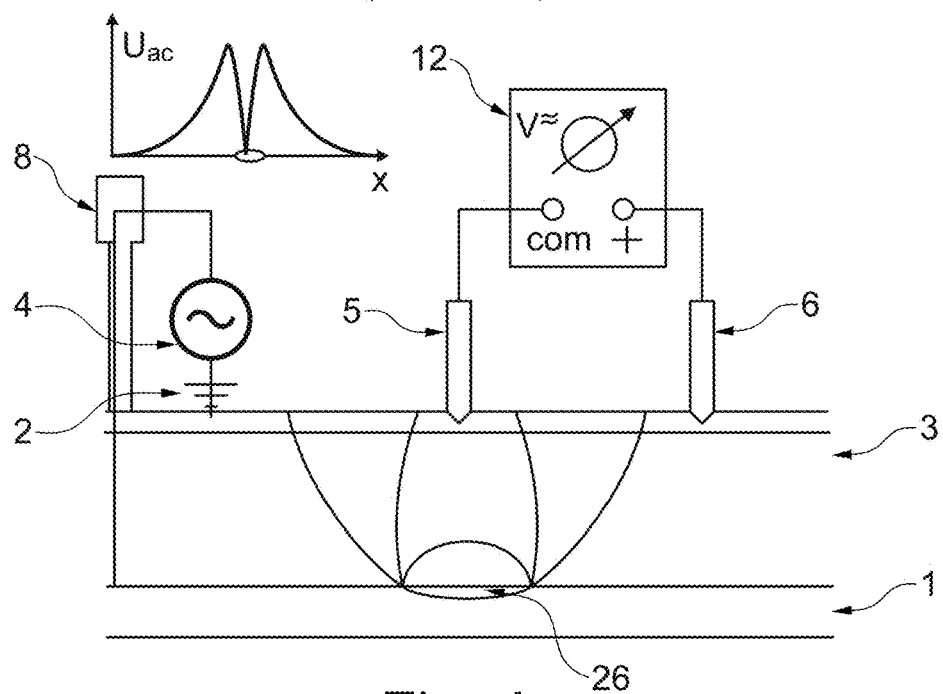
FIG. 4 a schematic overview of an ACVG measurement that only measures AC gradients for locating a coating defect in a pipeline according to the prior art.

FIG. 4 shows another currently available measurement in the prior art, namely Alternating Current Voltage Gradient measurement (ACVG measurement). Instead of switching the protective current on/off, here an AC signal (i.e. an AC current) is provided to the structure 1 by means of the electric source 4 (e.g., via a test post 8). The fast change in polarity allows for fast measurements. Two metal electrodes 5, 6 measure an AC voltage (or voltage gradient) $U_{AC}$ between two points in the electrolyte 3, here on the ground surface. Coating defects 26 can be identified by detecting $U_{AC}$. This method allows for robust metal electrodes instead of reference electrode as the first electrode 5 and the second electrode 6. However, ACVG does not allow to determine $E_{IR-free}$ and therefore also is not suitable for determining effectiveness of a cathodic protection.

While FIGS. 1 to 4 mainly described the current state of the art, FIGS. 5 to 14, described in the following, are directed to the present invention.

Figure 5:
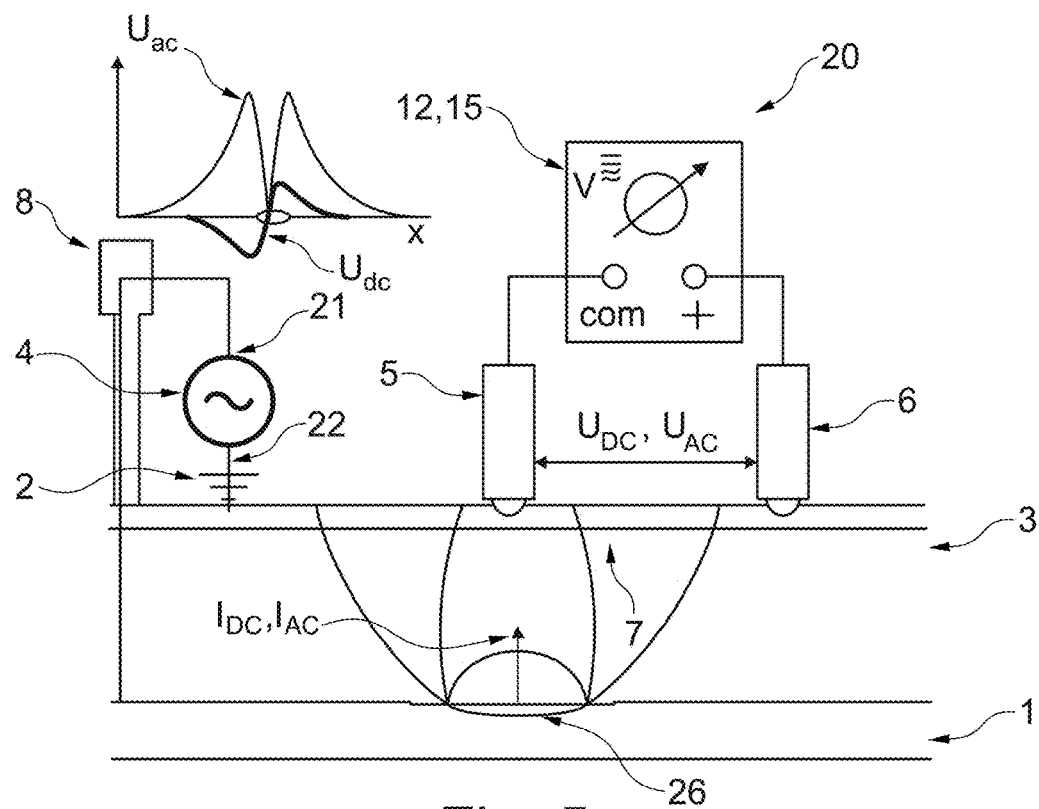
FIG. 5 a schematic overview of a system for assessing a structure arranged in an electrolyte according to the present disclosure.

FIG. 5 shows a system 20 for assessing a structure 1 that is arranged within an electrolyte 3. The system comprises an electric source 4, a voltage measurement device 12 with an integrated processing unit 15, a first electrode 5, and a second electrode 6.

It should be appreciated that the processing unit 15 may also be a separate device that is in communication with the voltage measurement device 12. Such a separate processing unit 15 may further also be arranged remote to the voltage measurement device 12, for example, in embodiments, where a wireless communication is provided (as described herein), or may be arranged directly with the voltage measurement device 12. The voltage measurement device 12 may be any device suitable for measuring a voltage between two terminals (in FIG. 5 "com" and "+"), such as a multimeter. The voltage measurement device 12 is configured to measure both, a DC voltage and an AC voltage and provide it to the processing unit 15.

The first electrode 5 and the second electrode 6 in FIG. 5 are reference electrodes. However, in certain embodiments, the electrodes 5, 6 may also be metal electrodes or a combination of reference electrodes and metal electrodes. The first electrode 5 and the second electrode 6 are, in the depicted example, placed on the ground and at a distance to each other at a measurement location 7. It should be appreciated that in some applications, the electrodes 5, 6 are not placed on solid ground but may, for example, be inserted in sea water (in the case of a underwater pipeline) or in another electrolyte 3.

The electric source 4 is connected with the structure 1 via a first output terminal 21. The structure 1, in the depicted configuration, is, for example, a pipeline, that is buried underground in a ground based electrolyte 3, such as soil. However, the structure 1 may also be any other metallic structure 1 in any other electrolyte 3, such as, for example, a pipeline in sea water. A second terminal 22 of the electric source 4 is connected to an earth 2, which may, for example, be provided by the electrolyte 3 itself. The electric source 4 may be an electric source 4 that is also used to provide the protective current (DC current) of a cathodic protection system. However, it may also be a separate (additional) electric source 4 or induced current by stray fields may be used, as has already been described further above. In the shown configuration, the electric source 4 is connected to the structure 1 via a test post 8. Such test posts 8 may be arranged at regular distances along the structure 1. The electric source 4 is configured to provide a DC current as well as an AC current having at least one frequency component within the structure 1. The provision of both, an DC current and an AC current, and the measurement of both, a DC voltage and an AC voltage as well as a DC potential and an AC potential, as described herein, is one of the core features of the invention.

The structure 1 is coated by a coating (not explicitly shown) that separates the metallic structure 1 from the electrolyte 3. As illustrated, the structure 1 has one coating defect 26. It should be appreciated that in reality, a structure 1 such as a pipeline has multiple such coating defects 26. Corrosion of the structure 1 at such coating defects 26 is avoided by a cathodic protection system, as already described further above in detail. The anode of such a cathodic protection system is not shown in FIG. 5.

Providing a DC current and an AC current within the structure 1, measuring a DC voltage $U_{DC}$ and an AC voltage $U_{AC}$, and determining both the DC potential $E_{DC}$ (which may correspond to $E_{on}$, i.e. the DC potential measured between the structure 1 and the electrolyte 3 (or rather between the structure 1 and an additional electrode (not shown) in contact with the electrolyte 3) and the AC potential $E_{AC}$ (that results from the applied AC current), it is possible to determine the IR-free potential $E_{IR-free}$ based on the following equation:

$$E_{IR-free} = E_{DC} + \frac{U_{DC} \cdot E_{AC}}{U_{AC}}$$

Therefore, the disclosed system allows for assessing the effectiveness of the cathodic protection. However, also any other property of the structure 1 may be assessed that depends on at least some of these variables. The DC potential $E_{DC}$ and the AC potential $E_{AC}$ can be determined in various ways. When directly measuring these potentials, physical access to the structure 1 is necessary. In order to do that, the DC and AC potentials can, for example, be measured at two test posts 8, that are near the measurement location 7 in both directions along the structure 1 and can be interpolated for the specific measurement location 7 between these test posts 8. Such measurements of $E_{DC}$ and $E_{AC}$ comprise taking measurements using reference electrodes (at least one additional electrode, in addition to the first electrode 5 and the second electrode 6) in contact with the electrolyte 3, in order to provide the necessary reference potential. In certain embodiments, as described further below with regard to FIG. 8, the corresponding measurement values for $E_{DC}$ and $E_{AC}$ can be transmitted to the processing unit 15 via a wireless communication. However, $E_{DC}$ and $E_{AC}$ can also be measured indirectly, for example by measuring electromagnetic fields (CMI), as described below with regard to FIG. 6 and in detail in the priority application for the present application, which is incorporated into this application. CMI is capable of determining the intensity and the phase shift of the primary current flowing in the structure.

The primary current and the associated phase shift allows for reconstructing $E_{AC}$ along the structure. All of these methods avoid the necessity of having trailing cables.

Figure 6:
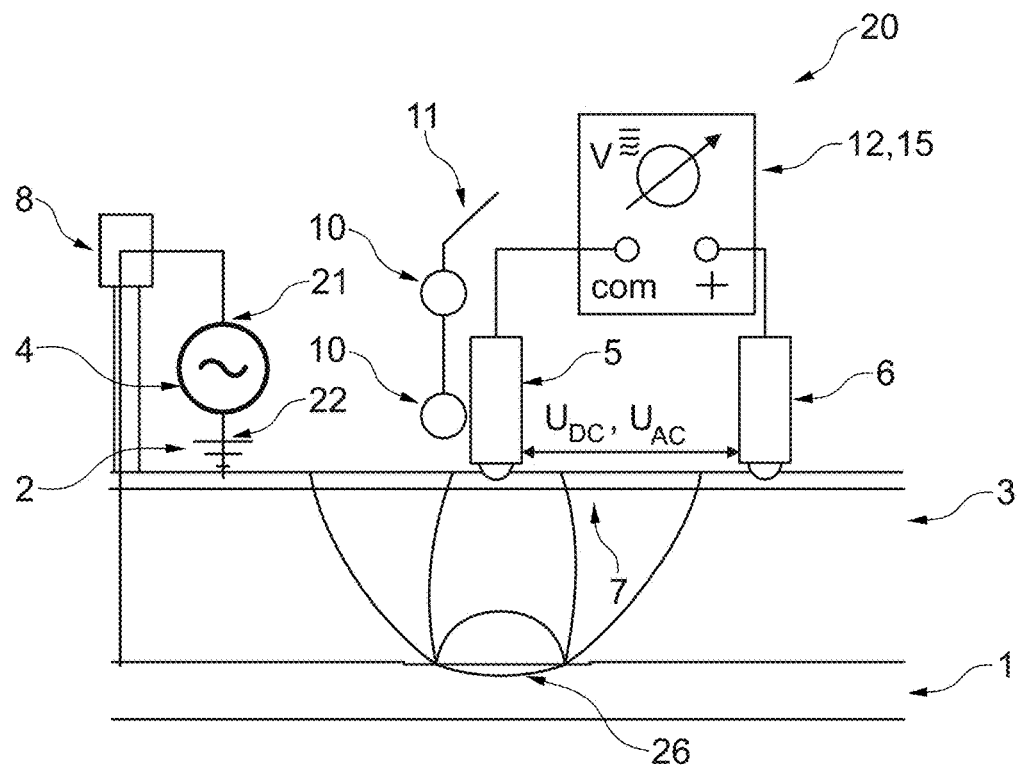
FIG. 6 a schematic overview of the system of FIG. 5 with added magnetic measurement sensors for measuring a primary current.

FIG. 6 shows a similar system 20 to FIG. 5. However, in FIG. 6, an additional electromagnetic measurement device 11 is provided, that is connected to the processing unit 15. The electromagnetic measurement device 11 comprises at least one electromagnetic field sensor 10. Preferably, multiple such electromagnetic field sensors 10 are provided that measure electromagnetic fields in all spatial orientations and at different distances to the structure 1, as described in the priority application in detail. Since every current that flows within a structure 1 or in general in one direction generates an electromagnetic field from these electromagnetic field measurements, in particular a primary current $I_{DC,P}$ (associated with the DC current provided to the structure 1) and a primary current $I_{AC,P}$ (associated with the AC current provided to the structure 1) along the structure 1 can be determined. Also, any current, such as a secondary current $I_{AC,S}$, $I_{DC,S}$ that flows from the structure 1 into the electrolyte 3, can be determined from these measurements, either directly or from the primary currents $I_{DC,P}$, $I_{AC,P}$. The DC potential $E_{DC}$ and the AC potential $E_{AC}$ can then be reconstructed from these electromagnetic field measurements and can be used in determining $E_{IR-free}$, as described above.

Figure 7:
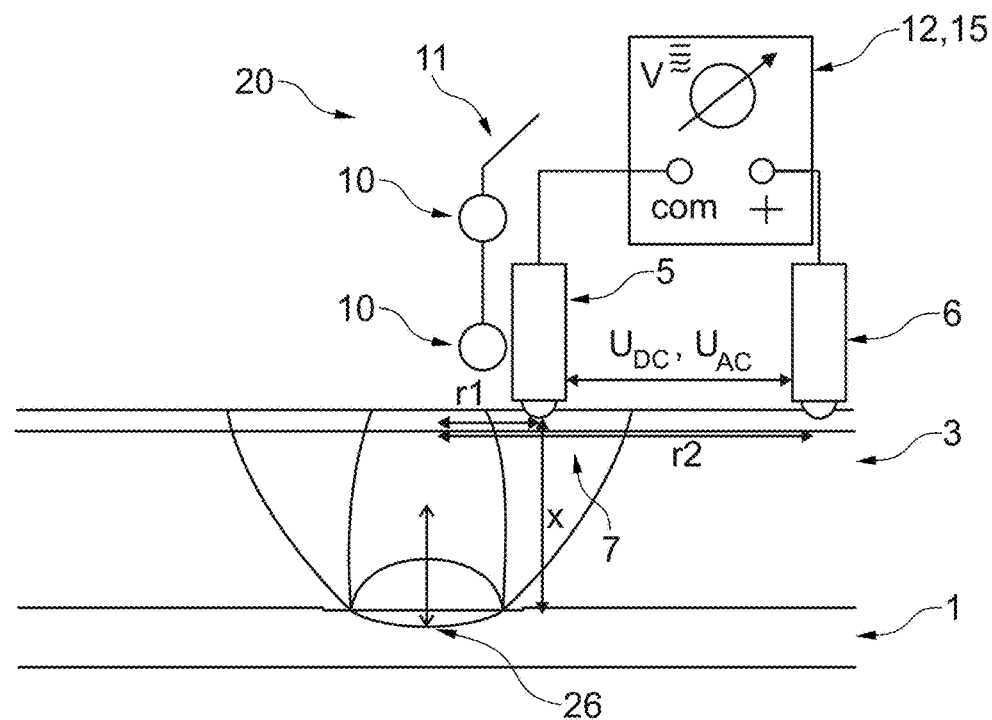
FIG. 7 a schematic representation of parts of the system of FIG. 6, illustrating the geometric relationships used for determining an electrolyte resistivity.

FIG. 7 shows a part of the system of FIG. 6, in particular the voltage measurement device 12 with processing unit 15, the first electrode 5, the second electrode 6, the electromagnetic measurement device 11 having the electromagnetic measurement sensors 10. Further, these parts of the system 20 of FIG. 6 are again shown above a coating defect 26 in a structure 1 (e.g., pipeline). The structure 1 exemplary illustrated is a pipeline. Electrodes 5 and 6 are arranged at a lateral distance x above the structure 1. The first electrode is arranged at a longitudinal distance $r_1$ from the coating defect 26 and the second electrode is arranged at a longitudinal distance $r_2$ from the coating defect 26. Based on these variables (which may, for example, be determined by the electromagnetic field measurements), the determined DC voltage $U_{DC}$, and the determined secondary current $I_{AC,S}$ (leakage current) passing between the electrolyte 3 and the structure 1 through the coating defect 26, as described above, an electrolyte resistivity $\rho$ can be determined as follows:

$$\rho = \frac{U_{AC} \cdot 2}{I_{AC,S} \cdot F}$$

Where F is a formfactor, that depends on the variables $r_1$, $r_2$, and x as follows:

$$F = \sqrt{\frac{r_1^2 + x^2}{r_2^2 + x^2}}$$

This determined electrolyte resistivity can then be used to determine the required protection potential $E_p$ in accordance with EN ISO 15589-1.

Figure 8:
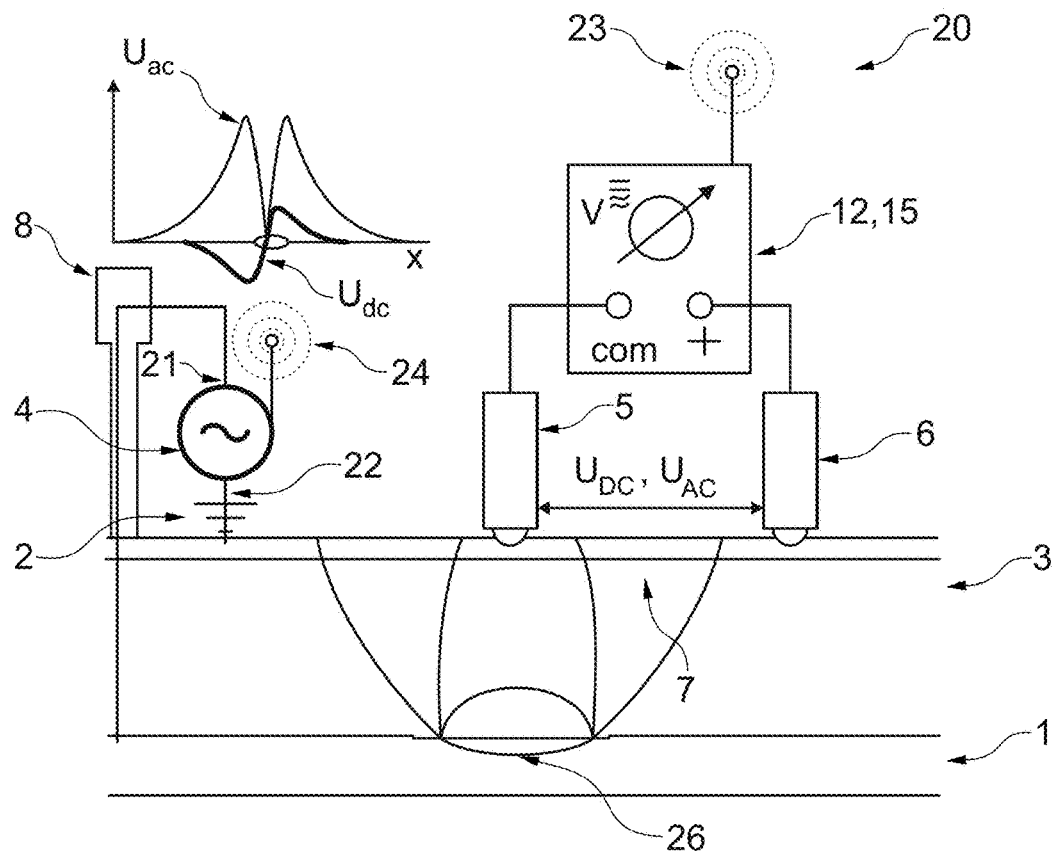
FIG. 8 a schematic overview of a system for assessing a structure within an electrolyte with added wireless communication devices.

FIG. 8 shows another modification of the system 20 of FIG. 5 which differs from the system in FIG. 5 in that a first communication device 23 and a second communication device 24 are provided.

The first communication device 23 is connected to the voltage measurement device 12 and/or the associated processing unit 15. The second communication device 24 may be connected to the electric source 4. However, there may also be multiple such communication devices 24, for example at test posts 8 or rather at voltage measurement devices at these test posts 8, that measure the DC potential $E_{DC}$ and the AC potential $E_{AC}$ at these test posts. These measured potentials may then be extrapolated to the actual measurement location 7, as described herein further above in detail. The first communication device 23 and the second communication device 24 establish a wireless communication between the corresponding devices to which they are attached. Alternatively to a wireless communication, it is also conceivable that a wired communication is established in that corresponding cables are routed along the longitudinal extension of the structure 1, wherein the cables have multiple interfaces at the surface along the structure 1 for connecting the voltage measurement device 12 (or the associated processing unit 15) with them.

Using the wireless (or wired) communication, the measurement values for $E_{DC}$ and $E_{AC}$ can be transmitted to the processing unit 15 and/or voltage measurement device 12. Further, upon the detection of a coating defect 26, the voltage measurement device 12 (or the associated processing unit 15) sends a command to the electric source to increase the AC current. This, in turn, increases the AC voltage $U_{AC}$ that is measured at the measurement location 7 and allows for a more reliable determination of the IR-free potential $E_{IR-free}$. By this, the interference to the structure 1 is minimized and therefore the safety of persons is maximized by means of the communication.

Figure 9:
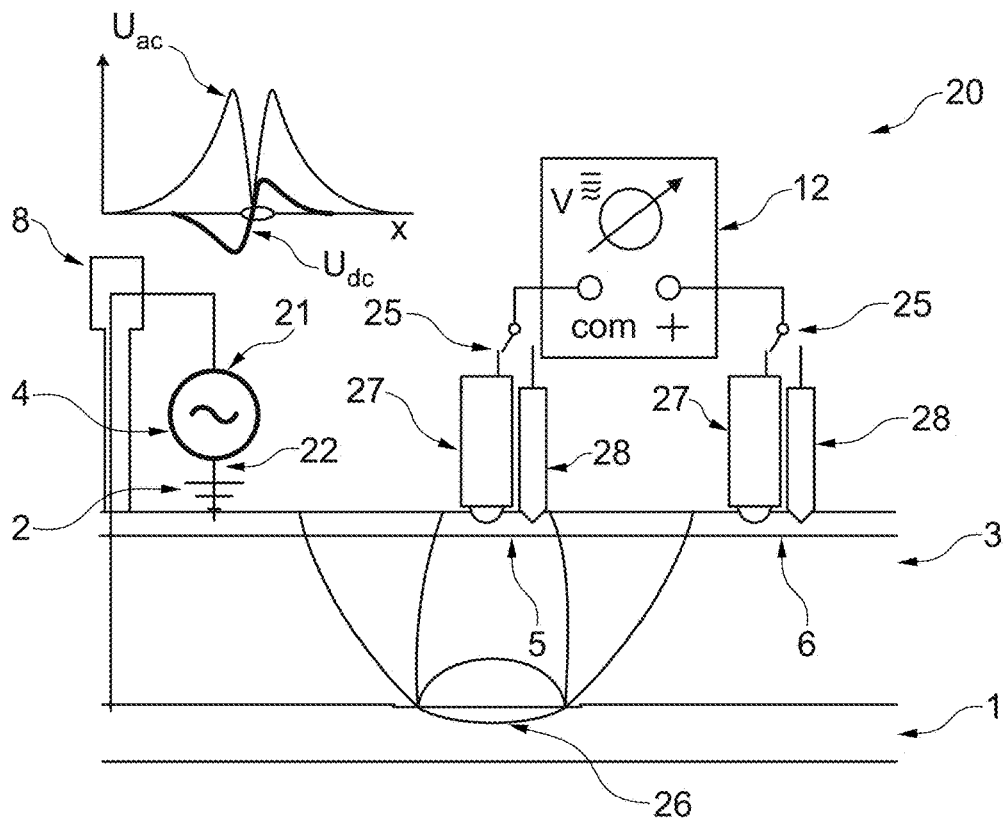
FIG. 9 a schematic overview of a system for assessing a structure within an electrolyte, where the first electrode and the second electrode each are electrode assemblies having switchable reference electrodes and metal electrodes.

FIG. 9 shows another modification of the system 20 of FIG. 5. Here, the first electrode 5 and the second electrode 6 are each electrode assemblies comprising a reference electrode and a metal electrode.

Reference electrodes, on the one hand, have a stable and well defined potential. Metal electrodes, on the other hand, do not have such a stable and well defined potential. However, metal electrodes are rugged and do not require maintenance or calibration (such as reference electrodes). In particular, stainless steel electrodes can be used as metal electrodes, since these are protected against corrosion by means of a passive film that spontaneously forms on the metal surface. With metal electrodes, when they are inserted into the soil surface (electrolyte 3), the abrasive effect removes, at least partially, the oxide film from the metal. This results in transient potential variations as a result of the reformation of the oxide film. This transient behavior affects the data analysis and compromises the results. This effect is particularly disturbing because according to the invention not only the AC voltage $U_{AC}$, but also the DC voltage $U_{DC}$ is to be assessed for the determination of $E_{IR-free}$ (or another property of the structure 1). The most straightforward solution would be using only reference electrodes because reference electrodes do not show transient behavior. Since the use of reference electrodes has the disadvantage that they, unlike metal electrodes, require maintenance and calibration, using only reference electrodes is time consuming and costly. This issues associated with reference electrodes can be overcome by performing the measurements first with metal electrodes. Once a coating defect 26 is located, the metal electrodes are switched to reference electrodes, for example by means of a switch 25. The reference electrodes may, for example, also have a linear motor or similar actuator, such that these electrodes only touch the ground when necessary. This limits the use of the sensitive reference electrodes to only a fraction of the survey. The rugged and fast metal electrodes are used on most parts of the structure

1 (most measurements are to identify/locate coating defects in the first place), while still allowing maximum resolution at the relevant measurement locations, where coating defects 26 have actually been identified.

Figure 10:
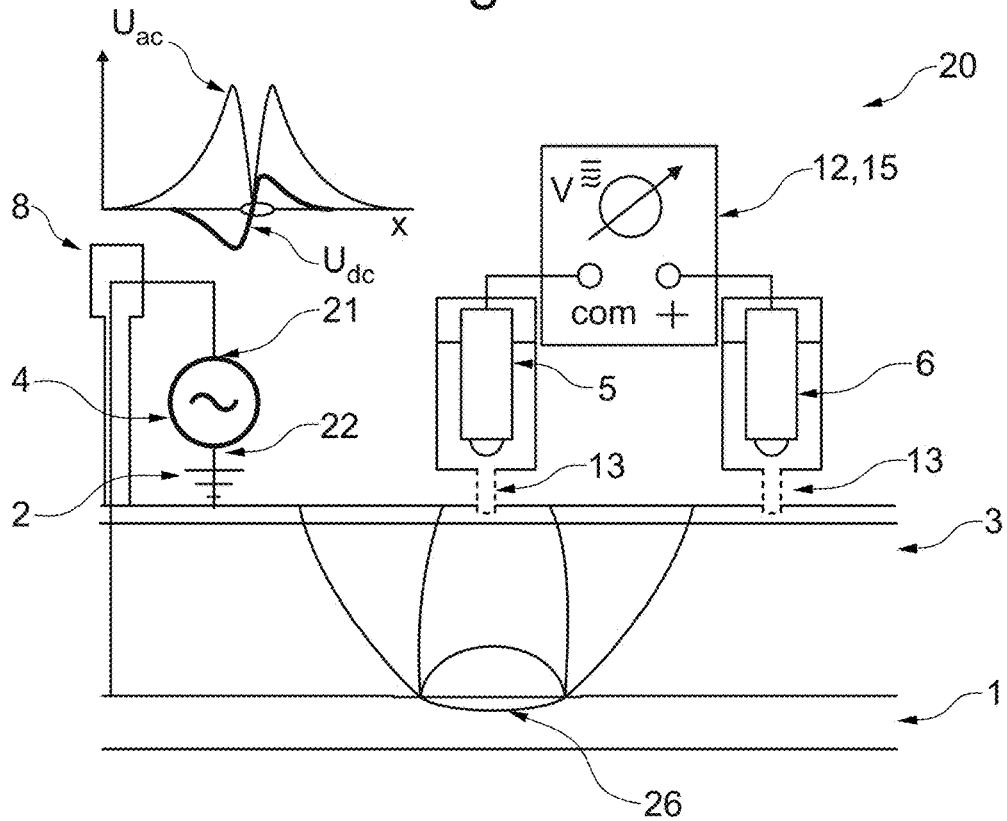
FIG. 10 a schematic overview of a system for assessing a structure within an electrolyte utilizing an electrolyte bridge in the form of electrode electrolyte containers.

FIG. 10 shows another modification of the system 20 of FIG. 5. The system of FIG. 10 has been adapted by adding an electrolyte bridge 13 for each electrode 5, 6. The contact of the electrodes 5, 6 to the electrolyte 3 is crucial for reliable readings. In particular in dry conditions, a wetting of the surface of the electrolyte 3 may be required for establishing low resistive and well defined contact of the electrodes 5, 6 with the electrolyte 3. Therefore, in the system 20 of FIG. 10, the additional electrolyte bridges 13 are provided to that effect. Each electrode 5, 6 is placed within a tank that is filled with an electrode electrolyte. A water stream or water flow from this electrode electrolyte tank to the electrolyte 3 may then be provided that acts as electrolyte bridge 13. The use of such a water flow to only the measurement locations 7, where a coating defect 26 has been determined, water consumption can be kept small and maximum resolution and reliability is obtained for the determination of, e.g., the IR-free potential afterwards. Further, by preventing direct contact between a reference electrode and the electrolyte 3, the stability of the measurement is increased.

Figure 11:
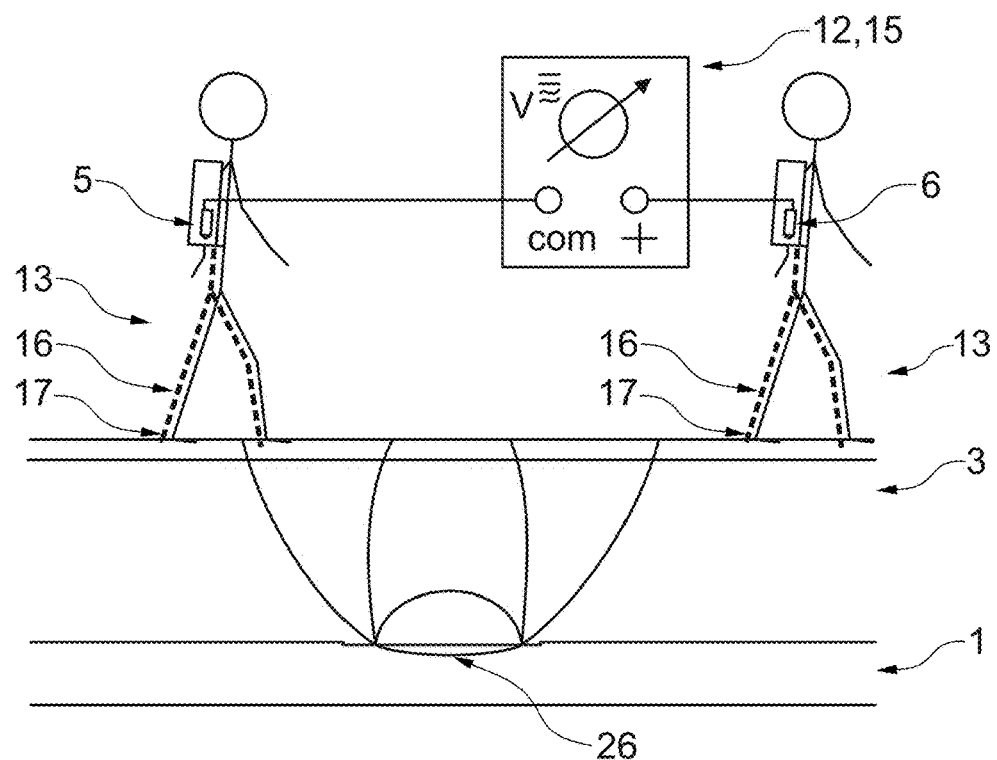
FIG. 11 a schematic representation of an alternative electrolyte bridge system having persons carrying electrode electrolyte containers with tubes and wicks.

FIG. 11 shows another alternative for electrolyte bridges 13. Here, two persons each carry one of the first electrode 5 and the second electrode 6 in a corresponding tank that is filled with an electrode electrolyte (such as an aqueous NaCl solution). These tanks may, for example, be backpack like. The electrodes 5, 6 may, e.g., be silver wires coated with AgCl. This provides a stable potential and minimizes errors by diffusion potentials. A pipe 16 extend from the corresponding tank to the foot of the corresponding person. The pipe is connected to a wick 17 at each foot. Contact to the electrolyte 3 may then, for example, be established at each foot via the pipe 16 and the wick 17. The wick 17 may, e.g., consist of a rope exhibiting capillary forces. This provides for a durable and rugged electrolyte contact. The processing unit 15 and the voltage measurement device 12 (that is connected to each of the electrodes 5, 6) may also be collectively carried by the two people. The processing unit 15 may, for example, be configured to carry out the corresponding measurements automatically as the persons walk along the structure 1.

Figure 12:
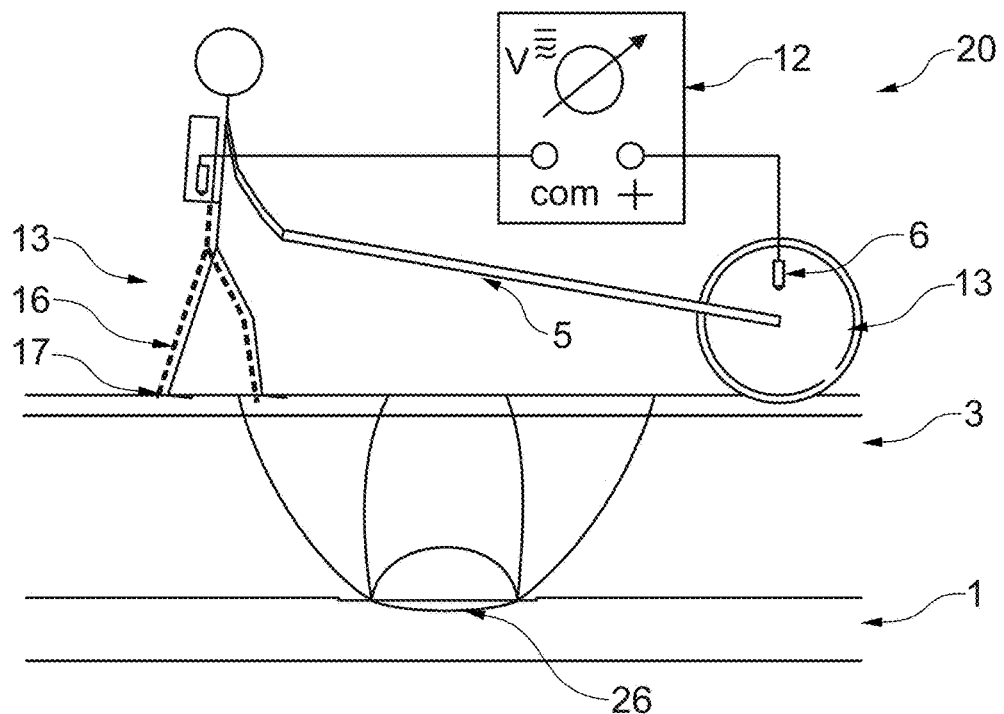
FIG. 12 a schematic representation of another alternative electrolyte bridge system, where one of the persons of FIG. 11 is replaced by a rotating electrode with an electrode electrolyte purposely leaking from the inside of the rotating electrode.

FIG. 12 shows an alternative for an electrolyte bridge 13. This configuration deviates from FIG. 11 in that one of the persons (in particular the person carrying the electrode 6 in FIG. 11) is replaced by a rotating electrode 6. The remaining person pushes the rotating electrode (which builds the second electrode 6) over the ground, wherein the electrolyte contact is achieved by an electrode electrolyte that is leaking from an inside of the rotating electrode into a textile (e.g., a felt). This allows for measuring with only one person. It should be appreciated that the configurations of FIGS. 10 to 12 are only examples. It may, for example, also be conceivable that a self-driving vehicle having rotating electrodes as wheels drives over the ground, controlled by the processing unit 15 or another computer, and takes all the measurements automatically. For example, in such an embodiment, at least one front wheel may build the first electrode 5 and at least one rear wheel may build the second electrode 6.

Figure 13:
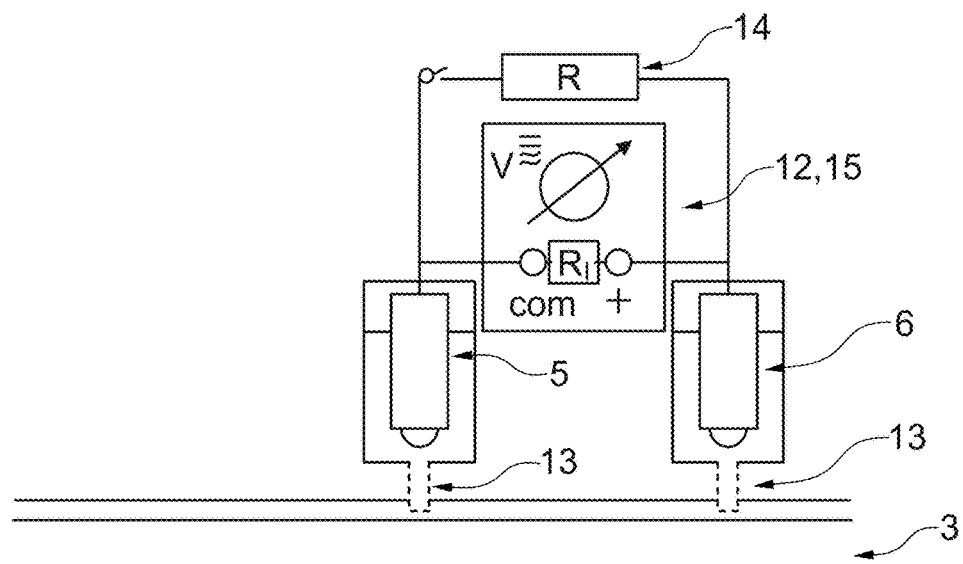
FIG. 13 a schematic overview of parts of a system for assessing a structure within an electrolyte utilizing an electrolyte bridge in the form of electrode electrolyte containers, where a large resistor is added for determining necessary electrode electrolyte flow of an electrolyte bridge.

FIG. 13 shows parts of a system 20, such as the system 20 of FIG. 10, where electrodes 5, 6 with different electrode materials with deviating potentials are used as the first electrode 5 and the second electrode 6. A resistor 14 (R) having a relatively large resistance (for example in the range of 1 Ω to 1000 MΩ) is connected between the first electrode 5 and the second electrode 6 in parallel to the voltage measurement device 12. The processing unit 15 is configured to regularly connect the resistor 14 and to take measurements of $U_{DC}$ with the resistor 14 connected and with the resistor 14 disconnected. The processing unit 15 is further configured to compare the measurement of the first DC voltage $U_{DC,1}$ taken without the resistor 14 connected with the measurement of the second DC voltage $U_{DC,2}$ taken with the resistor 14 connected, and, if a difference between the first DC voltage $U_{DC,1}$ and the second DC voltage $U_{DC,2}$ is above a threshold value (for example 1% of one of the values), enhancing the electrolyte bridge 13, for example by increasing electrode electrolyte (e.g., water) flow. If the difference is above the threshold value, this may be a sign that in dry conditions not enough electrode electrolyte is used for at least one of the electrolyte bridges 13. In dry conditions it may be necessary to apply larger quantities of electrode electrolyte due to an increased circuit resistance between the two electrodes 5, 6. Alternatively, the true value of $U_{DC}$ and $U_{AC}$ may be determined by means of $U_{DC,1}$, $U_{DC,2}$, the resistance R and the input impedance or internal resistance $R_I$ of the voltage measurement device 12. This procedure allows for assessing the data quality and provides the data for correcting the errors. This is crucial for reliable data under dry conditions.

Figure 14:
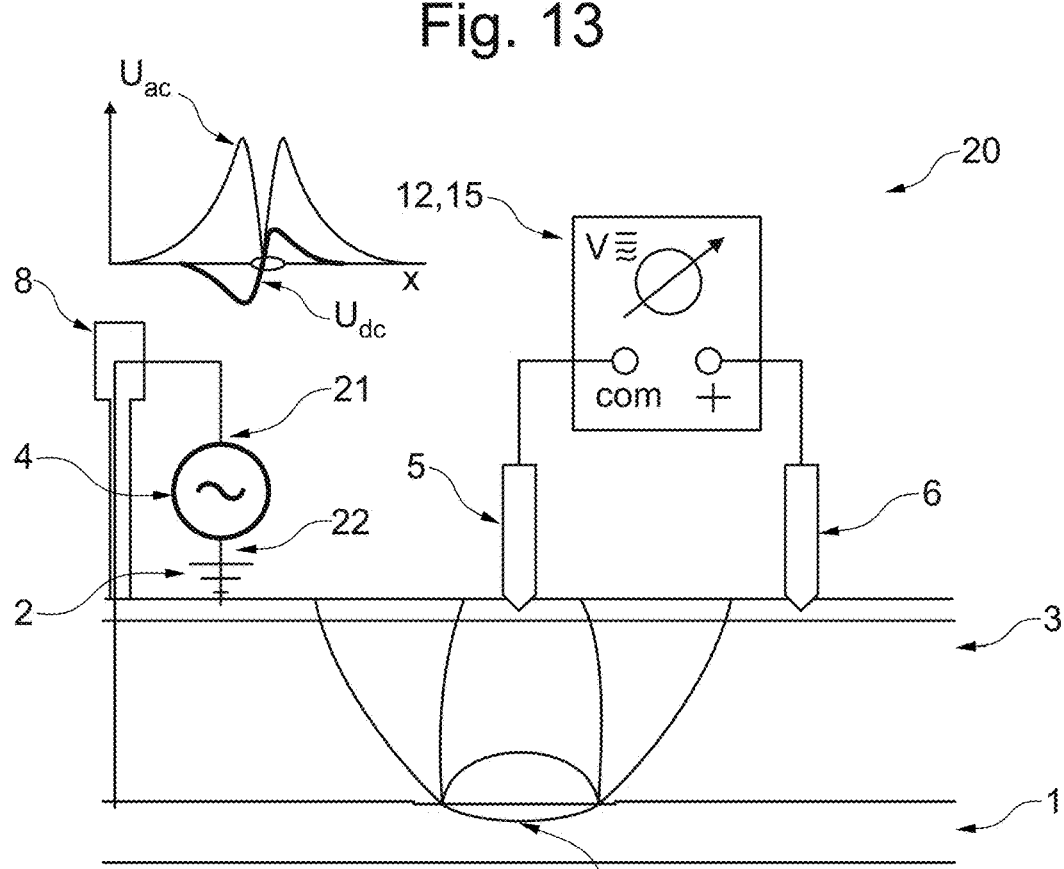
FIG. 14 a schematic overview of another system for assessing a structure within an electrolyte that utilizes certain metal electrodes particularly suitable for measurements in dry condition.

FIG. 14 shows another alternative configuration of the system 20 of FIG. 5. Here, metal electrodes are used as the first electrode 5 and the second electrode 6. In dry conditions the wetting of the electrolyte by means of an electrolyte bridge 13 (as in FIGS. 10 to 13) with water can generate streaming potentials, which may disturb the value of $U_{DC}$ and hence affect the precision of the measurement of $E_{IR\text{-}free}$. This problem is overcome by using metal electrodes 5, 6 without liquid junction to the electrolyte 3. The potential of these metal electrodes 5, 6 in an electrolyte 3 (e.g. soil, water or sea water) is determined by at least two electrochemical reactions taking place. These are typically: Metal oxidation, and Oxygen or water reduction. The metal oxidation of most metals results in the formation of oxide films that significantly affect the potential of the electrode. Consequently, there are key requirements for the choice of the metal: The metal must corrode under water reduction eliminating the influence of oxygen availability; The oxide film formation must be slow; The oxide film must be removed by grinding with the particles of the electrolyte 3; The oxide film may not be electron conductive to avoid effects of residual film patches on the potential of the electrode. Based on these parameters, the metals Na, Li, Be, Mg, Zn, Al, In, Ta, W, Mn, Mo, Cu, Fe, Pt, Ni Co, and Cr seem to be particularly useful as electrodes 5, 6. The use of these metals provides a combination of more stable readings of $U_{AC}$ as well as $U_{DC}$ by eliminating transients and liquid junction potentials.

Figure 15:
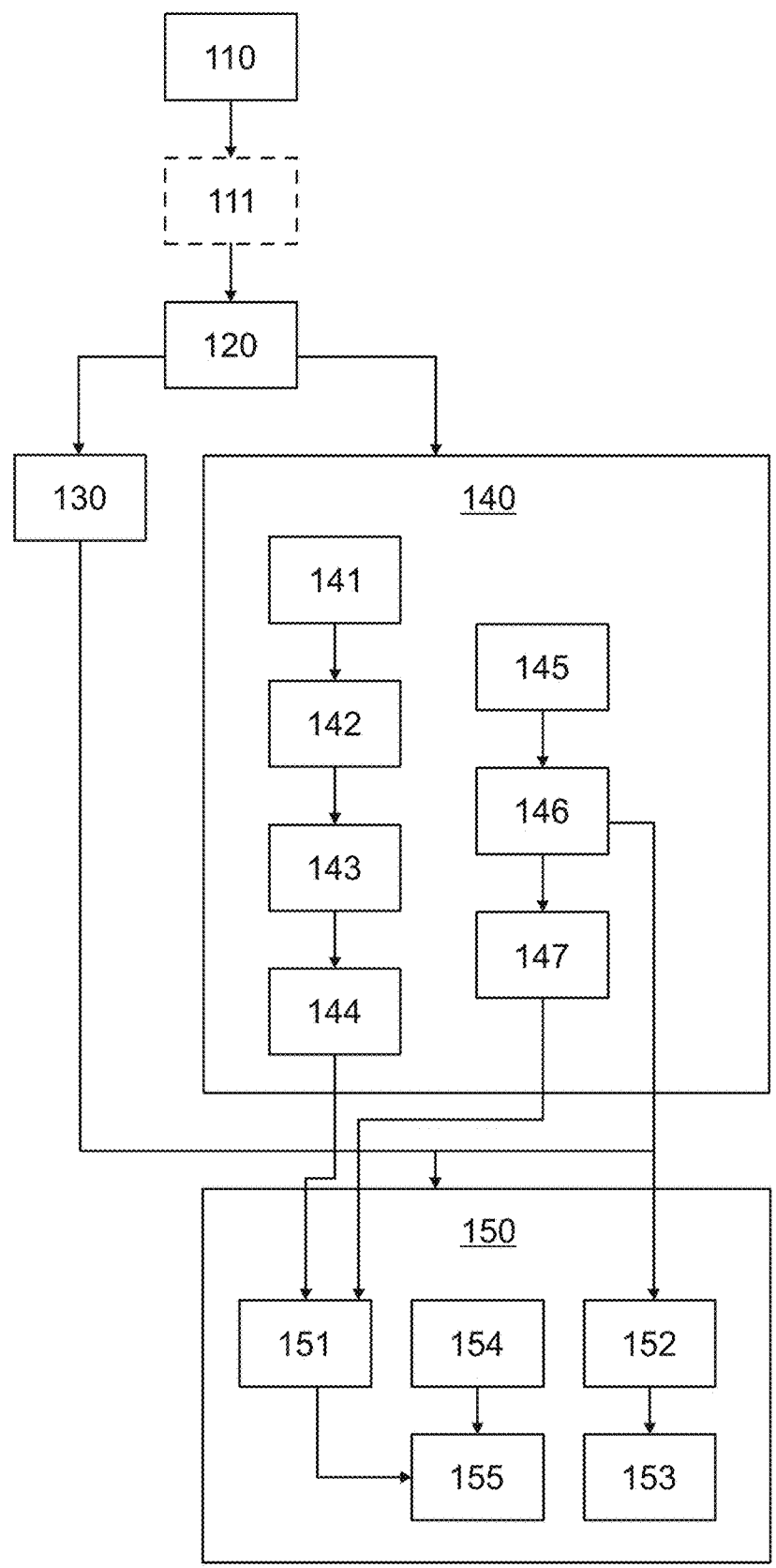
FIG. 15 a flow diagram of a method for assessing a structure arranged in an electrolyte, that can, for example, be carried out by a system according to FIGS. 1 to 14.

FIG. 15 is a flow diagram of a method 100 for assessing a structure 1 that is arranged in an electrolyte 3. The method steps have already been described in conjunction with the description of the system 20 with regard to FIGS. 1 to 12. Therefore, in the following, the method steps will only be described very briefly. The following description will simultaneously also refer to FIGS. 1 to 12.

The method 100 starts with connecting 110 an electric source 4 between a structure 1 and an earth 2. Earth 2 (meaning an earth potential) may, for example, be an anode, reinforcing steel, or any other low resistive contact to earth. In particular, a first output terminal 21 of the electric source 4 may be connected to the structure 1 (for example via a test post 8) an a second output terminal 22 of the electric source 4 may be connected to the earth 2.

The method 100 then proceeds with providing 120 a direct current (DC current) and an alternating current (AC current) within the structure 1 by driving it with the electric source 4. A DC current in the sense of this application in particular means a current having a frequency of 10 Hz or less. The AC current may comprise frequencies in the range between 1 Hz and 10 Hz (preferably more than 10 Hz) on the lower end and between 5 kHz and 100 kHz on the upper end. Further, the AC current may comprise any appropriate signal shape that is changing over time. For example, the AC current may be a sine waveform, a rectangular waveform, a triangular waveform, delta peaks (very short pulses), or any other alternating signal shape.

In a step 130, a DC voltage $U_{DC}$ and an AC voltage $U_{AC}$ are measured between a first electrode 5 and a second electrode 6 after the electrodes 5, 6 have been brought into contact with the electrolyte 3 at a distance to each other at a measurement location 7. For this, the electrodes 5, 6 are both connected to a voltage measurement device 12.

In a step 140, a DC potential $E_{DC}$ and an AC potential $E_{AC}$ between the structure 1 and at least one additional electrode that is in contact with the electrolyte 3 is determined in any suitable way, such as by interpolation between test posts 8 (steps 141 to 144) or by measuring magnetic fields (steps 145 to 147) at the measurement location 7, as has both been described in detail above.

In the interpolation case, step 140 may comprise the following substeps 141 to 144:

Step 141: measuring 141 a first DC potential $E_{DC}$ and a first AC potential $E_{AC}$ between the structure 1 and a first additional electrode (from the type of a "reference electrode", as defined herein) arranged at a first test post 8. Step 142: measuring a second DC potential $E_{DC}$ and a second AC potential $E_{AC}$ between the structure 1 and a second additional electrode (also a reference electrode) arranged at a second test post 8, wherein the second test post 8 is arranged at a distance to the first test post 8. Step 143: determining 143 an interpolated DC potential ($E_{DC}$) at the measurement location 7 based on the first DC potential ($E_{DC}$) and the second DC potential ($E_{DC}$). Step 144: determining 144 an interpolated AC potential $E_{AC}$ at the measurement location 7 based on the first AC potential $E_{AC}$ and the second AC potential $E_{AC}$. Steps 141 and 142 may also be carried out simultaneously. Also, steps 143 and 144 may be carried out simultaneously. The AC potentials $E_{AC}$ and the DC potentials $E_{DC}$ at the test posts 8 are measured using the first additional electrode and the second additional electrode in contact with the electrolyte 3 because these reference electrodes provide the necessary reference potential in order to determine the IR-free potential. In the magnetic measurement case, step 140 may comprise the following substeps 145 to 147:

Step 145: measuring an electromagnetic field at the measurement location 7 with at least one electromagnetic field sensor 10 of an electromagnetic measurement device 11, wherein the electromagnetic field to be measured is associated with a primary current $I_{AC,P}$ (AC component) and/or $I_{DC,P}$ (DC component) within the structure 1 and/or a secondary current $I_{AC,S}$ (AC component) and/or $I_{DC,S}$ (DC component) from the structure 1 into the electrolyte 3 at the measurement location 7 resulting from the AC current imposed on the structure 1. Step 146: determining the primary current $I_{AC,P}$ and/or $I_{DC,P}$ and/or the secondary current $I_{AC,S}$ and/or $I_{DC,S}$ based on the measured electromagnetic field. Step 147: calculating the AC potential $E_{AC}$ and/or the DC potential $E_{DC}$ from these currents.

The substeps 141-144 and 145-147 may also be carried out both in parallel, in order to build redundancy. However, it is also possible to carry out only one of these groups of steps.

Steps 130 and 140 (including the substeps 141 to 144 and/or 145 to 147) may occur simultaneously, as illustrated, or may also occur sequentially.

In a step 150, at least one property of the structure 1 is assessed based on the measured DC voltage $U_{DC}$, the measured AC voltage $U_{AC}$, the DC potential $E_{DC}$, and the AC potential $E_{AC}$. Such an assessment may be the assessment of any property that depends on these variable. In the simplest case, step 150 comprises simply the determination of the IR-free potential $E_{IR-free}$ (step 151) at the measurement location 7 based on the measured DC voltage $U_{DC}$, the measured AC voltage $U_{AC}$, the DC potential $E_{DC}$, and the AC potential $E_{AC}$. This has been described in detail further above. This may either be the end result of step 150, or, for example, steps 154 and 155, may follow.

Step 154 may comprise locating a coating defect 26, in particular based on the DC voltage $U_{DC}$ and the AC voltage $U_{AC}$. This may in particular be done, by repeating steps 130 along the structure 1, until a coating defect 26 has been found. In a step 155, after a coating defect 26 has been found in step 154, the effectiveness of a cathodic protection can be determined based on the IR-free potential $E_{IR-free}$ that has been determined in step 151.

The assessing step 150 may also comprise, in a method step 152, calculating an electrolyte resistivity. This may be done with the determined secondary current $I_{AC,S}$, as described herein further above in more detail with regard to the system 20 and with regard to method steps 145 and 146 and with the determined AC voltage $U_{AC}$, as measured in step 130. Further, after determining the electrolyte resistivity in step 152, a required protection potential $E_P$ may be determined in step 153 based on the determined electrolyte resistivity, as has been described in detail herein further above.

It should be noted that "comprising" or "including" does not exclude other elements or steps, and "one" or "a" does not exclude a plurality. It should further be noted that features or steps that have been described with reference to any of the above embodiments may also be used in combination with other features or steps of other embodiments described above. Reference signs in the claims are not to be regarded as limitation.

LIST OF REFERENCE SIGNS AND VARIABLES 1 structure
2 earth, e.g., anode, earth electrode, or any other low resistive contact to earth
3 electrolyte
4 electric source
5 first electrode
6 second electrode
7 measurement location
8 test post
10 electromagnetic field sensor
11 electromagnetic measurement device
12 voltage measurement device
13 electrolyte bridge
14 resistor
15 processing unit
16 pipe
17 wick
20 system for assessing a structure 21 first output terminal
22 second output terminal
23 first communication device
24 second communication device
25 switch
26 coating defect
27 reference electrode
28 metal electrode
$E_{on}$ on-potential
$E_{DC}$ direct potential
$E_{AC}$ alternating potential
$U_{DC}$ direct voltage
$U_{AC}$ alternating voltage
$I_{AC,P}$ primary current (AC component)
$I_{DC,P}$ primary current (DC component)
$I_{AC,S}$ secondary current (AC component)
$I_{DC,S}$ secondary current (DC component)
$E_{IR-free}$ IR-free potential
$E_p$ protection potential
$\rho$ resistivity of electrolyte
100 method
110 connecting electric source
111 establishing communication
120 providing currents to the structure
130 measuring DC voltage and AC voltage
140 determining DC potential and AC potential
141 measuring first DC potential and first AC potential at first test post
142 measuring second DC potential and second AC potential at second test post
143 determining interpolated DC potential
144 determining interpolated AC potential
145 measuring electromagnetic field
146 determining secondary current
147 calculating AC potential and DC potential
150 assessing property of structure
151 determining IR-free potential ($E_{IR-free}$)
152 calculating electrolyte resistivity
153 determining required protection potential
154 locating coating defect
155 determining effectiveness of cathodic protection Current Magnetometry Inspection (CMI)

In the following, Current Magnetometry Inspection (CMI), as described with regard to claim 3 of the present application, will be described by means of the corresponding description of the priority application to this application. The full disclosure of the priority application builds part of this disclosure and is incorporated in this description herein. The corresponding figures are also incorporated into this disclosure as FIGS. 16 to 23 The "brief description of the drawings" further above already includes these figures. The following parts of the present application documents are a fully incorporated part of the present disclosure in general and in particular for the embodiment of claim 3.

The following description relates to a method for assessing a structure arranged in an electrolyte and a system for assessing the structure arranged in an electrolyte by means of current magnetometry inspection.

A method for assessing a structure arranged in an electrolyte is provided. The method comprises the following steps:

Connecting an electric source between the structure and an earth;
Imposing, on the structure, a primary current with at least three frequencies comprising a first frequency of a first duration and of a first amplitude, a second frequency of a second duration and of a second amplitude and a third frequency of a third duration and of a third amplitude; wherein a series of currents with the first frequency, the second frequency and the third frequency are separated by a time gap;
Measuring the strength (hereinafter referred to field) of electromagnetic fields with an instrument comprising at least a first sensor, a third sensor and a fourth sensor and a positioning system; wherein each sensor is configured to measure a field along the structure for each of the at least three frequencies; wherein the sensors are provided in parallel spatial orientation to each other; and
Computing at least one primary field resulting from an electric current within the structure based on the measured field.

In an option, the three individual sensors are supplemented by another three sensors, which are rotated by an angle, e.g. 90°. This results in six sensors and they can measure the secondary field generated by the secondary current in addition to the primary field generated by the primary current.

In an example, additional seventh, eight and ninth sensors are positioned at an angle to the first, third and fourth parallel sensors. In an example it is provided: Measuring fields with an instrument in two spatial orientations.

In an example, additional twelfth, thirteenth and fourteenth sensors are positioned at an angle to the plane described by the first sensor and the seventh sensor.

In an example the first, seventh and twelfth sensor are combined into a sensor array.

In an example, it is provided: Measuring fields with an instrument comprising at least three sensor arrays, wherein each sensor array comprises at least three sensors. In an example the first sensor array comprises the first, the seventh and the eleventh sensor in three different spatial orientations, the second sensor array comprises the third, the eight and the thirteenth sensor in three different spatial orientations, the third sensor array comprises the fourth, the ninth and the fourteenth sensor in three different spatial orientations, as well as a positioning system.

According to an example, the method further comprises the step of locating the structure by detecting a primary field generated by a primary current of the first frequency, the second frequency and the third frequency within the structure.

According to an example, the method further comprises the step of identifying a holiday by detecting a secondary field generated by a secondary current of the first frequency, the second frequency and the third frequency. For example, this is provided by a fifth sensor that is at an angle, such as perpendicular, relative to the first sensor.

According to an example, for measuring, the following steps are provided:

Establishing a time synchronization between the source with a first communication and an instrument with a second communication;
Measuring a field for the first frequency for a duration of up to a first duration with the first sensor, the third sensor and the fourth sensor with a rate of at least four times the first frequency; and
Measuring a field for the second frequency for a duration of up to the second duration with the first sensor, the third sensor and the fourth sensor with a rate of at least four times the second frequency; and Measuring a field for the third frequency for a duration of up to a third duration with the first sensor, the third sensor and the fourth sensor with a rate of at least four times the third frequency; and Calculating at least one physical property for the structure based on the measured fields.

In an example, the method further comprises:

Detecting of the fields by the first sensor array, the second sensor and the third sensor array in all three spatial coordinates; each one of the three sensor arrays are provided at three different sensors in different spatial orientations, which are for example parallel and perpendicular to the structure.

As an option, it is further provided:

Determining the fields measured by the first sensor array, the second sensor array and the third sensor array generated by the primary current and the secondary current passing through the holiday from the structure into the electrolyte for at least the first frequency at least every 1 m (meter) along the structure; and Identifying of the position of the holiday based on the determination of the primary and the secondary field; the precision of detection is increased with decreasing the distance for individual measurements of the fields by the sensors along the structure from 1.00 m to 0.01 m.

According to an example, the method further comprises:

Measuring of a first phase shift, a second phase shift and a third phase shift of the at least three frequencies imposed by the source and the measured fields by the first sensor array, the second sensor array and the third sensor array generated by the primary current and the secondary current, based on the first communication and the second communication between the source and the instrument.

According to an example, the method further comprises:

Calculating the primary current in the structure by the fields measured with the at least three sensors and as well as the phase shift, based on the first communication and the second communication between the source and the instrument;

Modelling the fields measured by the at least three sensors taking into account the first phase shift, the second phase shift and a third phase shift that allow to assess the contribution of a metallic component to the measured fields; and Calculating the primary current in the structure based on the modelled field distribution.

According to an example, the method further comprises:

Calculating the first potential and the second potential for the first frequency, the second frequency and the third frequency along the structure by the following steps:

Calculating the longitudinal resistivity based on the type of metal and the metallic section of the structure; and Calculating the first potential and the second potential along the structure by the primary current for at least the first frequency, the second frequency and the third frequency. In an option, also the third potential along the structure by the primary current is calculated. The calculation of the first amplitude, the second amplitude and the third amplitude of the primary current for the first frequency, the second frequency and the third frequency along the structure is assessed with the at least three sensors.

According to an example, the method further comprises:

Calculating of the first amplitude, the second amplitude and the third amplitude of the secondary current passing from the structure through the holiday into the electrolyte by the fields measured with the at least three sensors as well as the phase shift; and by the following steps:

Modelling the secondary field measured by the at least three sensors taking into account the first phase shift, the second phase shift and the third phase shift that allows to assess the contribution of a metallic component to the measured fields; and Calculating the first amplitude, the second amplitude and the third amplitude of the secondary current for the at least three frequencies passing from the structure through the holiday into the electrolyte.

According to an example, the method further comprises:

Determining of the presence of a protective layer in the holiday, based on a determination of a first impedance, a second impedance and optional a third impedance and the first phase shift, the second phase shift and optional a third phase shift, by the following steps: Calculating the first impedance and the second impedance and the optional third impedance of the holiday by dividing the first potential on the structure at the position of the holiday by the first amplitude of the secondary current, by dividing the second potential on the structure at the position of the holiday by the second amplitude and by dividing the third potential on the structure at the position of the holiday by the third amplitude of the secondary current for the least three frequencies; and Evaluating of the frequency dependency of the first impedance, the second impedance and the third impedance as well as the first phase shift, the second phase shift and the third phase shift for the assessment of the presence of the protective layers within the holiday.

According to an example, the method further comprises:

Demonstrating of the good bedding condition of the holiday, based on the change of the amplitude to the amplitude of the primary current generated by the source based on the first communication and the second communication with the instrument, by the following steps with a first amplitude being applied: Determining the first impedance and the second impedance and the third impedance of the holiday at the amplitude; Sending a command from the instrument to the source via the first communication and the second communication, wherein the amplitude of the primary current is increased to an increased amplitude; Determining the first impedance and the second impedance and the third impedance of the holiday at the increased amplitude as a function of time; Sending a command from the instrument to the source via the first communication and the second communication, wherein the increased amplitude of the primary current is decreased to the amplitude; the first impedance and the second impedance and the third impedance of the holiday are determined at the amplitude; Evaluating the time evolution of the first impedance and/or the second impedance and/or the third impedance; wherein a first impedance and/or a second impedance and/or a third impedance that varies with time is a demonstration of a good bedding condition and an ability to accumulate hydroxide ions and thereby generate a zone with high pH, a zone with increased pH and a zone with small increase of pH.

According to an example, the method further comprises:

Demonstrating the presence of a protective layer on the structure in contact with the electrolyte within the holiday, based on the change of the first amplitude of the primary current generated by the source based on the first communication and the second communication with the instrument, by the following steps:

Setting the amplitude of the selected first frequency to the first amplitude;

Determining the secondary field by the at least three sensors arrays with a frequency of at least four times of the first frequency;

Calculating the first amplitude of the secondary current;

Determining the average of the first amplitude over a multiple of the period of 1/first frequency resulting in a first apparent DC current at the first amplitude;

Changing the amplitude of the selected first frequency to the first amplitude; the secondary field is determined by the at least three sensor arrays with a frequency of at least four times the first frequency.

Averaging the recorded data taken over a multiple of the period of 1/first frequency resulting in the first apparent DC current at the changed first amplitude; and Determining a presence of the protective layer by an evaluation of the assessment of the first amplitude subtracted by the changed first amplitude and the first apparent DC current subtracted by the changed first apparent DC current.

According to an example, the method further comprises: Minimizing the touch potential of a pipeline during the measurement, based on the change of the first amplitude and the second amplitude and the third amplitude of the primary current for all of the at least three frequencies generated by the source based on the first communication and the second communication with the instrument, by the following step: Temporarily changing the first amplitude, the second amplitude and the third amplitude, the first duration, the second duration and the third duration as well as the first time gap, the second time gap and the third time gap of the at least three frequencies by increasing the first amplitude, the second amplitude and the third amplitude and increasing the first time gap, the second time gap and the third time gap as well as decreasing the first duration, the second duration and the third duration by the first communication and the second communication between the source and the instrument.

Also, a system for assessing a structure arranged in an electrolyte is provided. The system comprises a source with an electric output terminal configured for connection to the structure, an electric output terminal configured for connection to an earth. The source is configured to provide a current with at least three frequencies at least within the structure. The system further comprises an instrument with at least a first sensor, a second sensor and a third sensor in a known spatial relation. For example, the first sensor, the second sensor and the third sensor are provided in parallel. In another example a first, a second and a third sensor arrays are positioned at known orientation and position in the instrument. Each sensor or sensor array is configured to measure a field of an electric field along the structure for each of the at least three frequencies. The system also comprises a positioning and orientation system configured to provide position and orientation data of the instrument. The system also comprises a processing unit in data communication with the source and the instrument. The processing unit is configured to compute at least one primary field resulting from an electric current within the structure based on the measured field.

In an option, the processing unit is configured to compute at least one primary field based on detecting differences of the fields measured with the first, second and third sensor in order to compute values of the field in order to locate the structure.

In an option, the three sensors are arranged in a parallel setting. In another option, additional three sensors are arranged transverse to the first three sensors.

As an example, the instrument is arranged transverse, e.g. perpendicular, to a longitudinal extension of the structure, such as a pipeline or conduit. For example, the instrument is arranged plane to a soil surface, e.g. in a horizontal manner.

The electric field is caused by the current in the structure provided by the source.

In an example, the at least three frequencies are provided as F1 to Fn.

In an example, the frequency portions are resolved over the time domain. By providing at least three sensors at different locations for field measurement for the primary current at one, i.e. the same, instant in time, the frequency portions are also resolved geometrically.

The electric fields occur for each of the frequencies. The electric fields are measured by each of the sensor, i.e. at different locations.

As an option the three sensors are replaced by three sensor arrays, each containing three sensors oriented in three spatial orientations. The sensor arrays allow for measurement of the primary and the secondary current.

As an option, the source is providing a multifrequency current supplied to the structure.

According to an example, the instrument measures at least three different fields at each of the at least three sensors for the at least three frequencies.

As an example, for three frequencies:

The first sensor measures a first field for the first frequency; the second sensor measures a second field for the first frequency; and the third sensor measures a third field for the first frequency.

The first sensor measures a first field for the second frequency; the second sensor measures a second field for the second frequency; and the third sensor measures a third field for the second frequency.

The first sensor measures a first field for the third frequency; the second sensor measures a second field for the third frequency; and the third sensor measures a third field for the third frequency.

Thus, as an example, nine combinations are actually measured: For the first frequency, the first sensor measures an electric field, the second sensor measures an electric field, and the third sensor also measures an electric field. For the second frequency, the first sensor measures an electric field, the second sensor measures an electric field, and the third sensor also measures an electric field. For the third frequency, the first sensor measures an electric field, the second sensor measures an electric field, and the third sensor also measures an electric field.

In case of more than three frequencies, respectively more electric fields are measured at each of the sensors.

In case of more than three sensors, respectively more electric fields are measured at the sensors for each frequency.

Figure 17:
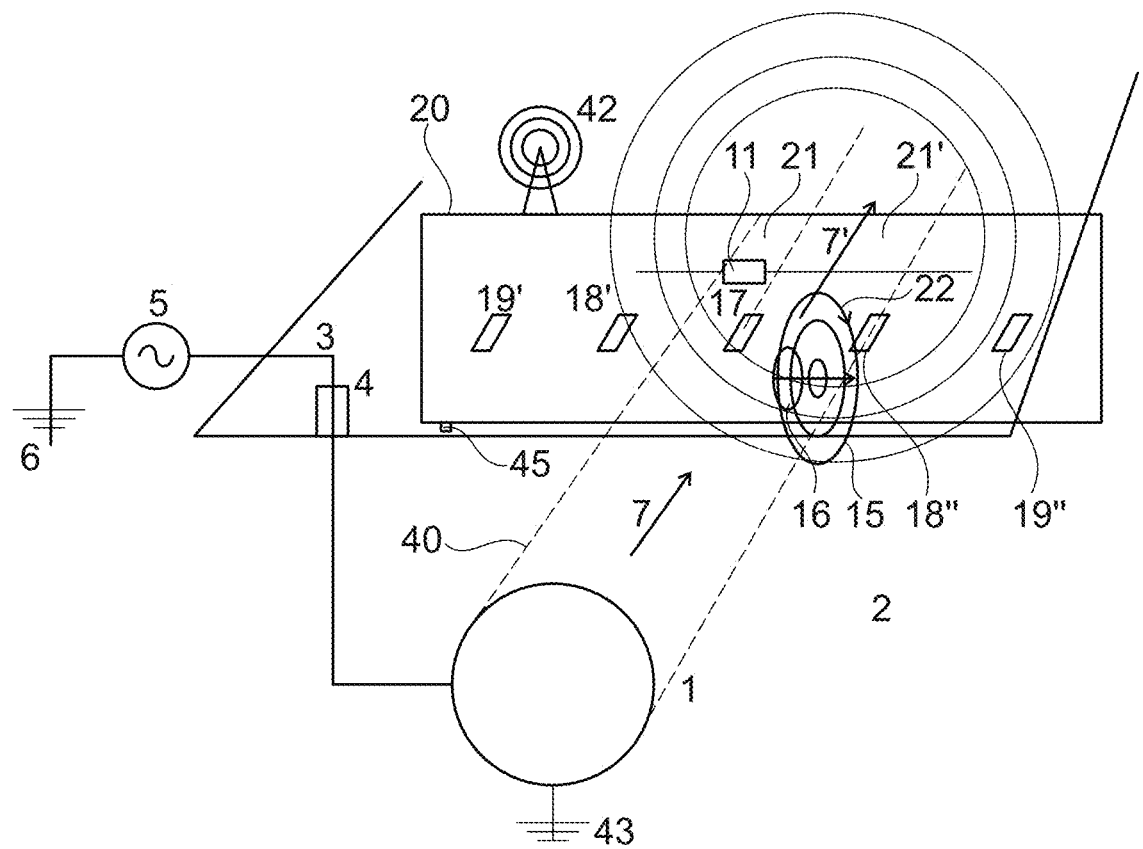
FIG. 17 shows the instrument above the complex structure without insulation IJ with a holiday in the coating, resulting in current leakage into the electrolyte, as well as the field associated with the secondary current flow from the structure into the electrolyte. The arrangement provides information about the detection of a holiday on the structure.

In an example, 18 measurements are provided in combinations (see also FIG. 17). In another example, 27 measurements are provided in combinations (see also FIG. 18).

In case of an structure with intact coating, basically only a primary current will occur, resulting in the generation of a primary electric field for each frequency. The field can then be measured at each sensor. The differences in combination with data from the positioning unit allow the computation of the location of the field and thus the structure.

In case of a structure with holidays in its coating consisting of an insulation outer layer, one or more secondary currents may occur, resulting in the generation of at least one secondary field for each frequency. The field for the two or more fields (one primary field and one or several secondary fields) can then be measured at each sensor. The differences in combination with data from the positioning unit allow the computation of the location of the primary field and the secondary field and thus the location of holidays in the enclosure of the structure.

The third sensor in each sensor array allows to differentiate the main signal from external noise and interference. This also improves to identify the main signal relating to the primary current within the structure and the leakage or drain signal relating to the secondary current due to holidays in the structure.

In an example, the main function of the sensors is to detect the location of the structure.

In another example, an additional function of the sensors is to also detect holidays within the structure.

In an option, in addition to the first sensor, the second sensor and the third sensor that are parallel, at least three further sensors are provided in a different spatial orientation.

In an example, the first sensor, the second sensor and the third sensor are arranged in parallel. The additional parallel the fourth, fifth and sixth sensor are also perpendicular to the first sensor, the second sensor and the third sensor.

According to an example, the first sensor, the second sensor and the third sensor are forming a first sensor array. A second array is provided comprising three sensors, wherein the second array is arranged in a same plane as the first sensor array, but transverse to the first sensor array. A third array is provided comprising three sensors, wherein the third array is arranged transverse to the first sensor array and the second sensor array.

In an example, a seventh sensor and a twelfth sensor are combined with the first sensor, forming a first sensor array. The seventh sensor is at an angle to the first sensor and the twelfth sensor is at an angle to the plane described by the first and the seventh sensor. These angles are often chosen to be 90°.

As an example, during operation of the system, the first sensor array and the second sensor array are arranged more or less parallel to an area surface where the structure is arranged, i.e. the earth's surface.

In an option, a system for assessing a structure arranged in an electrolyte is provided. As an example, the system is configured for assessing the structure according to the method of one of the examples above. The system comprises:
 a source with:
 an electrical output connecting to an earth;
 an electrical output connecting to the structure; and
 a first communication; and
 an instrument with:
 a sensor arrangement with at least three sensors allowing for measurement of a first field, a second field and a third field along the structure in all three spatial coordinates;
 at least one second communication; and
 a positioning and orientation system.

In an example, the at least three sensors are provided at an angle to each other.

In an example, an additional sensor is positioned at an angle to the plane described by the first sensor and the second sensor. The three sensors are combined into a sensor array.

In an example, the sensor arrangement comprises at least three sensor arrays.

In another example, a method for assessing a structure arranged in an electrolyte is provided. The method comprises the steps: Connecting an electric source between the structure and an earth; Imposing a primary current with at least three frequencies comprising a first frequency of a first duration and of a first amplitude, a second frequency of a second duration and of a second amplitude and a third frequency of a third duration and of a third amplitude; a series of currents with the first frequency and the second frequency and the third frequency are separated by a time gap; Measuring a primary field, i.e. a field of the primary field, of the first frequency and the second frequency and the third frequency generated by the primary current with an instrument comprising at least a first sensor, a second sensor and a third sensor and a positioning system by the following steps: Establishing a time synchronization between the source with a first communication and an instrument with a second communication; Measuring a first field, i.e. a field of the primary field for the first frequency for a duration of up to a first duration with the first sensor, the second sensor and the third sensor with a rate of at least four times the first frequency; and Measuring a second field, i.e. a field of the primary field for the second frequency for a duration of up to the second duration with the first sensor, the second sensor and the third sensor with a rate of at least four times the second frequency; Measuring a third field, i.e. a field of the primary field for the third frequency for a duration of up to a third duration with the first sensor, the second sensor and the third sensor with a rate of at least four times the third frequency; and Calculating at least one physical property for the structure based on the measured field.

The term "assessing" relates to at least one of the group of localizing, determining a distance of the structure, identifying holidays on the structure, presence of protective layers and the good bedding of the holiday and therefore the external corrosion assessment of a structure in contact with an electrolyte.

The physical property comprises at least one of the group of: position of the structure, distance to the structure, identifying holidays on the structure, presence of protective layers and the good bedding of the holiday and therefore the external corrosion assessment of a structure in contact with an electrolyte.

In an example, the method further comprises: Identifying a holiday by detecting a secondary field generated by a secondary current of the first frequency, the second frequency and the third frequency; for the measuring of the fields, the at least three sensors are provided at an angle to each other.

In an example, the method further comprises: Detecting of the first field, the second field and the third field in all three spatial coordinates; an additional sensor is positioned at an angle to the plane described by the first sensor and the second sensor; and the three sensors are combined into a sensor array.

As an option, the method further comprises: Determining the first field, the second field and the third field generated by the primary current and the secondary current passing through the holiday from the structure into the electrolyte for at least the first frequency at least every 1 m along the structure; at least three sensor arrays are combined into the instrument; and Identifying of the position of the holiday based on the determination of the secondary field; the precision of detection is increased with decreasing the distance for individual measurements of the first field and the secondary field along the structure from 1.00 m to 0.01 m.

In an example, the method further comprises: Calculating the primary current in the structure by the first field measured with the at least three sensors and as well as the phase shift, based on the first communication and the second communication between the source and the instrument; Modelling the field measured by the at least three sensors taking into account the first phase shift and the second phase shift and the third phase shift that allow to assess the contribution of a metallic component to the measured field; and Calculating the primary current in the structure based on the modelled field distribution.

This provides information with respect to the corrosion protection of the holiday.

The identification and localization of holidays is a key aspect of external corrosion direct assessment (ECDA), and the reliability of alternating current voltage gradient (ACVG), direct current voltage gradient (DCVG) as well as current attenuation measurement (CAM) as survey techniques are significantly affected by external conditions and in particular metallic components in the ground. However, even if these methods would have a very high reliability with respect to the identification of coating defects, they do not provide any information with respect to a corrosion protection within the holidays. The presence of a holiday only indicates the contact between the structure and the electrolyte and the possibility of corrosion. In case of structures equipped with cathodic protection, the pH increases (increase of alkalinity) at the metal surface of the structure and the subsequent formation of protective layers comprising metal oxides in holidays bedded in fine sand and/or calcium carbonates reliably prevent corrosion. The presence of sand, soil and/or calcium carbonate layers is hereinafter referred to as "good bedding" and the formation of protective oxide or carbonate films is hereinafter referred to as "protective layers". Correspondingly, it is not meaningful with respect to an economic structure operation to eliminate all identified holidays by excavation and coating repair. Instead, a method is provided that does not only allow for localization of the structure and identification of holidays, but provides further information with respect to the bedding conditions, the presence of calcium carbonate layers, the pH increase, the formation of protective oxide films, the size of the holidays and their resistance for current flow into the electrolyte hereinafter referred to as "spread resistance". Based on this information, a full assessment of the corrosion situation can be obtained and a more complete ECDA is achieved.

This procedure allows for significantly increased short term levels of the first potential and the second potential on the pipeline without generating a problem with respect to protection of persons or AC corrosion.

This procedure allows furthermore, the determination of the secondary current passing from the structure through the holiday into the electrolyte at the changed first amplitude, when the first amplitude does not provide sufficient resolution for reliable calculation of the first impedance and the second impedance or the first phase shift and the second phase shift.

In an example, also a system for assessing a structure arranged in an electrolyte according to the method of one of the examples above is provided. The system comprises a source with an electrical output connecting to an earth, an electrical output connecting to the structure and a first communication. The system also comprises an instrument with a sensor arrangement with at least three sensors allowing for measurement of a first field, a second field and a third field along the structure, at least one second communication and a positioning and orientation system.

The assessing may comprise at least one of the group of: localizing the structure, determining a distance of the structure, identifying holidays on the structure, presence of protective layers and the good bedding of the holiday and therefore the external corrosion assessment of a structure in contact with an electrolyte.

In an example, the at least three additional sensors are provided at an angle to first three sensors.

In an option, further sensors are provided at an angle to the first six sensors.

In an example, an additional sensor is positioned at an angle to the plane described by the first sensor and the fifth sensor. Further, three sensors with different spatial orientation are combined into a sensor array.

In an example, the sensor arrangement comprises at least three sensor arrays.

In an option, the at least three sensor arrays are combined into the instrument.

In an example, sensors are arranged transvers to a longitudinal direction of the structure.

In an example, sensors are arranged perpendicular to a longitudinal direction of the structure.

In another example, sensor arrays are arranged transvers to a longitudinal direction of the structure. In an example, sensor arrays are arranged perpendicular to a longitudinal direction of the structure.

The instrument is configured to be moved along the length of the structure.

The main object of the described "Current Magnetometry Inspection (CMI)" is to localize the structure in the electrolyte, identify holidays along the structure and determine the presence of protective layers as well as the corrosion protection. Corrosion protection is ensured by the good bedding of the holiday allowing for pH-increase and the formation of protective layers. This is achieved by the connection of a source injecting a current between earth and the structure comprising at least three frequencies f1, f2, f3 to fn and measurement of the distribution of the associated field with at least three sensors. The amplitude of the current of each of frequency f1 to fn corresponds to amplitude A1 to amplitude An. Several of these sensors are combined to allow for measurement of the field in all three spatial coordinates with a high time resolution of at least 1 kHz up to 1 GHz. These three combined sensors are hereinafter referred to as "sensor array". Several of these sensor arrays are combined into a measurement instrument, hereinafter referred to as "instrument". The measurement is performed along the structure with a lateral resolution of less than 1 m and more than 1 μm. Ideal measurement intervals along the structure are usually in the range of 1 cm.

The advantage "Current Magnetometry Inspection (CMI)" is that, by a time resolved field measurement with several sensor arrays in the instrument, the secondary current leaking from the structure through the holiday into the electrolyte, and hence the position of the holidays, can be detected without contact to the electrolyte. This does not only allow to perform measurements on paved surfaces but also the application of "Current Magnetometry Inspection (CMI)" on airborne instruments such as airplanes, helicopters and drones. The high time resolution of the at least three sensor arrays allows to identify the current of the various frequencies f1 to fn generated by the source as well as the determination of the phase shift, hereinafter referred to as DEG, between current generation of the source and field detection by the instrument for each frequency f1 to fn. The determination of the phase shift DEG is possible through initial or continuous time synchronization between the instrument and the source. This time synchronization requires permanent or at least temporary communication between the source and the instrument for ensuring the precision required for assessment of the phase shift DEG. The combination of a source generating currents with frequencies f1 to fn with the detection at high time resolution in all three spatial coordinates on several sensor arrays allows for very high precision of the current measurement parallel and perpendicular to the structure. The high time resolution in the range of at least 1000 Hz on at least three sensor arrays provides highest precision in field measurement by allowing for elimination and treatment of interfering fields. Additionally, a high spatial resolution of less than 1 m and ideally in the range of 1 cm ensures the information for high precision in assessment of the electrical field and hence calculation of the current. Since the sensor arrays allow to resolve the field in all three spatial coordinates, it is not only possible to determine the primary current along the structure, but also the secondary current passing through the holiday into the electrolyte. The vectorial component of these currents of the frequencies f1 to fn, their amplitudes A1 to An, as well as their phase shifts DEG1 to DEGn can be calculated.

The calculation of the current distribution of the amplitudes A1 to An along the structure and the assessment of its attenuation is used to calculate the potential of the structure with respect to remote earth, hereinafter referred to as "U". The potentials U1 to Un for each of the frequencies f1 to fn is determined by the known longitudinal conductivity of the structure. The combination of the secondary current amplitudes A1 to An leaking from the structure with the respective potentials U1 to Un results in the impedances Z1 to Zn of the structure within the holiday, which is required for a detailed analysis of the processes taking place at the structure/electrolyte interface and the determination of the corrosion protection properties.

"Current Magnetometry Inspection (CMI)" increases the resolution in primary and secondary current measurement by several orders of magnitude compared to current attenuation measurements. This high precision eliminates the need for insulation to galvanically separate the structure from earth electrodes. Correspondingly, the ECDA can be applied also in case of direct contact between the structure and earth electrodes, a configuration that is referred to hereinafter as "complex structure". The configuration of complex structures is given in gas compressor stations, nuclear power plants, pumping stations, oil refineries, but also on bridges with stay cables and tendons or depots of DC railway systems. ECDA is particularly relevant in these complex structures that were impossible to analyze in the past not only by ACVG, DCVG, PL as well as CAM but also ILI.

The current generation by the source results in potentials U1 to Un for the various frequencies f1 to fn on the structure. The maximum acceptable value of the potentials U1 to Un for safety of persons is given by the legal requirements with respect to touch potentials, which corresponds to 50 V for a frequency of 50 Hz in Europe for a permanently applied potential U. The level of the potential U controls the resolution of the instrument. A current that is not permanently applied, results in higher acceptable touch potentials. For a current duration of 100 ms, touch potentials of up to 700 V can be acceptable for certain frequencies. Consequently, the current generation of the source can be split into a time of current generation, hereinafter referred to as "tc", and a time without current, hereinafter referred to as "tg". The high time resolution for current generation by the source and field detection by the sensor arrays in the instrument allows for using individual sequences of currents of frequencies f1 to fn of durations tc1 to tcn that leaves tgn between the individual current signals. This increases the allowable value of the potentials U1 to Un applied by the source to the structure, and hence the resolution of the instrument. The communication between the source and the instrument further increases the reliability of the measurement and the use of time limited currents, e.g. AC or DC currents, as well as variation of the level of the potentials U1 to Un as needed during the ECDA.

The localizing of the structure and the identification of holidays is performed by the measurement of the field, i.e. the field. Highest precision of the measurement therefore requires precise knowledge of the position of the instrument. This is particularly relevant for airborne measurements. Precise measurement is possible by a positioning system as well as an instrument orientation system and a measurement system to determine the distance between the instrument and the electrolyte surface. This positioning and orientation system can be based on, but is not limited to, light detection and ranging, hereinafter referred to as "LIDAR", a global positioning system, hereinafter referred to as "GPS", radiolocation, hereinafter referred to as "RADAR", sound navigation and ranging, hereinafter referred to as "SONAR", an accelerometer and earth magnetic field, or a combination thereof. The combination of the different systems for determining the position of the instrument as well as its orientation and distance to the electrolyte surface is hereinafter referred to as positioning system "PS".

According to an aspect, an improved assessment of the structure in the electrolyte is provided that may comprise detecting holidays in the coating of the structure, thus identifying location with possible corrosion. In an example, a longer part of the structure, e.g. the pipeline or cable, can be monitored. The measurements of the fields are provided to determine the depth of the structure, e.g. within the earth, and the lateral offset to identify holidays in the structure. It is noted that secondary fields arise at defect portions, e.g. corroded parts.

According to an aspect, a primary current is generated within a structure like a pipeline or cable to measure the resulting fields in order to determine if and where current is flowing "out" of the structure. As an example, fields are measured in three spatial orientations. This provides knowledge about the secondary current and hence possible defect portions, which are referred to as holidays.

According to another aspect, the measured fields allow reconstructing resistive properties of the defect portion, i.e. the holiday, such that the enclosing embedding of that part of the structure can be retrieved. This provides knowledge about the local environment conditions. As an example, whether effective cathodic corrosion protection is provided on the structure.

According to an aspect, to provide reliably assessing the structure in the electrolyte, an electric source is connected between the structure and an earth. A primary current is imposed with at least three frequencies comprising a first frequency of a first duration and of a first amplitude and a second frequency of a second duration and of a second amplitude and a third frequency of a third duration and of a third amplitude. A series of currents with the first frequency, the second frequency and the third frequency are separated by a time gap. A primary field of the frequencies generated by the primary current is measured with an instrument comprising at least a first sensor, a second sensor and a third sensor and a positioning system as follows: A time synchronization between the source with a first communication and an instrument with a second communication is established; a first field is measured for the first frequency for a duration of up to a first duration with the first sensor, the second sensor and the third sensor with a rate of at least four times the first frequency; a second field is measured for the second frequency for a duration of up to the second duration with the first sensor, the second sensor and the third sensor with a rate of at least four times the second frequency; and a third field is measured for the third frequency for a duration of up to the third duration with the first sensor, the second sensor and the third sensor with a rate of at least four times the third frequency; further, at least one physical property for the structure is calculated based on the measured fields.

These and other aspects of "Current Magnetometry Inspection (CMI)" will become apparent from and be elucidated with reference to the embodiments described hereinafter.

Embodiments of "Current Magnetometrie Inspection (CMI)"

Certain embodiments will now be described in greater details with reference to the accompanying drawings (FIGS. 16 to 23). In the following description, like drawing reference numerals are used for like elements throughout FIGS. 16 to 23, even in different ones of these drawings. However, the reference signs/numerals used in FIGS. 16 to 23 may deviate from the reference signs used in FIGS. 1 to 15. The matters defined in the following parts of the description, such as detailed construction and elements, are provided to assist in a comprehensive understanding of the exemplary embodiments of "Current Magnetometry Inspection (CMI)". Also, well-known functions or constructions are not described in detail since they would obscure the embodiments with unnecessary detail. Moreover, expressions such as "at least one of", when preceding a list of elements, modify the entire list of elements and do not modify the individual elements of the list.

"Current Magnetometry Inspection (CMI)" relates to a method and a system for assessing the corrosion protection of a metallic structure in contact with an electrolyte. "Current Magnetometry Inspection (CMI)" relates to any longitudinally extended metallic structure in contact with any electrolyte. This includes pipelines as well as electrical power or communication cables buried in soil or immersed in water, prestressing tendons installed in concrete, stay cables in condensed humidity as well as rails and tracks installed on gravel, in concrete, in soil or in asphalt. The "Current Magnetometry Inspection (CMI)" also relates to a method for localizing the metallic structure and localizing defects in the corrosion protection, the thermal or the electrical insulation of the metallic structure. "Current Magnetometry Inspection (CMI)" also relates to a method for determining the size of the defects in the corrosion protection, the thermal or electrical insulation, the spread resistance of that defect to the electrolyte, assessing the bedding conditions of the metallic structure within these defects, the size of the defects, the presence of protective layers as well as the corrosion activity of the structure within that defect. "Current Magnetometry Inspection (CMI)" relates furthermore to a system for implementing said method.

A metallic structure, hereinafter referred to as "structure", is for technical reasons longitudinally conductive and in contact with an electrolyte. The most relevant examples for a structure are pipelines or cables. These pipelines for the transport of liquid or gaseous media, or cables for the transport of electrical power or communication information, are usually buried in soil or immersed in water. Similarly, the metallic rails and tracks of transportation systems are installed on a gravel bed, in asphalt or in concrete, or a combination of these. Additionally, tendons, anchors or stay cables of bridges are installed in grout, concrete or grease. All these structures have in common that the soil, water, rock, gravel, sand, grout, concrete, condensed humidity etc., hereinafter referred to as "electrolyte", causes contact to the structure and results in a physicochemical reaction with the structure. This physicochemical reaction is referred to hereinafter as "corrosion". For protection against corrosion, structures are usually coated with a corrosion protection system. This corrosion protection can comprise any organic material such as polyethylene, polyurethan, rubber or caoutchouc, epoxy, but also fat, grease or visco-elastic material, polymeric foam etc. is used. Alternatively, an inorganic material such as cement, grout or concrete, metal oxide, passive film or zinc may be applied to or formed on the surface of the structure. These inorganic materials promote the formation or form protective oxide films on the surface of the structure. This externally applied corrosion protection can be a single corrosion protection product or a combination of a number of these. Typical examples are polyethylene and cement, viscoelastic polymers in combination with polyethylene, rubber and cement, grease and polyethylene etc. All these individual or combinations of different corrosion protections applied to the external surface of the structure is hereinafter referred to as "coating". The purpose of the coating is to prevent or limit direct contact between the metal of the structure and the electrolyte. This protection against corrosion based on a coating is usually compromised by the formation of local defects in the coating hereinafter referred to as "holiday". Within this holiday, a direct contact between the electrolyte and the structure is formed, which usually results in a low resistive contact between the structure and the electrolyte and often leads to corrosion of the structure. Corrosion can result in damage to the structure when it sufficiently proceeds including, but not limited to, leakage in the case of pipelines, rupture in the case of tendons and breakage in the case of rails. This holiday in the coating can be formed for various reasons including, but not limited to, mechanical damage of the coating during installation, insufficient application quality of the coating during construction, degradation of the adhesion between the coating and the structure as well as cracking of the coating during operation. For the integrity and safety of structures, it is, therefore, of highest relevance to identify the holidays and classify them with respect to their ability to protect the structure against corrosion.

Since the formation of holidays and therefore corrosion of the structures cannot be excluded, additional measures for ensuring the safe operation of structures are usually required. These methods include, but are not limited to, the application of cathodic protection, the identification and repair of holidays, the inline inspection for identifying metal loss caused by corrosion. The inline inspection is hereinafter referred to as "ILI". While ILI relates to the integrity of structures in the form of pipelines and preventing damages caused by corrosion, a large number of structures are constructed in a way that do not allow for ILI. These structures can only be inspected with respect to the effectiveness of corrosion protection by external corrosion direct assessment hereinafter referred to as "ECDA". The methods used for ECDA are usually based on the connection of an external electrical current source, hereinafter referred to as "source", based on direct current (DC) or alternative current (AC) between the structure and earth, including but not limited to an earthing system an anode bed or a temporary installation of interconnected earth rods, hereinafter referred to as "earth". This AC and/or DC current is referred to hereinafter as "current". This source results in a current flow along the structure and current leakage into the electrolyte at the holidays. For ECDA, is it necessary to localize the position of the structure with high precision. This position of the structure is usually determined by so called cable or pipe locators, hereinafter also referred to as "PL". This method is based on measuring the primary field perpendicular to the structure generated by a primary current with a first frequency f1, referred hereinafter to as "field" generated by the current injected by the source onto the structure. The frequency generated by the source is hereinafter referred to as first frequency f1. The first frequency f1 can correspond to DC (0 to 10 Hz) or AC (10 to 100,000 Hz). Additional frequencies are hereinafter referred to as second frequency f2, third frequency f3 up to nth frequency fn. In case of the PL, one electromagnetic field sensor, hereinafter referred to as "sensor" is used. An effective determination of the position of the structure is facilitated when the structure is separated by an electrical insulation from metallic structures with low resistance to the electrolyte. This electrical insulation comprises insulation joints in the case of pipelines and rails or insulating material between tendons and rebars. The insulation is referred to hereinafter as "IJ". The electrodes are usually earthing systems comprising reinforcing steel in concrete or copper, stainless steel or galvanized steel ribbons and/or bars in the electrolyte. These earthing systems are hereinafter referred to as "earth electrodes".

The current of the first frequency f1 imposed by the source flows along the structure that is separated from electrodes by at least one insulation IJ. Measurement of the field allows for detection of the position of the structure in the electrolyte. A part of the current, referred to as secondary current, leaks from the structure through the holidays in the coating into the electrolyte. This current leakage is associated with a voltage gradient (VG) in the electrolyte. The voltage gradient can readily be detected by measuring the voltage between two reference electrodes placed on the electrolyte above or next to the structure. These electrodes can comprise metal rods, but Cu/CuSO4 as well as Ag/AgCl half cells can be used for this purpose. Depending on the first frequency f1 of the source (alternating of direct current), the method is referred to as DCVG or ACVG. By DCVG or ACVG it is possible to identify the holidays and, therefore, the position of defects in the coating and hence damages in the corrosion protection of the structure are identified. Besides the localizing of the position of the structure, the knowledge of the position of the holidays is crucial for ECDA, since corrosion is usually associated with these holidays in the coating. However, these methods based on voltage gradients have drawbacks. One is the need for contact between the electrodes and the electrolyte. Furthermore, buried metallic components, such as third-party infrastructure, including but not limited to pipelines, reinforced concrete, earth ribbons etc., may affect the voltage gradient measured and may lead to erroneous results. In typical urban environment with asphalted surfaces and relevant quantity of buried metallic components, performing these measurements requires interpreting the data. Additionally, the increasingly dry conditions during summer make VG measurements difficult. The necessity of low resistive contact of the reference electrodes to the electrolyte is overcome by the method called current attenuation measurements, hereinafter also referred to as "CAM". This method is based on a PL that has a second added sensor. The concurrent measurement of the field with the two sensors positioned perpendicular to the structure within the PL allows for calculating the distance between the PL and the structure as well as the primary current in the structure. This is due to the fact that the field is proportional to the current in the structure as well as the distance between structure and the sensors. The CAM comprising a PL with two sensors, therefore, allows to assess the current distribution along the structure. Holidays can be identified by a decrease of the current along the structure due to the current leakage at the holiday. The resolution of the method is mainly affected by the resolution limitations of the CAM and the amount of current leakage from the structure through the holiday into the electrolyte. Large currents leaking can readily be identified with a CAM. However, smallest holidays with minimal current leakage may not be detected. Furthermore, CAM may be affected by metallic components in the vicinity of the structure that may disturb the field and prevents the detection of smallest holidays with small current leakage. Correspondingly, CAM resolves the issues with paved or very dry surfaces but can only be applied to largest holidays.

Figure 16:
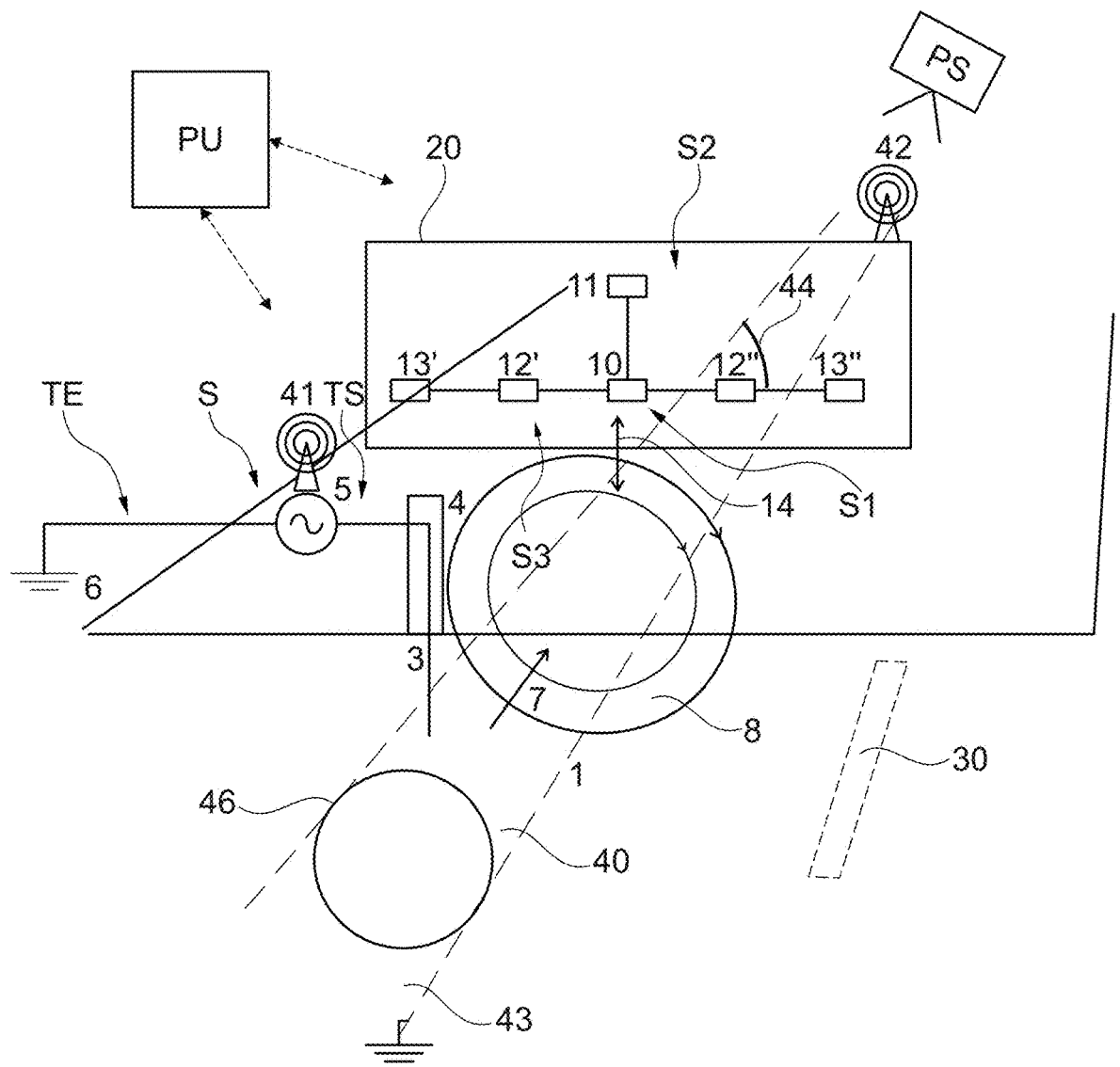
FIG. 16 shows the source as well as the instrument for measuring the amplitudes Al to An of the current of the frequencies f1 to fn in the structure separated from earth electrodes via an insulation IJ by several sensors that are oriented in parallel for detection of the field associated with the primary current flow in the structure. The arrangement provides information about the location of the structure with a resolution along the length of the structure.

FIG. 16 shows an example of a system for assessing a structure arranged in an electrolyte is provided. The system comprises a source S with an electric output terminal TS configured for connection to the structure, an electric output terminal TE configured for connection to earth. The source S is configured to provide a current with at least three frequencies at least within the structure. The system further comprises an instrument I with at least a first sensor S1, a second sensor S2 and a third sensor S3 in a known spatial relation. Each sensor is configured to measure a field of an electric field along the structure for each of the at least three frequencies. As an option, the three sensors are replaced by sensor arrays that provide the measurement of the field in all three spatial orientations. The system also comprises a positioning and orientation system PS configured to provide position data of the instrument. The system also comprises a processing unit PU in data communication with the source and the instrument (as indicated with double arrows in broken lines). The processing unit is configured to compute at least one primary field resulting from an electric current within the structure based on the measured field.

It is noted that the so-to-speak basic system as described above is shown in the drawings also in the context of further optional features and aspects, which are provided in more detail below.

Referring to the drawings (e.g. see FIG. 16), one sees a structure 1 with a coating 40 separated by an insulation 46 from an earth electrode 43 immersed in an electrolyte 2 with a cable 3 connected that is extracted into a test post 4.

A source 5 equipped with a first communication 41 is connected to the cable 3 in the test post 4 and to an earth 6. This source 5 is time synchronized via the first communication 41 and is generating a sequence of primary currents 7 of frequencies f1 to fn with amplitudes A1 to An of durations tc1 to tcn with a frequency ranging from 0 to 100,000 Hz and time gaps tg1 to tgn-1 between the individual frequencies ranging from 0 to 10 seconds as well as a time gap of tgn ranging from 0 to 10 seconds between each sequence of the frequencies f1 to fn of the currents 7. The currents of the different frequencies f1 to fn are often generated by the source in series, but it is also possible that individual frequencies are overlapping. This overlap is particularly useful for a frequency f0 of 0 Hz that corresponds to a current CP of an amplitude A0 and that is imposed permanently by the source 5 onto the structure 1. These primary currents 7 are flowing along the structure 1 generating a concentric primary field 8 (see FIG. 16 and FIG. 17) of the frequencies f1 to fn around the structure 1.

The concentric field 8 is perpendicular to the current and hence to the structure 1. A first sensor 10 oriented at an angle 44 to the structure will detect the primary field 8 at the position of the first sensor. Usually, the angle 44 is chosen to be 90°. This sensor 10 is installed in an instrument 20. The instrument 20 is time synchronized with the source 5 by the second communication 42. This exchange of data for synchronization can be between 41 and 42 directly or via an additional network that provides a time stamp, such as but not limited to a server, a relais or a GPS satellite. Alternatively, the instrument 20 and the source 5 may be equipped with an atomic clock that is synchronized via the first and second communication 42 and 41. The instrument 20 is furthermore equipped with a PS that determines the position of the instrument 20, its orientation as well as its distance to the surface of the electrolyte 2. By using a second sensor 11 oriented vertically above and parallel to the first sensor 10, the field 8 is measured concurrently at two positions in space. The difference in the magnitude of the field 8 detected by the first sensor and second sensor 11 allows for calculating the distance 14 of the structure 1 from the sensor 10 and the amplitude A1 to An of the primary current 7. This measurement based on the first sensor 10 and the second sensor 11 only provides reliable data for depth 14, when the field 8 is circular and concentric around the structure 1.

A metallic component 30 above or in the electrolyte 2 distorts the homogeneity of the field 8. This results in miscalculations of the depth 14 and the amplitude A1 to An of the current 7 from the field 8. By installing the third sensor 12' and the fourth sensor 12" lateral and parallel to the first sensor 10, the distortion of the field can be determined and corrected. This results in increased precision of the calculated depth 14 and the calculated amplitude A1 to An of current 7. The further increase of the number of lateral and parallel sensors by adding the fifth sensor 13' and the sixth sensor 13" will result in additionally increased precision of the calculation of the depth 14 and the amplitudes A1 to An of the current 7.

The high precision of determining the field 8 around the structure 1 with at least three sensors 10, 12 and 12' allows for determining the distance 14 between the sensor 10 and the structure 1. Additionally, the lateral position of the structure 1 in the electrolyte 2 relative to the sensors 10, 12 and 12' is determined. The precision of this measurement is improved with an increasing number of lateral sensors 13 and 13'. The combination of the instrument 20 with a positioning system 45 that provides information with respect to position of the instrument 20 in the three spatial coordinates, with respect to its orientation in all three spatial angles and with respect to the distance to the electrolyte surface, detailed information on the position of structure 1 is obtained. By following the structure 1 with the instrument 20 and taking measurements of the field 8 and the position with the positioning system 45 at least every meter, a trajectory of the structure 1 is determined. This information is crucial for ECDA. But it provides further information with respect to the integrity of the structure 1. Comparing the trajectory of the structure 1 with the data determined during installation of structure 1 allows for the detection of the movement and deformation of the structure 1 in the electrolyte 2. This movement can be the result of landslides, electrolyte 2 instability and electrolyte 2 settlement, but also deformation during construction and operation of the structure 1 in the electrolyte 2. The assessment of a trajectory that deviates from the original location of installation of the structure 1 allows for the calculation of elastic and plastic deformation of the structure 1 and the associated mechanical stress. This information and the repeated assessment of the position of the structure 1 and the associated mechanical stress on the structure 1 over time provides crucial information. This information is required for the integrity assessment of the structure 1 under difficult geological situations in a critical electrolyte 2.

The assessment of the amplitudes A1 to An of the primary current 7 with highest precision can be used for identifying a holiday 16 in the coating 40 on the structure 1 without insulation 46 representing a complex structure (FIG. 17). A fraction of the primary current will leak as secondary current 15 from the structure 1 into the electrolyte 2 at the holiday 16 in the coating 40. Correspondingly, the amplitudes A1 to An of the primary current 7 between the source 5 and the holiday 16 are higher than the amplitudes A1 to An of the primary current 7' after the holiday. The following relation applies:

$$An7 = An7' + An15$$

A high precision in determining the field 8 around the structure 1 results in a high precision in the assessment of the amplitudes Al to An of the primary current 7 and the amplitudes Al to An of the current 7'. Correspondingly, the detection of a holiday 16 with small size can be achieved even in case of a complex structure without insulation and direct contact to an earth electrode 43.

In an example, the three spatial orientations are detected with sensor arrays comprising three sensors each in all three spatial orientations. As an option, all sensors in FIG. 16 are replaced by sensor arrays. As another option, all sensors in FIG. 17 are replaced by sensor arrays.

In an example, a field of the secondary current is perpendicular to the pipeline and is measured with a sensor arrangement parallel to the pipeline. For example, a combination of three individual sensors in a sensor array is provided to determine the field in all three spatial orientations.

The secondary current 15 leaking through the holiday 16 from the structure 1 into the electrolyte 2 will generate a secondary field 22 that is not parallel to the primary field 8. The resolution of the instrument 20 in detecting holidays 16 is further increased by adding a seventh sensor 17 to the instrument 20 that is oriented at an angle 21 to the sensor 10. This seventh sensor 17 will allow for detecting the contribution of the secondary field 22. The angle 21 is often 90°. In presence of a holiday 16, the secondary field 22 is detected. The demonstration of the presence of the secondary field 22 is, therefore, the demonstration of the presence of the holiday 16. The sensitivity of the instrument 20 is further increased by the installation of an additional eighth sensor 18' and a ninth sensor 18" that are at an angle 21' to the orientation of the first sensor 10. Usually, the angle 21' is 90°. The secondary field 22 determined in the seventh sensor 17, the eighth sensor 18' and the ninth sensor 18" is used to calculate the position of the holiday 16 on the circumference of the structure 1. The additional installation of a tenth sensor 19' and an eleventh sensor 19" will allow for compensation of a possible distortion of the secondary field 22, and additionally increases the resolution of determining the amplitudes A1 to An of the secondary current 15.

Figure 18:
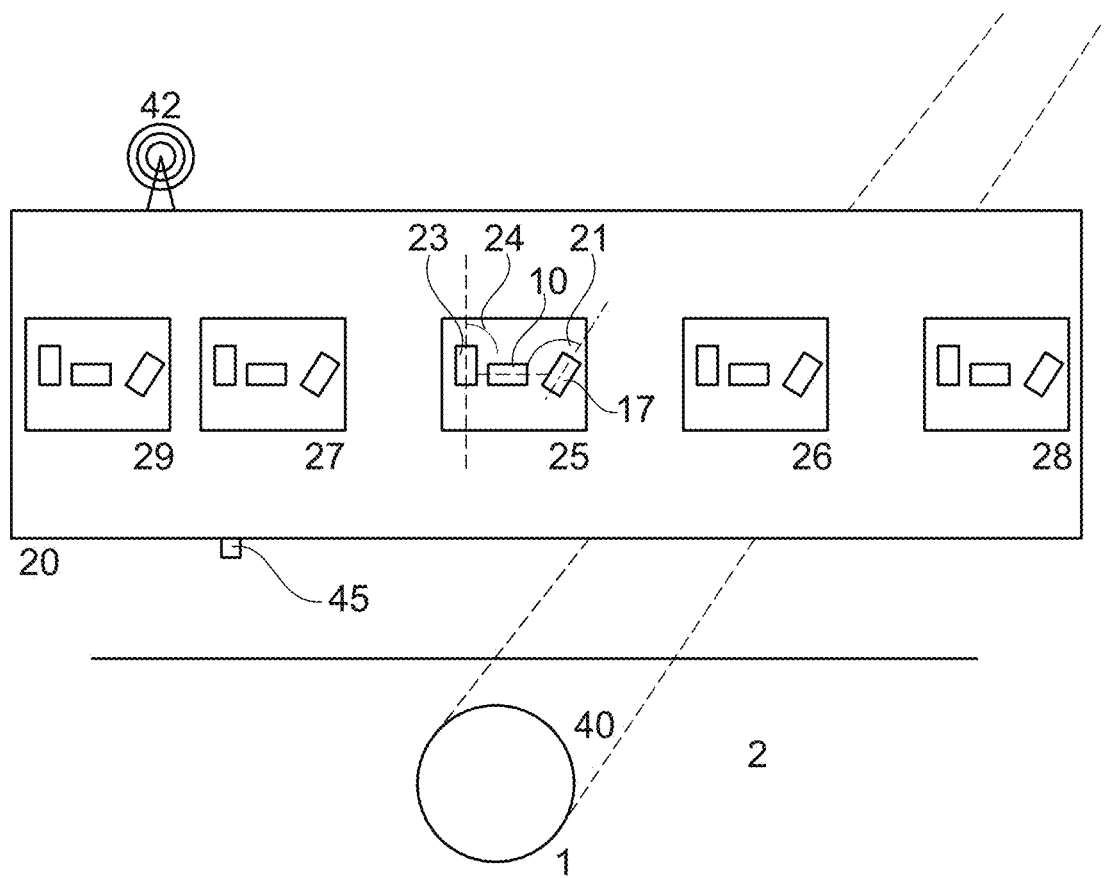
FIG. 18 shows the instrument comprising sensor-arrays that allow for measurement of the field in all three spatial coordinates. The arrangement provides information about the spatial extension.
Figure 19:
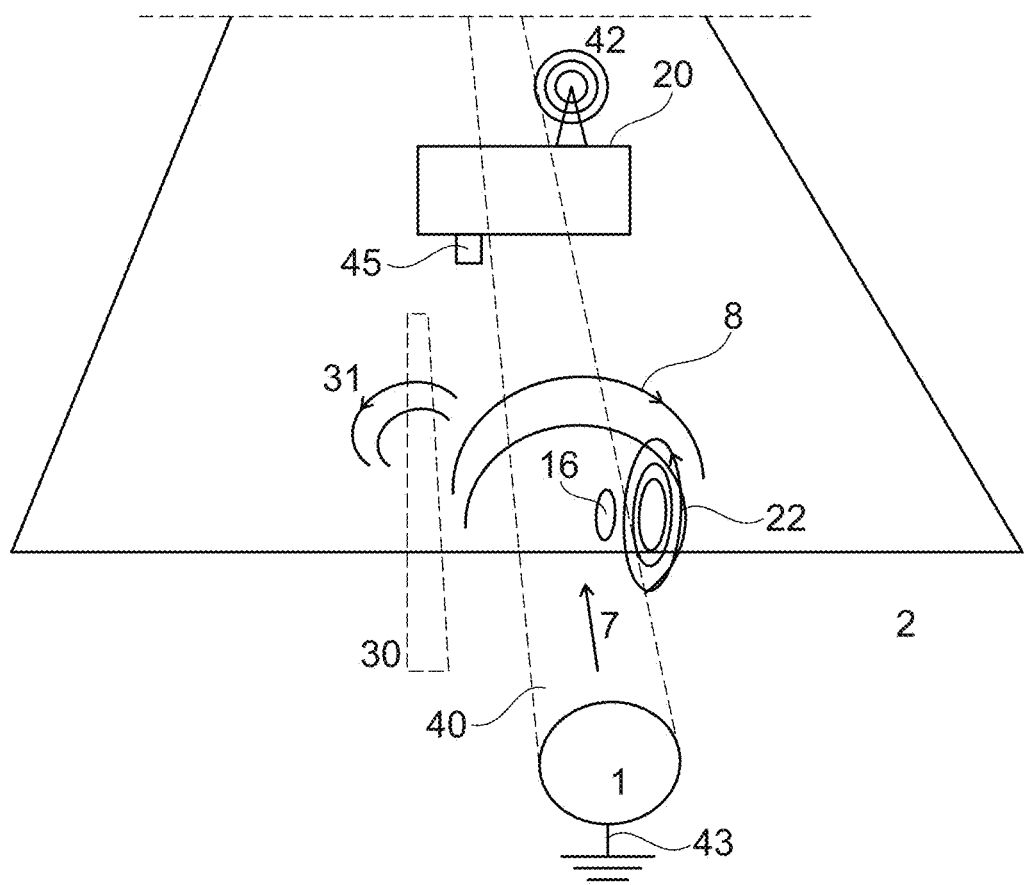
FIG. 19 shows the field distribution around the complex structure without insulation, as well as the instrument comprising sensor-arrays that allow for measurement of the field in all three spatial coordinates.

The resolution of the method is further increased by adding to the sensor 10 that is oriented at an angle 44 to the structure and the sensor 17 that is oriented at the angle 21, an additional twelfth sensor 23 (FIG. 18). This twelfth sensor 23 is oriented at an angle 24 to the plane described by the orientation of the first sensor 10 and the seventh sensor 17. Usually, the angle 24 is chosen to be 90°. In this configuration, the primary field 8 can be detected in all three spatial coordinates and the vectorial component of the secondary field 22 is assessed with respect to its vectorial components. In an option, the first sensor 10, the seventh sensor 17 and the twelfth sensor 23 are combined into a first sensor-array 25. This allows for simplifying the configuration in the instrument 20. The angle 21 and the angle 24 are usually chosen as 90° on the first sensor array 25. By combining at least the first sensor-array 25 with a second sensor-array 26 and a third sensor-array 27, an effective construction of the instrument 20 is achieved. Adding additional sensor arrays will further increase the resolution of the instrument, e.g. by adding a fourth sensor array 28 and a fifth sensor array 29. Further increasing the number of sensor arrays will increase the precision of the measured primary field 8 and the secondary field 22. This provides highest resolution for the amplitudes A1 to An of the primary current 7 and the secondary current 15.

The identification of the holiday 16 is performed by following the structure 1 with the instrument 20 and taking readings of the primary field 8 and the secondary field 22 of at least the first sensor-array 25, the second sensor-array 26 and the third sensor-array 27 at least every 1 m along the structure at a data acquisition rate of at least 10 kHz. While values smaller than 1 m are required for maximum resolution, the identification of the holiday may initially be based on measurements at the beginning and the end of the structure 1 or at any intermediate position such as at each test post 4. Ideally, the readings are taken at least every cm (centimeter) along the structure on the at least three sensor arrays 25, 26 and 27 at a data acquisition rate of at least 10 kHz. Based on the totality of these data, the reliable identification of the holiday 16 in the coating 50 on the structure 1 is achieved.

A metallic component 30 in the electrolyte 2 in the proximity of the structure 1 can distort the primary field 8 (FIG. 19) by an induced field 31. The induced field 31 is characterized by a phase shift compared to the primary field 8 and the primary currents 7. The high time resolution of the data acquisition and data processing of the instrument 20 allows for measurement of the phase shifts DEG1 to DEGn between the primary currents 7, the primary field 8, the secondary field 22 and the induced field 31. The determination of the phase shift DEG allows for differentiation between the contributions of the metallic component 30 and the holiday 16.

Figure 20:
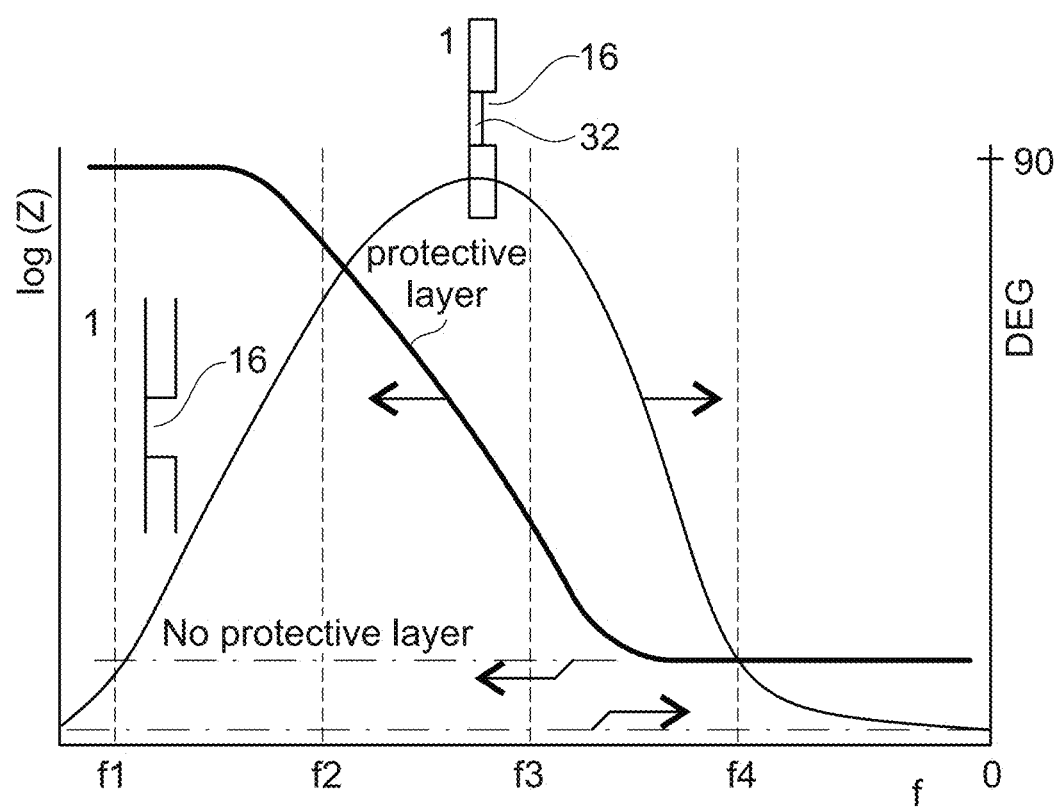
FIG. 20 shows the continuous frequency dependency of the impedance Z and the phase shift DEG for a holiday with a protective layer, as well as a holiday without a protective layer. Additionally, the values detected by the instrument at frequencies f1, f2, f3 and f4 are shown by dashed lines.
Figure 22:
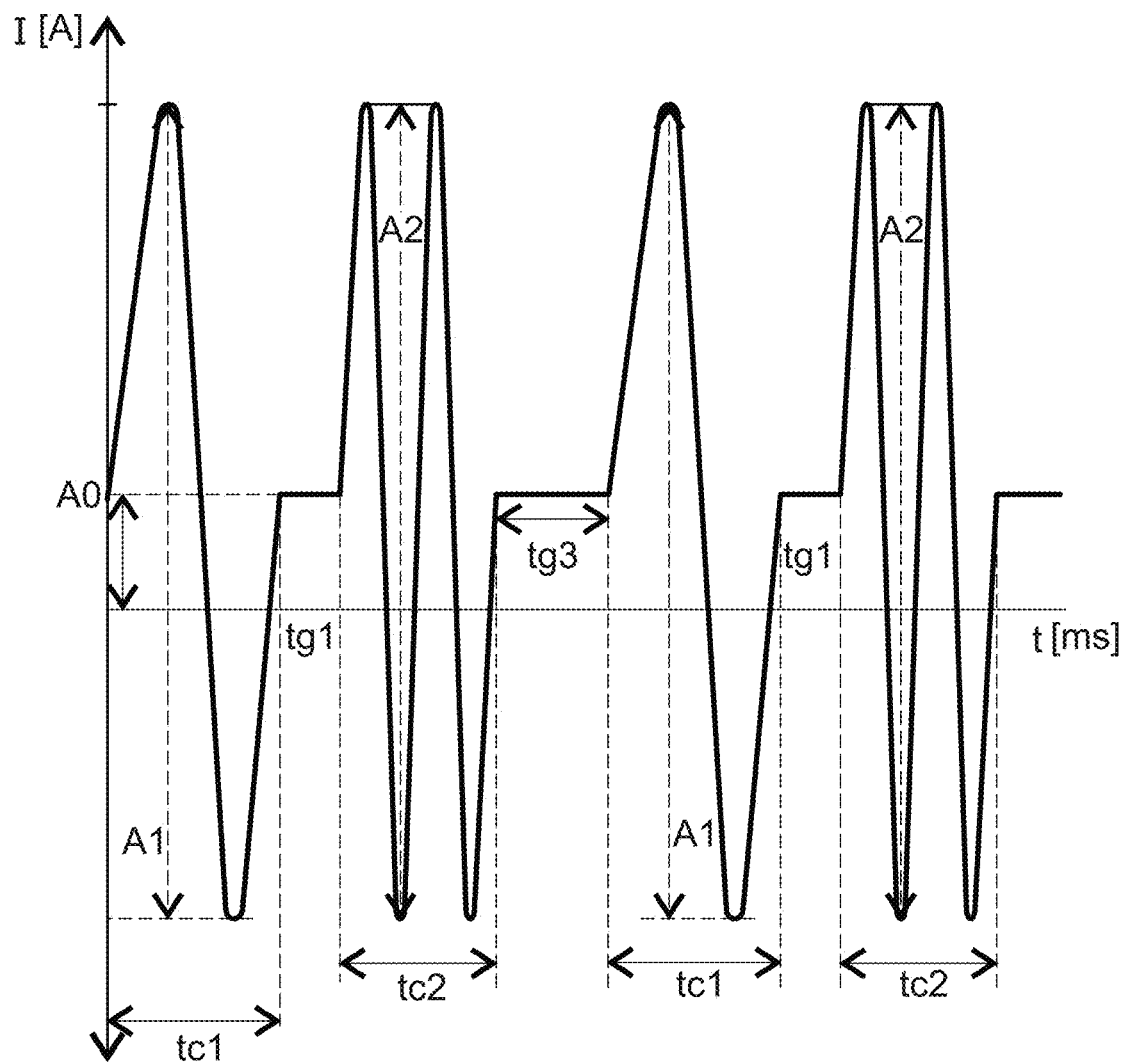
FIG. 22 shows the time resolved application of the current by the source to the structure.

The detection of the holiday is crucial from the point of view of structure integrity assessment. However, with respect to the assessment of ECDA and the integrity of the structure, the analysis of the different frequencies f1 to fn as well as the amplitudes A1 to An of the current 15 is required. The instrument 20 comprises at least the first sensor-array 25 with the second sensor-array 26 and the third sensor-array 27 allows for assessing the amplitudes A1 to An of the primary current 7 in the structure 1 as well as the amplitudes A1 to An of the secondary current 15 leaking from the structure 1 through the holiday 16 into the electrolyte 2. With known longitudinal resistivity of the structure 1, the amplitudes A1 to An of the current 7 allows to calculate an ohmic drop along the structure 1 from the source 5 to the holiday 16. Therefore, the potentials U1 to Un at the holiday 16 are known for each frequency f1 to fn. Combining the potentials U1 to Un with the amplitudes A1 to An of the current 15 allows for calculating the impedance Z1 to Zn for each frequency. Based on the calculated frequency dependence of the impedance Z1 to Zn and the phase shift DEG1 to DEGn, it is possible to conclude on a formation of a protective layer 32 on the structure 1 within the holiday 16. In certain cases, an increase of the impedances Z1 to Zn with decreasing frequency, indicates the presence of a protective film within the holiday 16. Often this frequency dependence is associated with a change of the phase angle. In contrast, in absence of a protective layer, there is no or only a small frequency dependence of the impedances Z1 to Zn and the phase angles, i.e. the phase shifts DEG1 to DEGn. These effects are illustrated in FIG. 20 for the case of formation and absence of a protective layer. For this analysis, the source 5 has to generate at least two different frequencies f1 and f2 that can be in the range of 0,001 to 100,000 Hz, but are mostly in the range of 10 to 10,000 Hz. The precision of this analysis increases with an increasing number of frequencies n generated by the source 5. Usually, at least four frequencies (f1, f2, f3 and f4) are sequentially applied by the source 5 between the structure 1 and the earth 6 (FIG. 22). These frequencies can be generated sequentially in time generating a sequence of primary currents 7 as follows: f1=11 Hz with A1=1 A for tc1=1 second, followed by a gap tg1=0,1 s, f2=111 Hz with A2=1,5 A for tc2=0,1 second, followed by a gap tg2=0,2 s, f3=1111 Hz with A3=3 A for tc3=0,01 second, followed by a gap tg3=0,3 s. The next series of the primary current 7 with frequencies f1 to fn can be applied by the source 5 with a delay of tg3=0,3 seconds. Adjusting the time gap tg3=0 seconds will result in an immediate beginning of the next sequence. The signal application based on a sequence of discrete frequencies is hereinafter referred to as "series". Furthermore f1, f2 or f3 can be applied by the source 5 concurrently in individual bursts of the duration tc1 separated by time gap tg1 or permanently (tc1=∞ and tg1=0). The application of an amplitude A0 with infinite duration is particularly relevant for frequency f0=0 Hz. This corresponds to a direct current associated with cathodic protection applied by the source 5. Instead of applying discrete frequencies, a Compressed High-Intensity Radiated Pulse, hereinafter referred to as "CHIRP" can be used that is based on broadband frequency range. It represents a continuous range of frequencies rather than discrete frequencies f1 to fn and may be considered as a large number of sequential frequencies with n typically being larger than 10. Another option is the use of individual pulses as combinations of various frequencies that are applied overlapping, hereinafter referred to as "pulse". The combination of frequencies imposed by the source 5 between the structure 1 and the earth 6 based on a series, CHIRP or pulse as well as a combination thereof applied continuously or with a value of tc and/or interrupted by tg or any combination of these, is hereinafter referred to as "signal".

Corrosion protection of the structure 1 within the holiday 16 is affected by blocked convection in the adjacent electrolyte 2 on the surface of the structure 1. Convection blockage is achieved for example by good bedding of the holiday 16 in fine sand or soil. With respect to ECDA it is, therefore, relevant to determine the presence of good bedding at the surface of the structure 1 in contact with the electrolyte 2 within the holiday 16. This is possible by changing the amplitude A0 of the frequency f0=0 Hz, hereinafter referred to as A0, of the structure 1 with respect to the electrolyte. The presence of good bedding is Determined by the following procedure:

Determining the impedances Z1 to Zn at A0.

Changing the amplitude A0 to amplitude A0' by the source 5. Thereby, the negative output of the source 5 is connected to the structure 2 and the positive output of the source 5 is connected to the earth 6.

Determining the impedances Z1 to Zn while or after the application of A0'.

Figure 21:
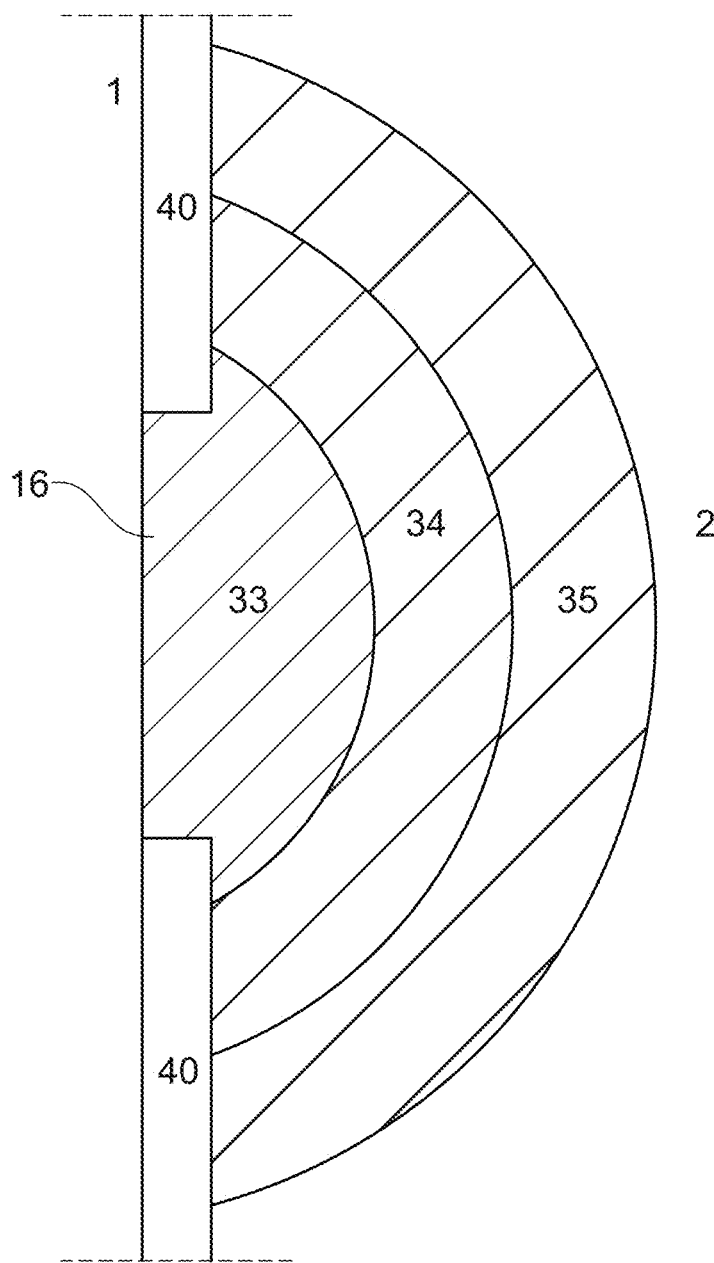
FIG. 21 shows the accumulation of hydroxide ions at the surface of the structure within a holiday as a result of the application of a current CP, between the structure and the electrolyte.

A decrease of the impedances Z1 to Zn is characteristic for the accumulation of hydroxide ions at the structure 1 within the holiday 16. In FIG. 21, the high concentration of hydroxide ions on the structure 1 in holiday 16 is shown with a first zone 33 (high pH). In the adjacent second zone 34 (lower pH), the concentration of hydroxide ions is lower. In the more distant third zone 35 (even lower pH), the concentration of hydroxide ions is even lower to reach the concentration of hydroxide in the bulk electrolyte 2. The concentration distribution of hydroxide ions (and hence pH) in the electrolyte 2 is shown in FIG. 21 by distinct areas for illustration purposes. In reality, it is mostly a continuous decrease from a high concentration of hydroxide ions (high pH) at the surface of the structure 1 in holiday 16 to the bulk of the electrolyte 2. It is characteristic that the generation of these hydroxide ions increases the total ion concentration and, therefore, decreases the impedances Z1 to Zn as a result of the change from the amplitude A0 to the amplitude A0'. Based on this procedure, the good bedding and, therefore, the presence of conditions permitting the accumulation of hydroxide ions is demonstrated. This is the precondition for effective corrosion protection by cathodic protection. The presence of this important precondition is demonstrated by this method.

Both, the demonstration of convection blocking properties and the associated accumulation of hydroxide ions required for corrosion protection as well as the demonstration of the presence of protective layers within the holiday, are indirect demonstrations of effective corrosion protection determined by "Current Magnetometry Inspection (CMI)". Additionally, it is possible to demonstrate the presence of protective layers, which is the result of an increased concentration of hydroxide ions as shown in FIG. 21. This effect is based on the fact that the interface between the structure 1 and the electrolyte 2 acts from the electrical point of view as a diode. The currents 15 passing through this interface generate a DC current. This DC current can be assessed based on the following procedure:

The source 5 is connected to the structure 1 and the earth 6, and generates the primary current 7 with an amplitude A1 to An.

The secondary field 22 caused by the current 15 leaking through the holidays 16 into the electrolyte 2 are assessed with the instrument 20 with a data acquisition rate of at least 1000 Hz corresponding to a time resolution of at least 1 ms. For each of the frequencies f1 to fn, the average value of the current 15 over one or multiple AC cycles is calculated. This provides apparent DC currents ADC1 to ADCn at the amplitudes A1 to An.

The source 5 is modified to generate the current 7 with the amplitudes A1' to An'. The amplitudes A1' to An' are either larger or smaller than the amplitudes A1 to An.

The secondary field 22 caused by the secondary currents 15 leaking through the holiday 16 into the electrolyte 2 is assessed with the instrument 20 with a data acquisition rate of at least 1000 Hz corresponding to a time resolution of at least 1 ms. For each of the frequencies f1 to fn, the average value of the current 15 over one or multiple AC cycles is calculated. This provides apparent DC currents ADC1' to ADCn' at the amplitudes A1' to An'.

The following conclusion is possible based on the evaluated data assuming the amplitudes A1' to An' are larger than the amplitudes A1 to An, and that a more negative value of the apparent DC currents ADC1 to ADCn indicates a technical current passing from the structure 1 into the electrolyte 2 for the first frequency f1 being in the order of magnitude of 30 Hz:

a) If the first apparent DC current ADC1' is larger than the first apparent DC current ADC1, the structure 1 within the holiday 16 is covered with a protective layer 32 and the corrosion protection is effective.

b) If the first apparent DC current ADC1' is smaller than the first apparent DC current ADC1, the structure 1 within the holiday 16 is corroding and the corrosion protection is not effective.

c) If the first apparent DC current ADC1' is equal to the first apparent DC current ADC1, the change in the amplitude between the amplitude A1 and the amplitude A1' is too small for a conclusive analysis.

The assessment of the contribution of the current 7 to the first apparent DC current ADC1 is possible due to the fact that the change from the amplitude A1 to the amplitude A1' and back to the amplitude A1 occurs within a short time tgn of less than 10 seconds and ideally less than 1 second. Due to the short time interval tgn, the contribution of other disturbing effects is excluded. Correspondingly, the absolute values of the first apparent DC current ADC1 and the first apparent DC current ADC1' are irrelevant since the assessment of the corrosion protection is based on the relative change of the value of the apparent DC current ADC to ADC'. The assessment is correspondingly based on the difference ADC-ADC'. This procedure allows for a direct assessment of the presence of protective layers 32 within the holiday 16. Correspondingly, "Current Magnetometry Inspection (CMI)" allows for performing an ECDA that goes significantly further than the localizing of the structure 1 and the identification of an individual holiday 16. In case the measurement does not provide a conclusive analysis (case c), the second communication 42 of the instrument 20 with the first communication 41 of the source allows for an application of a first amplitude A1" that is larger than the first amplitude A1'. If the application of the first amplitude A1" causes the first potential U1 to exceed the acceptable touch potential limit on the structure 1, the first duration tc1 is accordingly decreased and the first time gap tg1 is increased. This information exchange and adaptation of the parameters between the instrument 20 and the source 5 is referred to hereinafter as "optimization". The combination of communication between the instrument 20 with the source 5 and the time synchronized adaptation of the frequency f, the amplitude A, the duration tc and the time gap tg allows for further increasing the resolution of the instrument.

For the integrity assessment of the structure 1, it is not only relevant to know the impedances Z1 to Zn of the holiday 16 as well as the presence of protective layers on the structure 1 within the holiday 16. While the determination of the bedding conditions of the holiday 16 as well as the demonstration of the presence of protective layers 32 is relevant with respect to the integrity assessment of the structure 1, it does not allow for assessing the current density within the holiday 16. "Current Magnetometry Inspection (CMI)" allows for determining the key parameters of the system like the localizing of the structure 1, position of the holiday 16 along the structure 1 and the impedances Z1 to Zn for the passage current 15 from the structure 1 into the electrolyte 2. However, a full assessment additionally requires the surface S of the holiday 16 that is in contact with the electrolyte 2.

A first estimation of the surface SH of the holiday 16 is possible based on the fourth impedance Z4 determined for the fourth frequency f4 in FIG. 20, which is in the order of magnitude of 1 kHz in combination with the resistivity rho of the electrolyte 2. The surface SH is directly calculated by the following equation:

$$SH = (rho/(4*Z4))2*\pi$$

This equation assumes homogeneous soil conditions and excludes the generation of hydroxide ions in the holiday 16 as well as their diffusion and migration into the adjacent electrolyte. It is hence assumed that the pH of the first zone 33, the second zone 34 and the third zone 35 corresponds to the pH of the electrolyte 2. Correspondingly, the surface of the holiday is usually overestimated by this approach. The analysis can be significantly improved based on the measurement difference between the first apparent DC current ADC1 and the first apparent DC current ADC1' obtained for the first amplitudes A1 and A1'. By optimization, the maximum level of the first amplitude A1" can be significantly increased without resulting in dangerous touch potentials for the first potential U1" on the structure 1.

$$U_1 = Z_1 \cdot SH \cdot (ADC_1 \cdot Z_1 \cdot S - E + U_0)/k$$

The potential $U_0$, the frequency f and the surface SH are independent on the change from the amplitude A1 to the amplitude A1'. Furthermore, it can be assumed that the change in hydroxide concentration is small from the amplitude A1 to the amplitude A1' and the impedance Z1, k as well as E can therefore be considered constant, it is possible to calculate the surface SH. When the surface SH and the impedances Z1 to Zn are known, it is immediately possible to calculate the AC and DC current density of the holiday 16 for various interference conditions. Therefore, the usually available monitoring data of structures 1 can be used to determine the compliance of the holiday 16 with the current densities specified in the relevant standards.

Figure 23:
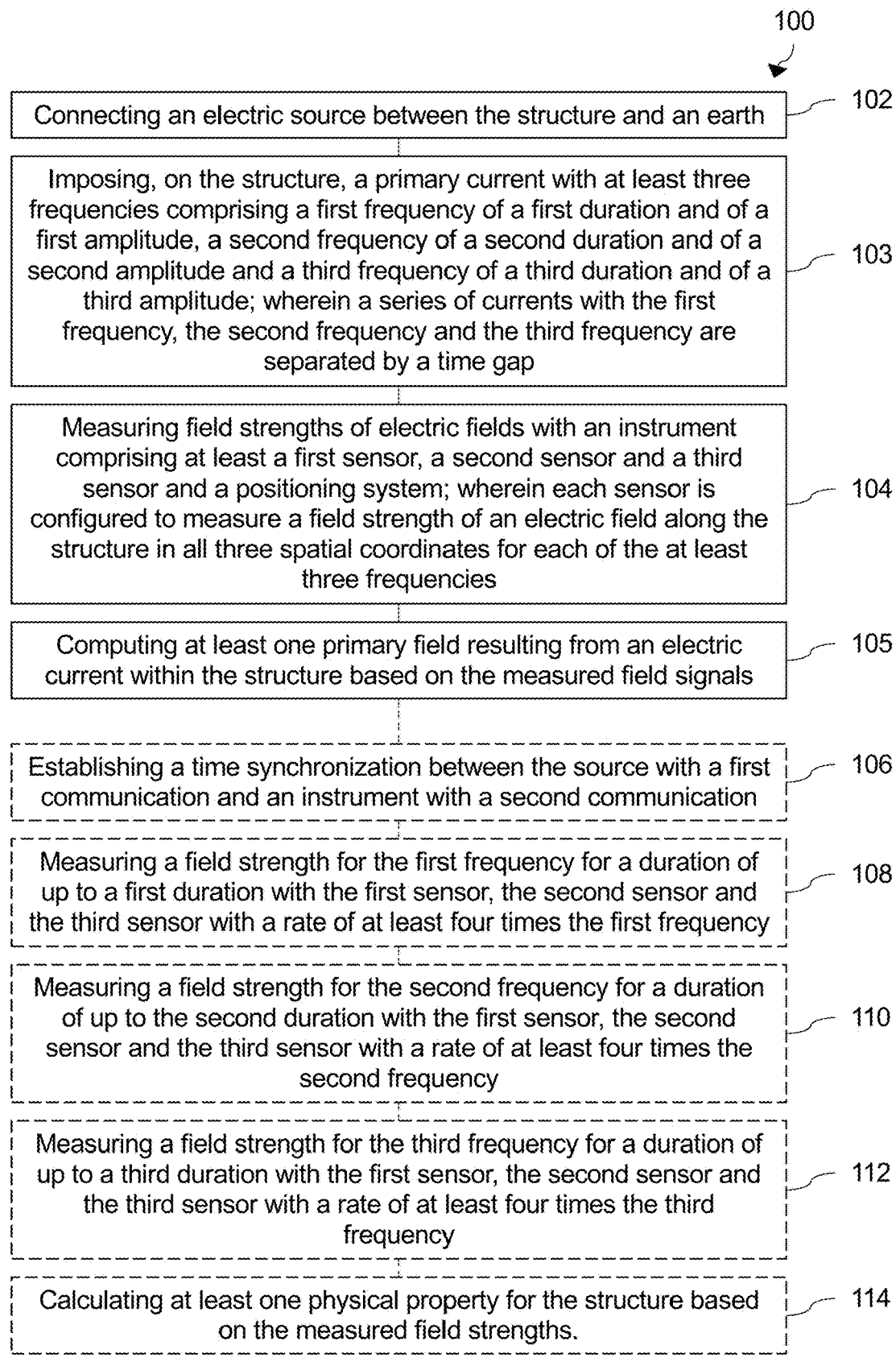
FIG. 23 shows basic steps of an example of a method for assessing a structure arranged in an electrolyte.

FIG. 23 shows basic steps of an example of a method 100 for assessing a structure arranged in an electrolyte. The method 100 comprising the steps:

Connecting 102 an electric source between the structure and an earth;

Imposing 103, on the structure, a primary current with at least three frequencies comprising a first frequency of a first duration and of a first amplitude, a second frequency of a second duration and of a second amplitude and a third frequency of a third duration and of a third amplitude; a series of currents with the first frequency, the second frequency and the third frequency are separated by a time gap;

Measuring 104 field with an instrument comprising at least a first sensor, a second sensor and a third sensor and a positioning system; each sensor is configured to measure a field along the structure for each of the at least three frequencies; in an option the sensors are replaced by sensor arrays; and Computing 105 at least one primary field resulting from an electric current within the structure based on the measured field.

In an option of the method, not shown in detail, it is further provided:

Locating the structure by detecting a primary field generated by a primary current of the first frequency, the second frequency and the third frequency within the structure.

In an option of the method, not shown in detail, it is further provided:

Identifying a holiday by detecting a secondary field generated by a secondary current of the first frequency, the second frequency and the third frequency. For example, this provided by a sensor that is at an angle 21 relative to the first sensor.

In an option of the method, shown as an option in FIG. 23 with broken lines, for measuring it is further provided:

Establishing 106 a time synchronization between the source with a first communication and an instrument with a second communication;

Measuring 108 a field for the first frequency for a duration of up to a first duration with the first sensor, the third sensor and the fourth sensor with a rate of at least four times the first frequency; and Measuring 110 a field for the second frequency for a duration of up to the second duration with the first sensor, the third sensor and the fourth sensor with a rate of at least four times the second frequency; and Measuring 112 a field for the third frequency for a duration of up to a third duration with the first sensor, the third sensor and the fourth sensor with a rate of at least four times the third frequency; and Calculating 114 at least one physical property for the structure based on the measured fields.

In an option of the method, not shown in detail, it is further provided:

Measuring of a first phase shift and a second phase shift and a third phase shift of the at least three frequencies imposed by the source and the measured field by the first sensor, the third sensor and the fourth sensor generated by the primary current and the secondary current, based on the first communication and the second communication between the source and the instrument.

In an option of the method, not shown in detail, it is further provided:

Calculating the primary current in the structure by the field measured with the at least three sensors and as well as the phase shift, based on the first communication and the second communication between the source and the instrument;

Modelling the field measured by the at least three sensors taking into account the first phase shift, the second phase shift and a third phase shift that allow to assess the contribution of a metallic component to the measured fields; and Calculating the primary current in the structure based on the modelled field distribution.

In an option of the method, not shown in detail, it is further provided:

Calculating the first potential, the second potential and the third potential for the first frequency, second frequency and the third frequency along the structure by the following steps:

Calculating the longitudinal resistivity based on the type of metal and the metallic section of the structure; and Calculating the first potential, second potential and the third potential along the structure by the primary current for at least the first frequency and the second frequency and the third frequency. The calculation of the first amplitude and the second amplitude and the third amplitude of the primary current for the first frequency and the second frequency and the third frequency along the structure is assessed with the at least three sensors.

In an option of the method, not shown in detail, it is further provided:

Calculating of the first amplitude and the second amplitude and the third amplitude of the secondary current passing from the structure through the holiday into the electrolyte by the fields measured with the at least three sensors as well as the phase shift and by the following steps:

Modelling the secondary field measured by the at least three sensors taking into account the first phase shift, the second phase shift and a third phase shift that allows to assess the contribution of a metallic component to the measured field; and Calculating the first amplitude and the second amplitude and the second amplitude of the secondary current for the at least three frequencies passing from the structure through the holiday into the electrolyte. Additional sensors are provided at an angle to the first sensor.

In an option of the method, not shown in detail, it is further provided:

Determining of the presence of a protective layer in the holiday, based on a determination of a first impedance and a second impedance and a third impedance and the first phase shift and the second phase shift and the third phase shift, by the following steps:

Calculating the first impedance and the second impedance and the third impedance of the holiday by dividing the first potential on the structure at the position of the holiday by the first amplitude of the secondary current, by dividing the second potential on the structure at the position of the holiday by the second amplitude of the secondary current and by dividing the third potential on the structure at the position of the holiday by the third amplitude of the secondary current for the least three frequencies; and Evaluating of the frequency dependency of the first impedance and the second impedance and the third impedance and the first phase shift and the second phase shift and the third phase shift for the assessment of the presence of the protective layers within the holiday.

In an option of the method, not shown in detail, it is further provided:

Demonstrating of the good bedding condition of the holiday, based on the change of the amplitude to the amplitude of the primary current generated by the source based on the first communication and the second communication with the instrument, by the following steps with a first amplitude being applied:

Determining the first impedance and the second impedance and the third impedance of the holiday at the amplitude;

Sending a command from the instrument to the source via the first communication and the second communication, wherein the amplitude An of the primary current is increased to an increased amplitude An';

Determining the first impedance and the second impedance and the third impedance of the holiday at the increased amplitude An' as a function of time;

Sending a command from the instrument to the source via the first communication and the second communication, wherein the increased amplitude An' of the primary current is decreased to the amplitude An. The first impedance and the second impedance and the third impedance of the holiday are determined at the amplitude;

Evaluating the time evolution of the first impedance and/or the second impedance and/or the third impedance; wherein a first impedance and/or a second impedance and/or a third impedance that varies with time is a demonstration of a good bedding condition and an ability to accumulate hydroxide ions and thereby generate a zone with high pH, a zone with increased pH and a zone with small increase of pH.

In an option of the method, not shown in detail, it is further provided:

Demonstrating the presence of a protective layer on the structure in contact with the electrolyte within the holiday, based on the change of the first amplitude of the primary current generated by the source based on the first communication and the second communication with the instrument, by the following steps:

Setting the amplitude of the selected first frequency to the first amplitude;

Determining the secondary field by the at least three sensors with a frequency of at least four times of the first frequency;

Calculating the first amplitude of the secondary current;

Determining the average of the first amplitude over a multiple of the period of 1/first frequency resulting in a first apparent DC current at the first amplitude;

Changing the amplitude of the selected first frequency to the first amplitude; the secondary field is determined by the at least three sensors with a frequency of at least four times the first frequency;

Averaging the recorded data taken over a multiple of the period of 1/first frequency resulting in the first apparent DC current at the changed first amplitude; and Determining a presence of the protective layer by an evaluation of the assessment of the first amplitude subtracted by the changed first amplitude and the first apparent DC current subtracted by the changed first apparent DC current.

In an option of the method, not shown in detail, it is further provided:

Minimizing the touch potential of a pipeline during the measurement, based on the change of the first amplitude and the second amplitude and the third amplitude of the primary current for all of the at least three frequencies generated by the source based on the first communication and the second communication with the instrument, by the following step:

Temporarily changing the first amplitude and the second amplitude and the third amplitude, the first duration and the second duration and the third duration and the first time gap and the second time gap and the third time gap of the at least three frequencies by increasing the first amplitude and the second amplitude and the third amplitude and increasing the first time gap and the second time gap and the third time gap as well as decreasing the first duration and the second duration and the third duration by the first communication and the second communication between the source and the instrument.

Also, the following items are provided:

A) A method for localizing a structure 1 and determining the distance 14 in an electrolyte 2 including the steps of:
- connecting a source 5 between the structure 1 and an earth 6; and
- imposing current 7 with at least three frequencies, i.e. frequency f1, frequency f2 and frequency f3 of duration tc1, duration tc2 and duration tc3 and of amplitude A1, amplitude A2 and amplitude A3;
- wherein a series of AC currents with frequency f1, frequency f2 and frequency f3 are separated by the time gap tg;
- wherein a primary field 8 of the frequency f1, frequency f2 and frequency f3 generated by the current 7 is measured with an instrument 20 comprising at least three sensors 10, 12 and 12' and a PS 45, by the following steps:
  - the time synchronization between the source 5 is established with communication 41 and the instrument 20 with communication 42;
  - the field 8 is measured for frequency f1 for a duration of up to tc1 with sensor 10, with sensor 12' and with sensor 12" with a rate of at least 4*f1; and
  - the field 8 is measured for frequency f2 for a duration of up to tc2 with sensor 10, with sensor 12' and with sensor 12" with a rate of at least 4*f2.

B) The method according to item A), wherein the at least three sensors 17, 18' and 18" that are at an angle 21 to the sensor 10 allow for identifying a holiday 16 by detection of the field 22 generated by the current 15 of the frequency f1 and the frequency f2 and the frequency f2.

C) The method according to item A) or B), wherein further comprising the additional sensor 23 positioned at an angle 24 to the plane described by the sensor 10 and sensor 17 allowing for the detection of the field 8 as well as the field 22 in all three spatial coordinates. These three sensors 10, 17 and 23 are combined into a sensor array 25.

D) The method according to one of items A) to C), wherein the combination of at least three sensor arrays 25, 26 and 27 into the instrument 20 allowing for determining the field 8 and the field 22 generated by the current 7 and the current 15 passing through the holiday 16 from the structure 1 into the electrolyte 2 for at least frequency f1 and F2 at least every 100 cm along the structure 1. The determination of the field 22 allows for identification of the position of the holiday 16. The precision of detection is increased with decreasing the distance for individual measurements of the field 8 and the field 22 along the structure 1 from 100 cm to 1 cm.

E) The method according to one of items A) to D), wherein the communication 41 and communication 42 between the source 5 and the instrument 20 that allows for the measurement of the phase shift DEG1 and DEG 2 and DEG3 of the at least three frequencies f1, f2 and f3 imposed by the source 5 and the field 8 as well as the field 22 generated by the current 7 and the current 15.

F) The method according to item A), wherein the communication 41 and communication 42 between the source 5 and the instrument 20 that allows for calculation of the current 7' in the structure 1 by the field 8 measured with the at least three sensors 10, 12' and 12" as well as the phase shift DEG1 and DEG2 and DEG3 by the following steps:
- The field 8 measured by the at least three sensors 10, 12' and 12" is modelled taking into account the phase shift DEG1 and DEG2 and DEG3 that allows to assess the contribution of a metallic component 30 to the measured field 8; and
- Calculation of the current 7' in the structure 1 based on the modelled field distribution.

G) The method according to item A) or F), wherein the calculation of the amplitude A1 and A2 and A3 of current 7 for frequency f1 and f2 along the structure 1 assessed with at least three sensors 10, 12 and 12' allows for the calculation of the potential U1 and U2 and U3 for the frequency f1 and f2 and f3 along the structure 1 by the following steps:
- Based on the type of metal and the metallic section of the structure 1, the longitudinal resistivity is calculated.
- By the current 7' for at least frequency f1 and frequency f2 and frequency f3, the potential U1 and U2 and U3 is calculated along the structure 1.

H) The method according to one of items A), B), E), F) and G), wherein sensors 17, 18 and 18' that are at an angle 21 to sensor 10 allows for the calculation of the amplitude A1 and A2 and A3 of the current 15 passing from the structure 1 through the holiday 16 into the electrolyte 2 by the field 22 measured with the at least three sensors 17, 18 and 18' as well as the phase shift DEG1 and DEG2 and DEG3 by the following steps:
- The field 22 measured by the at least three sensors 17, 18 and 18' is modelled taking into account the phase shift DEG1 and DEG2 and DEG3 that allows to assess the contribution of a metallic component 30 to the measured field 22.
- Calculation of the amplitude A1 and A2 and A3 of the secondary current 15 for the at least three frequencies f1, f2 and f3 passing from the structure 1 through the holiday 16 into the electrolyte 2.

I) The method according to one of items A) to H), wherein determination of the Impedance Z1 and Z2 and Z3 and the phase shift DEG1 and DEG2 and DEG3 allows for the determination of the presence of a protective layer 32 in the holiday 16 by the following steps:
- The impedance Z1 and Z2 and Z3 of the holiday 16 is calculated by dividing the potential U1 on the structure 1 at the position of the holiday 16 by A1 of current 15 and by dividing the potential U2 on the structure 1 at the position of the holiday 16 by A2 of current 15 and by dividing the potential U3 on the structure 1 at the position of the holiday 16 by A3 of current 15 for the least three frequencies f1, f2 and f3.
- Evaluation of the frequency dependence of the impedance Z1 and Z2 and Z3 and the phase shift DEG1 and DEG2 and DEG3 for the assessment of the presence of the protective layers 32 within the holiday 16. This provides information with respect to the corrosion protection of the holiday.

J) The method according to one of items A) to I), wherein the change of A0 to A0' of the current 7 generated by the source 5 based on communication 41 and communication 42 with the instrument 20 allows for demonstration of the good bedding condition of the holiday 16 by the following steps with A0 being applied:
- The impedance Z1 and Z2 and Z3 of the holiday 16 are determined at A0.
- Via communication 41 and communication 42 a command is sent from the instrument 20 to the source 5 and A0 of current 7 is increased to A0'.
- The impedance Z1' and Z2' and Z3' of the holiday 16 are determined at A0' as a function of time.

Via communication 41 and communication 42 a command is sent from the instrument 20 to the source 5 and A0' of current 7 is decreased to A0.

The impedance Z1" and Z2" and Z3" of the holiday 16 is determined at A0.

The time evolution of the impedance Z1' and/or Z2' and/or Z3' is evaluated: A Z1' and/or Z2' and/or Z3' that varies with time is a demonstration of good bedding condition and the ability to accumulate hydroxide ions increase the pH and thereby generate a zone 33 with high pH, a zone 34 with increased pH and a zone 35 with small increase of pH. The generation of zone 33, 34 and 35 results in Z1 and Z2 and Z3 being different to Z1" and Z2" and Z3".

K) The method according to one of items A) to J), wherein the change of the amplitude A1 of the current 7 generated by the source 5 based on communication 41 and communication 42 with the instrument 20 that allows for demonstration of the presence of a protective layer 32 on the structure 1 in contact with the electrolyte 2 within the holiday 16 by the following steps:

The amplitude of the selected frequency f1 of the primary current is set to A1.

The field 15 is determined by the at least three sensors 17, 18' and 18" with a frequency of at least 4*f1.

The amplitude A1 of the secondary current 15 is calculated.

The average of A1 determined over a multiple of the period of 1/f1 is averaged resulting in ADC1 at A1.

The amplitude of the selected frequency f1 is changed to A1'.

The secondary field 15 is determined by the at least three sensors 17, 18' and 18" with a frequency of at least 4*f1.

The average of the recorded data taken over a multiple of the period of 1/f1 is averaged resulting in ADC1' at A1'.

The presence of the protective layer 32 is determined by the evaluation of the assessment of A1-A1' and ADC1-ADC1'.

L) The method according to one of items A) to K), wherein the change of the amplitude A1 and A2 and A3 of the primary current 7 for all of the at least three frequencies f1, f2 and f3 generated by the source 5 based on communication 41 and communication 42 with the instrument 20 that allows to minimize the touch potential of the pipeline during the measurement by the following steps:

The determination of the secondary current 15 passing from the structure 1 through the holiday 16 into the electrolyte 2 does not provide sufficient resolution for reliable calculation of the impedance Z1 and Z2 and Z3 or the phase shift DEG1 and DEG2 and DEG3.

The amplitude A1 and A2 and A3, the duration tc1 and tc2 and tc3 and the time gap tg1 and tg2 and tg3 of the at least three frequencies f1, f2 and f3 is temporarily changed by increasing A1' and A2' and A3' and increasing to tg1' and tg2' and tg3' as well as decreasing to tc1' and tc2' and tc3' by the communication 41 and communication 42 between the source 5 and the instrument 20.

This procedure allows for significantly increased short term levels of U1 and U2 and U3 on the pipeline without generating a problem with respect to protection of persons or AC corrosion.

M) A system for localizing the structure 1, identifying holidays 16 on the structure 1, determining the presence of protective layers 32, the good bedding of the holiday 16 and therefore the external corrosion assessment of a structure in contact with an electrolyte 2, e.g. for performing the method according to one of items A) to L), wherein the system comprises:

an instrument 20 with:
at least three sensor arrays 25, 26 and 27 allowing for measurement of the field 8 and the field 22 along the structure 1 in all three spatial coordinates;
at least one communication 42;
a positioning and orientation system 45;
a source 5 with an electrical output connecting to an earth 6; and
an electrical output connecting to a structure 1 and a communication 41.

In another exemplary embodiment, a computer program or a computer program element is provided that is characterized by being adapted to execute the method steps of the method according to one of the preceding embodiments, on an appropriate system.

The computer program element might be stored on a computer unit or be distributed over more than one computer units, which might also be part of an embodiment of the "Current Magnetometry Inspection (CMI)". This computing unit may be adapted to perform or induce a performing of the steps of the method described above. Moreover, it may be adapted to operate the components of the above described apparatus. The computing unit can be adapted to operate automatically and/or to execute the orders of a user. A computer program may be loaded into a working memory of a data processor. The data processor may thus be equipped to carry out the method of "Current Magnetometry Inspection (CMI)".

Aspects of the "Current Magnetometry Inspection (CMI)" may be implemented in a computer program product, which may be a collection of computer program instructions stored on a computer readable storage device which may be executed by a computer. The instructions of "Current Magnetometry Inspection (CMI)" may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of "Current Magnetometry Inspection (CMI)" may be distributed over multiple computers or processors.

As discussed above, the processing unit, for instance a controller implements the control method. The controller can be implemented in numerous ways, with software and/or hardware, to perform the various functions required. A processor is one example of a controller which employs one or more microprocessors that may be programmed using software (e.g., microcode) to perform the required functions. A controller may however be implemented with or without employing a processor, and also may be implemented as a combination of dedicated hardware to perform some functions and a processor (e.g., one or more programmed microprocessors and associated circuitry) to perform other functions.

Examples of controller components that may be employed in various embodiments of the present disclosure include, but are not limited to, conventional microprocessors, application specific integrated circuits (ASICs), and field-programmable gate arrays (FPGAs).

This exemplary embodiment of "Current Magnetometry Inspection (CMI)" covers both, a computer program that right from the beginning uses "Current Magnetometry Inspection (CMI)" and a computer program that by an update turns an existing program into a program that uses "Current Magnetometry Inspection (CMI)".

Further on, the computer program element might be able to provide all necessary steps to fulfil the procedure of an exemplary embodiment of the method as described above.

According to a further exemplary embodiment of "Current Magnetometry Inspection (CMI)", a computer readable medium, such as a CD-ROM, is presented wherein the computer readable medium has a computer program element stored on it, which computer program element is described by the preceding section. A computer program may be stored and/or distributed on a suitable medium, such as an optical storage medium or a solid-state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of "Current Magnetometry Inspection (CMI)", a medium for making a computer program element available for downloading is provided, which computer program element is arranged to perform a method according to one of the previously described embodiments of "Current Magnetometry Inspection (CMI)".

It has to be noted that embodiments of "Current Magnetometry Inspection (CMI)" are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

Embodiments of "Current Magnetometry Inspection (CMI)"

Embodiment 1: A method (100) for assessing a structure arranged in an electrolyte, the method comprising the steps:
Connecting (102) an electric source between the structure and an earth;
Imposing (103), on the structure, a primary current with at least three frequencies comprising a first frequency of a first duration and of a first amplitude, a second frequency of a second duration and of a second amplitude and a third frequency of a third duration and of a third amplitude; wherein a series of currents with the first frequency, the second frequency and the third frequency are separated by a time gap;
Measuring (104) of fields with an instrument comprising at least a first sensor, a third sensor and a fourth sensor and a positioning system; wherein each sensor is configured to measure a field along the structure for each of the at least three frequencies; and
Computing (105) at least one primary field resulting from an electric current within the structure based on the measured field.

Embodiment 2: Method according to embodiment 1, further comprising:
Locating the structure by detecting a primary field generated by a primary current of the first frequency, the second frequency and the third frequency within the structure.

Embodiment 3: Method according to embodiment 1 or 2, further comprising:
Identifying a holiday by detecting a secondary field generated by a secondary current of the first frequency, the second frequency and the third frequency.

Embodiment 4: Method according to embodiment 1, 2 or 3, wherein for measuring, the following steps are provided:
Establishing (106) a time synchronization between the source with a first communication and an instrument with a second communication;
Measuring (108) a field for the first frequency for a duration of up to a first duration with the first sensor, the third sensor and the fourth sensor with a rate of at least four times the first frequency; and
Measuring (110) a field for the second frequency for a duration of up to the second duration with the first sensor, the third sensor and the fourth sensor with a rate of at least four times the second frequency; and
Measuring (112) a field for the third frequency for a duration of up to a third duration with the first sensor, the third sensor and the fourth sensor with a rate of at least four times the third frequency; and
Calculating (114) at least one physical property for the structure based on the measured fields.

Embodiment 5: Method according to one of the preceding embodiments, further comprising:
Measuring of a first phase shift, a second phase shift and a third phase shift of the at least three frequencies imposed by the source and the measured field by the first sensor, the third sensor and the fourth sensor generated by the primary current and the secondary current, based on the first communication and the second communication between the source and the instrument.

Embodiment 6: Method according to one of the preceding embodiments, further comprising:
Calculating the primary current in the structure by the field measured with the at least three sensors and as well as the phase shift, based on the first communication and the second communication between the source and the instrument;
Modelling the field measured by the at least three sensors taking into account the first phase shift, the second phase shift and a third phase shift that allow to assess the contribution of a metallic component to the measured field; and
Calculating the primary current in the structure based on the modelled field distribution.

Embodiment 7: Method according to one of the preceding embodiments, further comprising:
Calculating the first potential, the second potential and the third potential for the first frequency, the second frequency and the third frequency along the structure by the following steps:
Calculating the longitudinal resistivity based on the type of metal and the metallic section of the structure; and
Calculating the first potential, the second potential and the third potential along the structure by the primary current for at least the first frequency, the second frequency and the third frequency;
wherein the calculation of the first amplitude, the second amplitude and the third amplitude of the primary current for the first frequency, the second frequency and the third frequency along the structure is assessed with the at least three sensors.

Embodiment 8: Method according to one of the preceding embodiments, further comprising:
  Calculating of the first amplitude, the second amplitude and the third amplitude of the secondary current passing from the structure through the holiday into the electrolyte by the fields measured with the at least three sensors as well as the phase shift and by the following steps:
  Modelling the secondary field measured by the at least three sensors taking into account the first phase shift, the second phase shift and the third phase shift that allows to assess the contribution of a metallic component to the measured field; and
  Calculating the first amplitude and the second amplitude of the secondary current for the at least three frequencies passing from the structure through the holiday into the electrolyte;
  wherein additional sensors are provided at an angle to the first sensor.

Embodiment 9: Method according to one of the preceding embodiments, further comprising:
  Determining of the presence of a protective layer in the holiday, based on a determination of a first impedance, a second impedance and third impedance and the first phase shift, the second phase shift and third phase shift, by the following steps:
  Calculating the first impedance, the second impedance and the third impedance of the holiday by dividing the first potential on the structure at the position of the holiday by the first amplitude of the secondary current, by dividing the second potential on the structure at the position of the holiday by the second amplitude of the secondary current and by dividing the third potential on the structure at the position of the holiday by the third amplitude of the secondary current for the least three frequencies; and
  Evaluating of the frequency dependency of the first impedance, the second impedance and the third impedance and the first phase shift the second phase shift and the third phase shift for the assessment of the presence of the protective layers within the holiday.

Embodiment 10: Method according to one of the preceding embodiments, further comprising:
  Demonstrating of the good bedding condition of the holiday, based on the change of the amplitude to the amplitude of the primary current generated by the source based on the first communication and the second communication with the instrument, by the following steps with a first amplitude being applied:
  Determining at least the first impedance of the holiday at the amplitude;
  Sending a command from the instrument to the source via the first communication and the second communication, wherein the amplitude of the primary current is increased to an increased amplitude;
  Determining at least the first impedance of the holiday at the increased amplitude as a function of time;
  Sending a command from the instrument to the source via the first communication and the second communication, wherein the increased amplitude of the primary current is decreased to the amplitude;
  wherein at least the first impedance of the holiday are determined at the amplitude;
  Evaluating the time evolution of at least the first impedance; wherein at least a first impedance that varies with time is a demonstration of a good bedding condition and an ability to accumulate hydroxide ions and thereby generate a zone with high pH, a zone with increased pH and a zone with small increase of pH;
  wherein the generation of the zones results at least in the first impedance being different to the first impedance.

Embodiment 11: Method according to one of the preceding embodiments, further comprising:
  Demonstrating the presence of a protective layer on the structure in contact with the electrolyte within the holiday, based on the change of the first amplitude of the primary current generated by the source based on the first communication and the second communication with the instrument, by the following steps:
  Setting the amplitude of the selected first frequency to the first amplitude;
  Determining the secondary field by the at least three sensors with a frequency of at least four times of the first frequency;
  Calculating the first amplitude of the secondary current;
  Determining the average of the first amplitude over a multiple of the period of 1/first frequency resulting in a first apparent DC current at the first amplitude;
  Changing the amplitude of the selected first frequency to the first amplitude;
    wherein the secondary field is determined by the at least three sensors with a frequency of at least four times the first frequency;
  Averaging the recorded data taken over a multiple of the period of 1/first frequency resulting in the first apparent DC current at the changed first amplitude; and
  Determining a presence of the protective layer by an evaluation of the assessment of the first amplitude subtracted by the changed first amplitude and the first apparent DC current subtracted by the changed first apparent DC current.

Embodiment 12: Method according to one of the preceding embodiments, further comprising:
  Minimizing the touch potential of a pipeline during the measurement, based on the change of at least the first amplitude of the primary current for all of the at least first frequencies generated by the source based on the first communication and the second communication with the instrument, by the following step:
  Temporarily changing at least the first amplitude, at least the first duration or at least the first time gap of the at least three frequencies by increasing at least the first amplitude or increasing at least the first time gap or at decreasing at least the first duration by the first communication and the second communication between the source and the instrument.

Embodiment 13: A system (SY) for assessing a structure (1) arranged in an electrolyte, the system comprising:
  a source (S; 5) with an electric output terminal (TS) configured for connection to the structure (1), an electric output terminal (TE) configured for connection to earth (6);
  wherein the source is configured to provide a current with at least three frequencies at least within the structure; and
  an instrument (20) with at least a first sensor (S1), a second sensor (S2) and a third sensor (S3) in a known spatial relation;
  wherein each sensor is configured to measure a field along the structure for each of the at least three frequencies;

a positioning and orientation system (PS; 45) configured to provide position data of the instrument; and a processing unit (PU) in data communication with the source and the instrument;

wherein the processing unit is configured to compute at least one primary field resulting from an electric current within the structure based on the measured field.

Embodiment 14: System according to embodiment 13, wherein the instrument measures at least three different fields at each of the at least three sensors for the at three frequencies.

Embodiment 15: System according to embodiment 13 or 14, wherein a seventh sensor and a twelfth sensor are combined with the first sensor, forming a first sensor array;

wherein the seventh sensor is at an angle to the first sensor and the twelfth sensor is at an angle to the plane described by the first and the seventh sensor.

The invention claimed is:

1. A method for assessing a structure arranged in an electrolyte, the method comprising:

connecting an electric source between the structure and a low resistive connection to the electrolyte via an earth;

providing, at least within the structure, a direct current, DC, and/or an alternating current, AC, via the electric source;

measuring a direct voltage, DC voltage, and an alternating voltage, AC voltage, between a first electrode and a second electrode, the first electrode and the second electrode being in contact with the electrolyte at a measurement location and being arranged at a distance to each other, wherein the first electrode and the second electrode are connected to a voltage measurement device;

determining a direct potential, DC potential, and an alternating potential, AC potential, between the structure and the electrolyte at the measurement location, wherein determining the DC potential and the AC potential comprises measuring the DC potential and the AC potential between the structure and at least one additional electrode in contact with the electrolyte; and assessing at least one property of the structure based on the measured DC voltage, the measured AC voltage, the DC potential, and the AC potential, wherein the first electrode and the structure are separate components.

2. The method of claim 1, wherein the at least one additional electrode comprises a first additional electrode and a second additional electrode; and wherein determining the DC potential and the AC potential at the measurement location comprises:

measuring a first DC potential and a first AC potential between the structure and the first additional electrode arranged at a first test post;

measuring a second DC potential and a second AC potential between the structure and the second additional electrode arranged at a second test post, wherein the second test post is arranged at a distance to the first test post;

determining an interpolated DC potential at the measurement location based on the first DC potential and the second DC potential; and determining an interpolated AC potential at the measurement location based on the first AC potential and the second AC potential;

wherein the measurement location is arranged between the first test post and the second test post.

3. The method of claim 1, wherein determining the DC potential and the AC potential at the measurement location comprises:

measuring an electromagnetic field at the measurement location with at least one electromagnetic field sensor of an electromagnetic measurement device, wherein the electromagnetic field to be measured is associated with a primary current in the structure at the measurement location resulting from the AC current and the DC current imposed on the structure;

determining the primary current along the structure based on the measured electromagnetic field; and calculating the AC potential based on the measured currents.

4. The method of claim 3, further comprising:

calculating a resistivity of the electrolyte based on a secondary current, the AC voltage, and a form factor taking into account the location of the structure within the electrolyte relative to the first electrode and the second electrode; and determining a required protection potential based on the resistivity of the electrolyte.

5. The method of claim 1, wherein assessing the at least one property of the structure comprises determining an IR-free potential at the measurement location.

6. The method of claim 5, wherein the method is carried out at a plurality of measurement locations; and wherein assessing at least one property of the structure comprises locating a coating defect of the structure and determining an effectiveness of a cathodic protection of the structure provided by the direct current based on the IR-free potential.

7. The method of claim 6, wherein the first electrode and the second electrode are each electrode assemblies comprising a reference electrode and a metal electrode;

wherein the metal electrodes are used for locating the coating defect; and wherein the reference electrodes are used for determining the effectiveness of the cathodic protection.

8. The method of claim 1, further comprising:

establishing a wireless communication between the electric source and the voltage measurement device and/or a processing unit connected to the voltage measurement device; and sending a command to the electric source to increase the AC current prior to measuring the AC voltage in order to improve accuracy of the measurement.

9. The method of claim 1, wherein electrical contact of the first electrode and the second electrode with the electrolyte is enhanced for each electrode by bringing the electrodes into contact with an electrolyte bridge that connects the corresponding electrode with the electrolyte;

wherein the electrolyte bridge comprises at least one of the following:

a water stream;

a water filled pipe; and a water soaked porous material;

a polymer electrolyte.

10. The method of claim 9, wherein the method further comprises:

using different electrode materials with deviating potentials for the first electrode and the second electrode; and regularly connecting a resistor having a relatively large resistance between the first electrode and the second electrode in parallel to the voltage measurement device;

comparing a measurement of a first DC voltage taken without the resistor connected with a measurement of a second DC voltage taken with the resistor connected; and if a difference between the first DC voltage and the second DC voltage is above a threshold value, enhancing the electrolyte bridge.

11. The method of claim 1, wherein, when the structure is arranged in the electrolyte in dry conditions, the method comprises using metal electrodes as the first electrode and the second electrode;

wherein each of the metal electrodes comprises at least one of the following materials:

Sodium, Na;
Lithium, Li;
Beryllium, Be;
Zink, Zn;
Indium, In;
Tantalum, Ta;
Tungsten, W;
Molybdenum, Mo;
Copper, Cu;
Iron, Fe,
Platinum, Pt,
Nickel, Ni,
Cobalt, Co; and
Chromium, Cr.

12. A system for assessing a structure arranged in an electrolyte, the system comprising:

a first electrode, the first electrode and the structure being separate components;
a second electrode;
a voltage measurement device; and
a processing unit;

wherein the voltage measurement device is configured to measure a direct voltage, DC voltage, and an alternating voltage, AC voltage, between the first electrode and the second electrode, when the first electrode and the second electrode are in contact with the electrolyte at a measurement location;

wherein the first electrode and the second electrode are configured to be arranged at a distance to each other;

wherein the first electrode and the second electrode are connected to the voltage measurement device;

wherein the processing unit is configured to determine a direct potential, DC potential, and an alternating potential, AC potential, between the structure and the electrolyte at the measurement location utilizing at least one additional electrode; and wherein the processing unit is configured to assess at least one property of the structure based on the measured DC voltage, the measured AC voltage, the DC potential, and the AC potential.

13. The system of claim 12, further comprising an electric source having a first output terminal and a second output terminal;

wherein the first output terminal is configured to be connected to the structure;

wherein the second output terminal is configured to be connected to a low resistive connection to the electrolyte via an earth; and wherein the electric source is configured to provide a direct current, DC, and/or an alternating current, AC at least within the structure.

14. The system of claim 13, further comprising:

a first communication device connected to the processing unit and/or the voltage measurement device; and a second communication device connected to the electric source;

wherein the first communication device and the second communication device are configured to establish a wireless communication in order to exchange commands and/or measurement data.

15. The system of any claim 12, further comprising at least one device for establishing an electrolyte bridge for the first electrode and/or the second electrode that connects the corresponding electrode with the electrolyte.

* * * * *